United States Patent [19]

Moyer et al.

[11] 3,969,614

[45] July 13, 1976

[54] METHOD AND APPARATUS FOR ENGINE CONTROL

[75] Inventors: David F. Moyer, Ann Arbor; Shaun S. Devlin, Birmingham; Richard J. Genik, Livonia, all of Mich.

[73] Assignee: Ford Motor Company, Dearborn, Mich.

[22] Filed: Dec. 12, 1973

[21] Appl. No.: 423,968

[52] U.S. Cl. .................. 235/150.21; 123/32 EA; 60/39.28 R; 123/119 A; 123/148 E
[51] Int. Cl.² .................. G05B 13/02; G05B 15/02
[58] Field of Search .......... 235/150.21, 150.1, 150.2; 340/172.5; 123/119 A, 32 FA, 148 E

[56] References Cited
UNITED STATES PATENTS

| 1,860,641 | 5/1932 | Woolson | 123/119 A |
|---|---|---|---|
| 1,916,325 | 7/1933 | McAdams | 123/119 A |
| 2,982,276 | 5/1961 | Zechnall et al. | 123/32 EA |
| 3,573,442 | 4/1971 | Andeen | 235/150.2 |
| 3,605,709 | 9/1971 | Nakajima et al. | 123/119 A |
| 3,673,993 | 7/1972 | Nakajima et al. | 123/119 A |
| 3,675,633 | 7/1972 | Nakajima et al. | 123/119 A |
| 3,689,753 | 9/1972 | Williams et al. | 235/150.21 |
| 3,749,070 | 7/1973 | Oishi et al. | 123/32 EA |
| 3,750,632 | 8/1973 | Zechnall | 123/32 EA |
| 3,774,583 | 11/1973 | King | 123/119 A |
| 3,809,038 | 5/1974 | Young | 123/119 A |
| 3,815,560 | 6/1974 | Wahl et al. | 123/32 EA |
| 3,816,717 | 6/1974 | Yoshida et al. | 235/150.21 |
| 3,817,225 | 6/1974 | Priegel | 123/32 EA |
| 3,835,819 | 9/1974 | Anderson, Jr. | 235/150.21 |
| 3,838,397 | 9/1974 | Watson et al. | 235/150.21 |
| 3,906,205 | 9/1975 | Yoshida et al. | 235/150.21 |
| 3,906,207 | 9/1975 | Rivere et al. | 235/150.21 X |
| 3,909,601 | 9/1975 | Yamawaki et al. | 235/151.1 |

FOREIGN PATENTS OR APPLICATIONS 851,576   9/1970   Canada ........................ 235/150.21

OTHER PUBLICATIONS

"Electronic Fuel Injection Reduces Automotive Pollution", by Williams, Electronics, pp. 121–125, Sept. 11, 1972, vol. 45.
"Roadblocks to an Automotive Electronics Breakthough", EE/Systems Engineering Today, Apr. 1973, pp. 20–22.
"Airborne Central Digital Computer", by Saunders, in Navigation: Journal of the Institute of Navigation, vol. 11, No. 3, Autumn 1964, pp. 299–305.
"Process Control Computers" by Barclay, in Instruments & Control Systems, vol. 36, Jan. 1963, pp. 127–129.

Primary Examiner—Eugene G. Botz
Attorney, Agent, or Firm—Robert W. Brown; Keith L. Zerschling

[57] ABSTRACT

A method and apparatus for controlling a combustion engine. Means are provided for controlling the energy conversion function of the engine. Adjustments of these control means are obtained by sensing at least one engine operating condition, developing an electrical signal indicative of such condition, and, with a digital computer, calculating repetitively values corresponding to settings of the means used to control the energy conversion function of the engine. The digital computer is programmed to calculate these values or settings arithmetically from an algebraic function or functions describing a desired relationship between settings of the energy conversion control means and the sensed condition.

18 Claims, 24 Drawing Figures

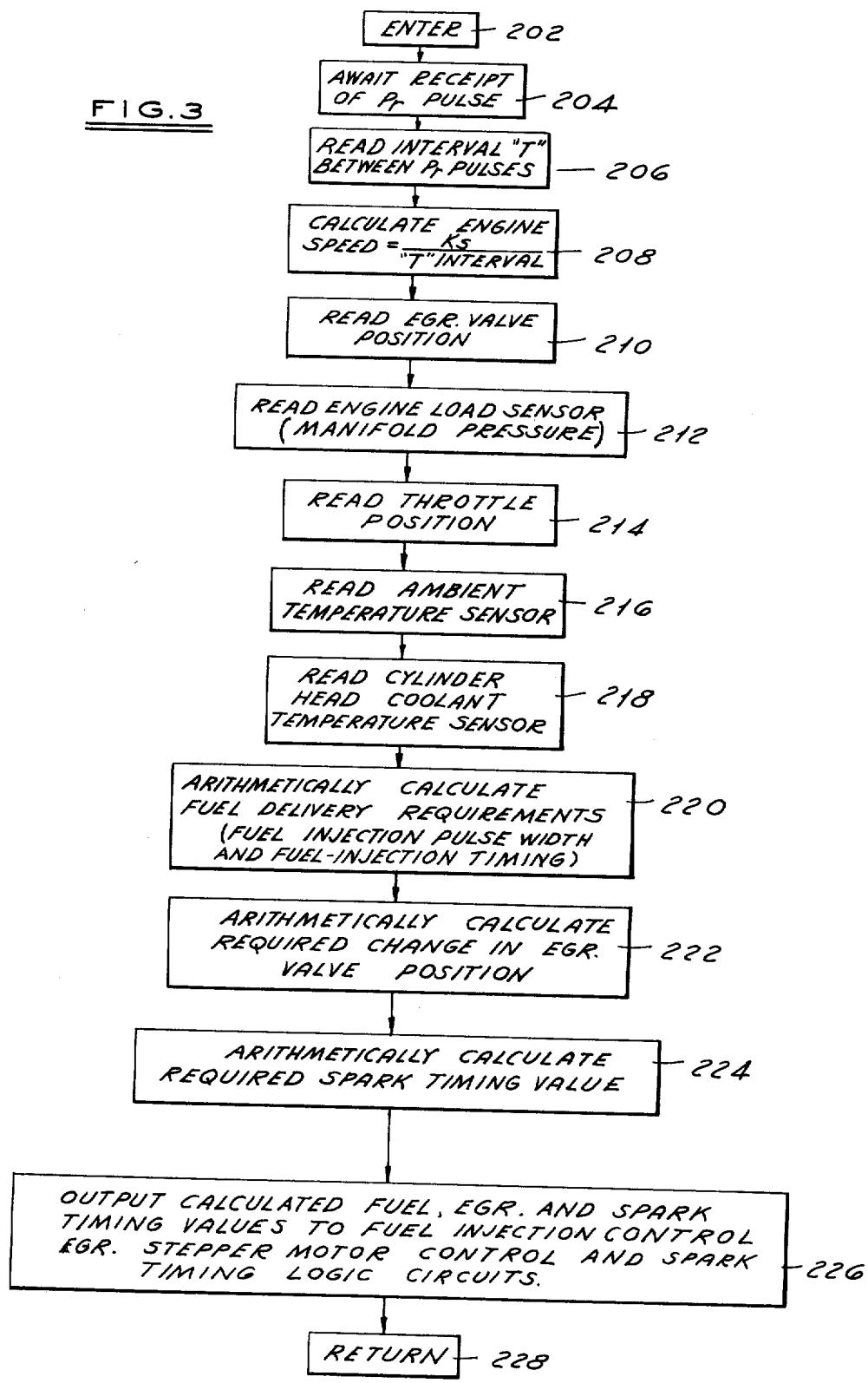

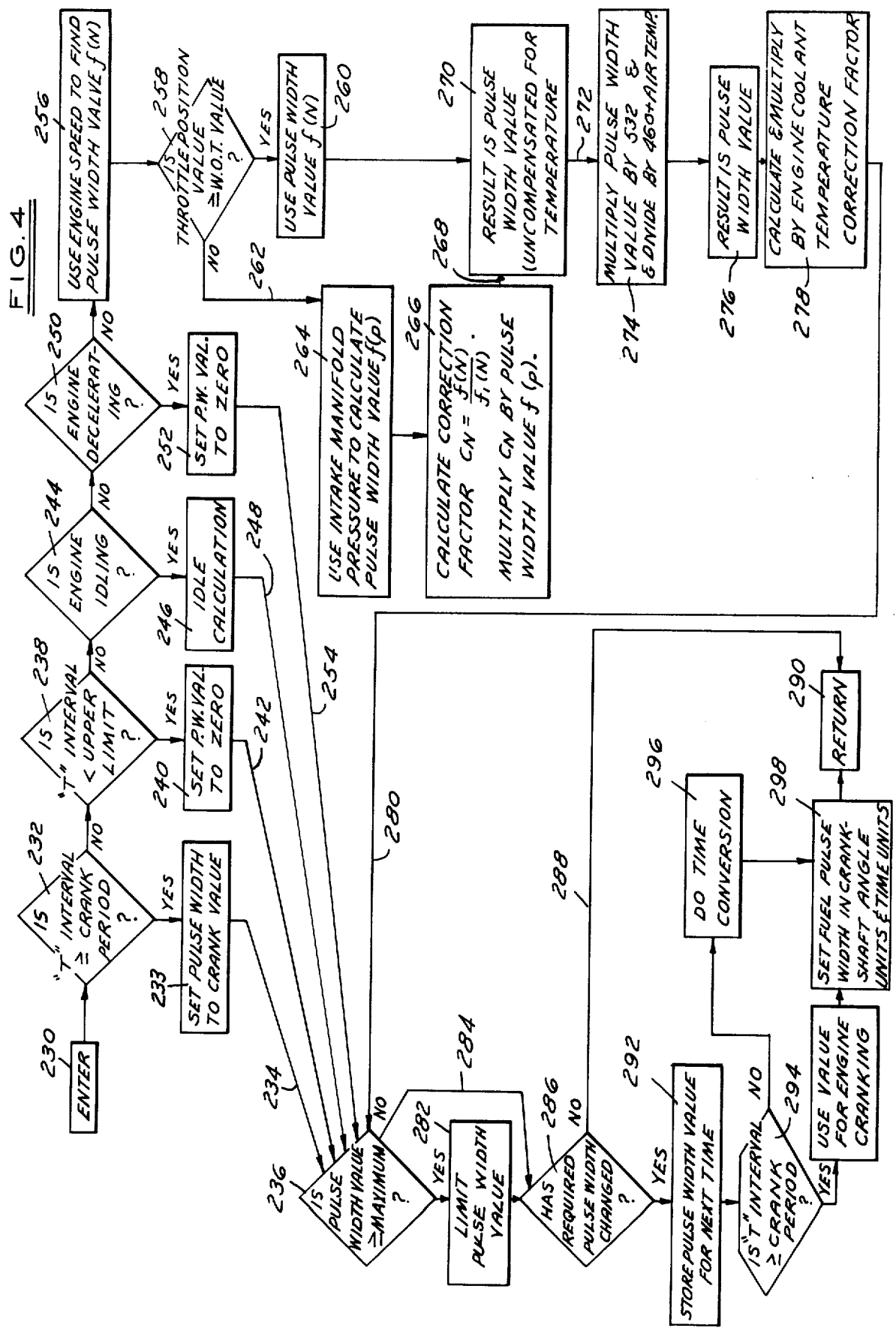

WIDE-OPEN-THROTTLE:
PULSE WIDTH = $f(N)$

PART THROTTLE:
PULSE WIDTH = $[f(p)]\left[\dfrac{f(N)}{f_1(N)}\right]$ $\dfrac{f(N)}{f_1(N)}$ IS CORRECTION FACTOR $C_N$

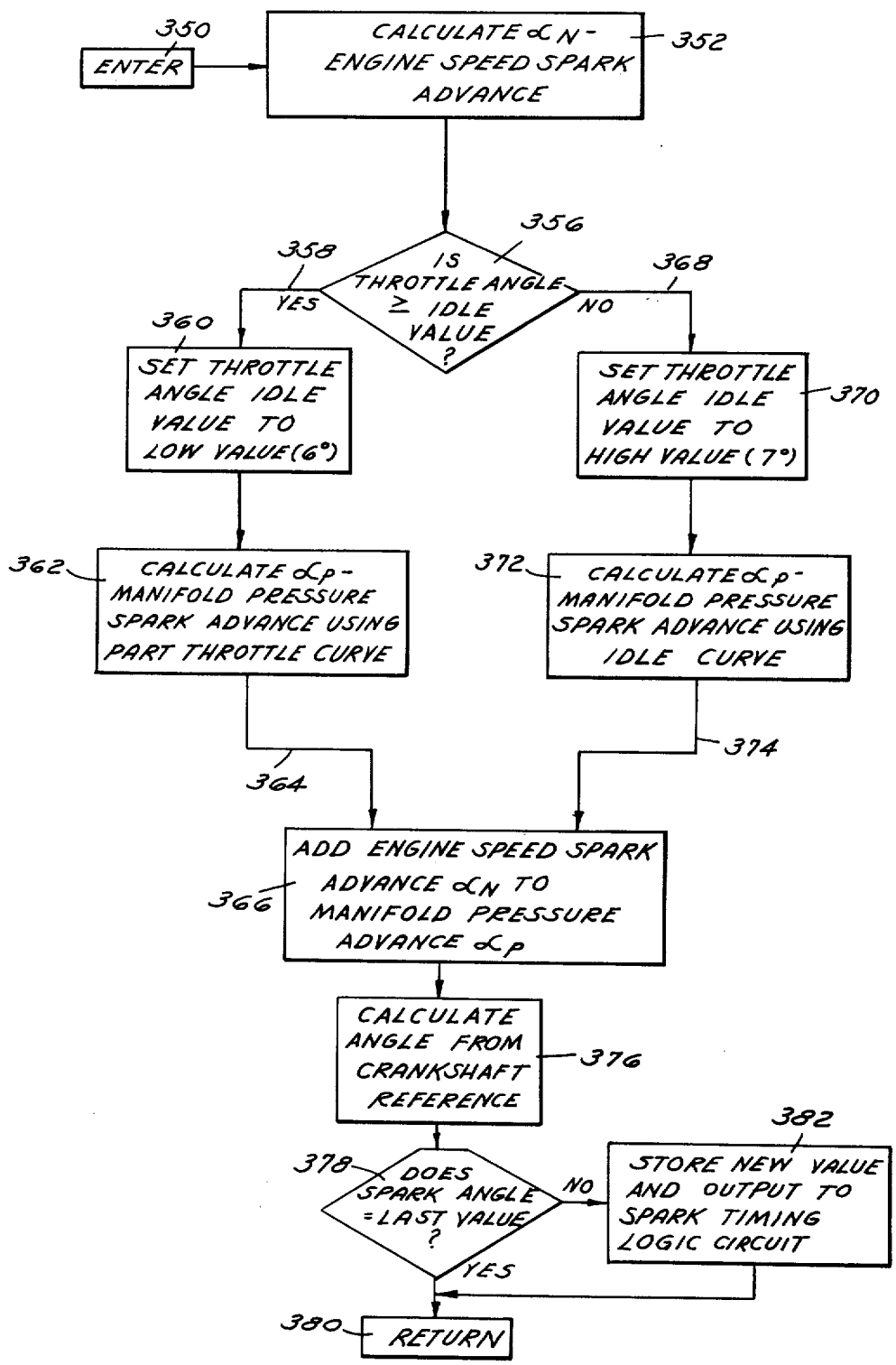

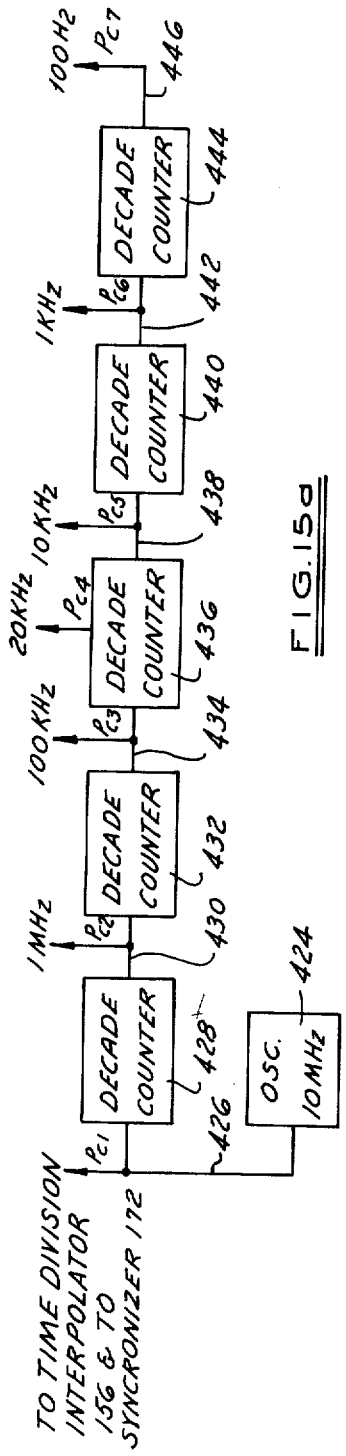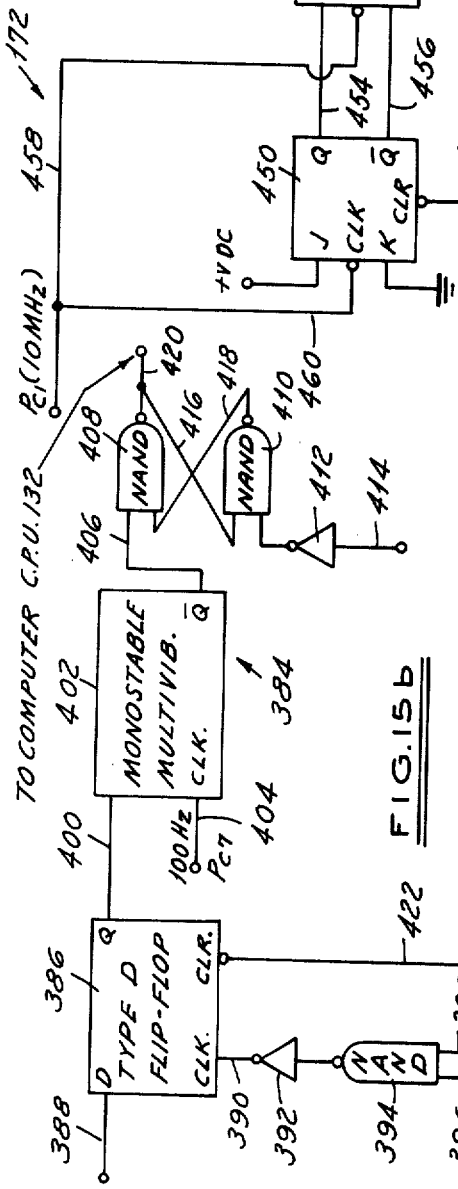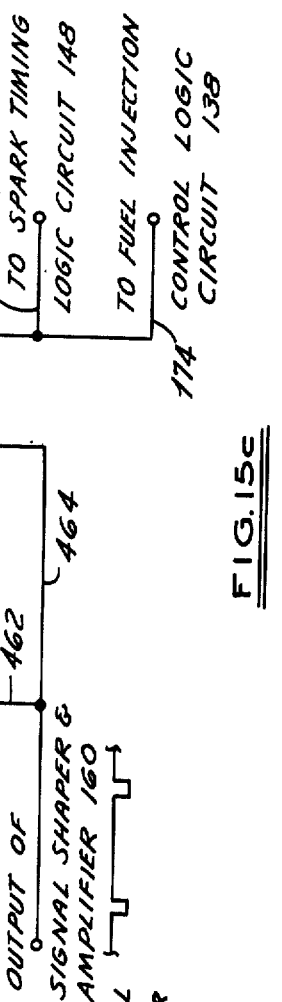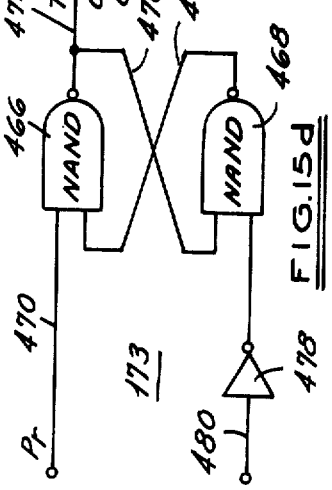

METHOD AND APPARATUS FOR ENGINE CONTROL

BACKGROUND OF THE INVENTION

This invention relates to a method and apparatus for the control of a combustion engine. While the general principles and teachings hereinafter disclosed are applicable to all combustion engines, the invention is hereinafter described in detail in connection with its application to a reciprocating, fuel-injected, spark-ignition internal combustion engine.

As used herein, the term "engine" refers to a device which converts heat energy, released by combustion of a fuel, into mechanical energy in a rotating output shaft of the engine. Also, the term "combustion" is defined as the rapid chemical union of a fuel with oxygen, accompanied by the liberation of useful heat energy. Also, as used herein, the term "binary number" means a number represented by a plurality of bits of information having either of two states.

In an engine, the energy conversion process takes place in a combustion chamber. Various means may be provided for controlling the characteristics of this energy conversion process. For example, means may be provided for controlling the amount of fuel metered into the combustion chamber, for controlling the amount of air supplied to the combustion chamber, for controlling the ratio of fuel to air, and, in a spark-ignition engine, for controlling the timing of sparks supplied to the engine. Also, a recent development used in connection with spark-ignition internal combustion engines for the purpose of effecting a reduction in undesirable exhaust emissions is exhaust gas recirculation (EGR). Where EGR is employed, it is very desirable to provide means for controlling the amount of exhaust gas recirculated to the engine combustion chamber.

A common feature of all engine control systems is that they employ means for sensing at least one condition of the engine while it is operative in effecting the energy conversion process. As a result of sensing this condition, one or more of the means for controlling the energy conversion process are adjusted to the extent required to obtain a desired result.

To illustrate what is meant by the phrase "means for controlling the energy conversion process of an engine", these being controlled variables, consideration may be given to a throttled, spark-ignition, fuel-injected internal combustion engine. In such case, the controlled variables are throttle angle, which controls the amounts of air supplied to the engine, fuel flow per cycle, fuel-injection timing, ignition timing, and, if EGR is used, the settings of the means used to control the amount of exhaust gases recirculated through the engine. To effect control of these variables that determine the characteristics of the energy conversion process, various engine conditions may be sensed while the engine is operative. Thus one or more of the following variable engine conditions may be sensed: crankshaft position, engine speed, mass air-flow into the engine, intake-manifold pressure, throttle angle, EGR-valve position, throttle-angle rate of change, engine-speed rate of change, fuel temperature, fuel pressure, EGR-valve rate of change, vehicle speed and acceleration, engine coolant temperature, engine torque, air-to-fuel ratio, exhaust emissions, etc. Other sensed conditions may include ambient temperature, ambient air pressure, humidity, transmission gear position, and perhaps others.

SUMMARY OF THE INVENTION

A main object of the invention is to employ a digital computer to calculate, on a real-time basis, that is, while the engine is operative, proper settings for one or more of the controlled variables from measurements made on one or more variable engine conditions. The method and apparatus of the invention provide a system which for the first time offers the possibility of a total system approach to engine control wherein account may be taken of the interactions of the various interdependent, variable conditions of engine operation. A very important feature of the invention is that it now is possible to eliminate the engine operating instabilities characteristic of prior art engine control systems and, by this elimination, to obtain equilibrium conditions of engine operation at all times.

The method and apparatus of the invention concerns the control of an engine used in the conversion of heat energy, released by the combustion of a fuel, into mechanical energy. The engine has at least one adjustable means for controlling the energy conversion process performed by it. While the engine is operative, an electrical signal is generated in the form of a binary number. This electical signal is indicative of a condition of the engine as of a selected instant in time. From this binary-number electrical signal indicative of a condition of the engine, a digital computer arithmetically calculates a value corresponding to a setting of the means for controlling the energy conversion process. The digital computer is programmed to calculate the control value from an algebraic function or functions describing a desired relationship between the sensed engine condition and settings of the means for controlling the energy conversion process. The resulting value, in the form of a binary number, is converted into a setting of the means for controlling the energy conversion process. The conversion of the binary number into a setting of the engine controlling means is accomplished with the aid of a suitable electrical circuit coupled between the digital computer and the engine controlling means.

The apparatus of the invention includes a digital computer having a central processing unit and a memory. The digital computer is connected, directly or indirectly, to the means for sensing the varying engine condition and is coupled to an electrical circuit used to adjust the settings of the energy-conversion-controlling means. The digital computer is programmed to calculate repetitively values corresponding to settings for the energy-conversion-controlling means from an algebraic function or functions describing a predetermined desired relationship between the sensed condition and the settings for the energy-conversion-controlling means. The results of the repetitive calculations are transformed by the electrical circuit into adjustments of the energy-conversion-controlling means.

The invention may be better understood by reference to the detailed description which follows and to the drawings. This detailed description of the invention is of an embodiment of the engine control system of the invention as it may be applied to a throttled, reciprocating, fuel-injected, spark-ignition internal combustion engine. It should be understood, however, that the principles and approaches taken in connection with this particular type of engine are applicable to other types as well.

BRIEF DESCRIPTION OF THE DRAWINGS

FIG. 3 is a flow diagram illustrative of the operation of the digital computer used to arithmetically calculate values for the adjustable engine energy-conversion-controlling devices, these devices being used to control fuel metering, EGR-valve position, and ignition-system spark-timing;

FIG. 4 is a detailed flow diagram illustrating the programming of the digital computer as it is used to control fuel metering in the engine;

FIG. 12 is a detailed flow diagram illustrating the programming of the digital compouter as it is used to calculate ignition-system spark-timing;

FIGS. 15a and 15b are, respectively, schematic diagrams for the engine control system clock-oscillator and time-interrupt circuits illustrated in block form in FIG. 1, FIG. 15c is a schematic diagram for the synchronizer circuit shown in block from in FIG. 1, and FIG. 15d is a schematic diagram for the $P_r$-interrupt circuit shown in block form in FIG. 1;

DETAILED DESCRIPTION OF THE INVENTION

Figure 1:
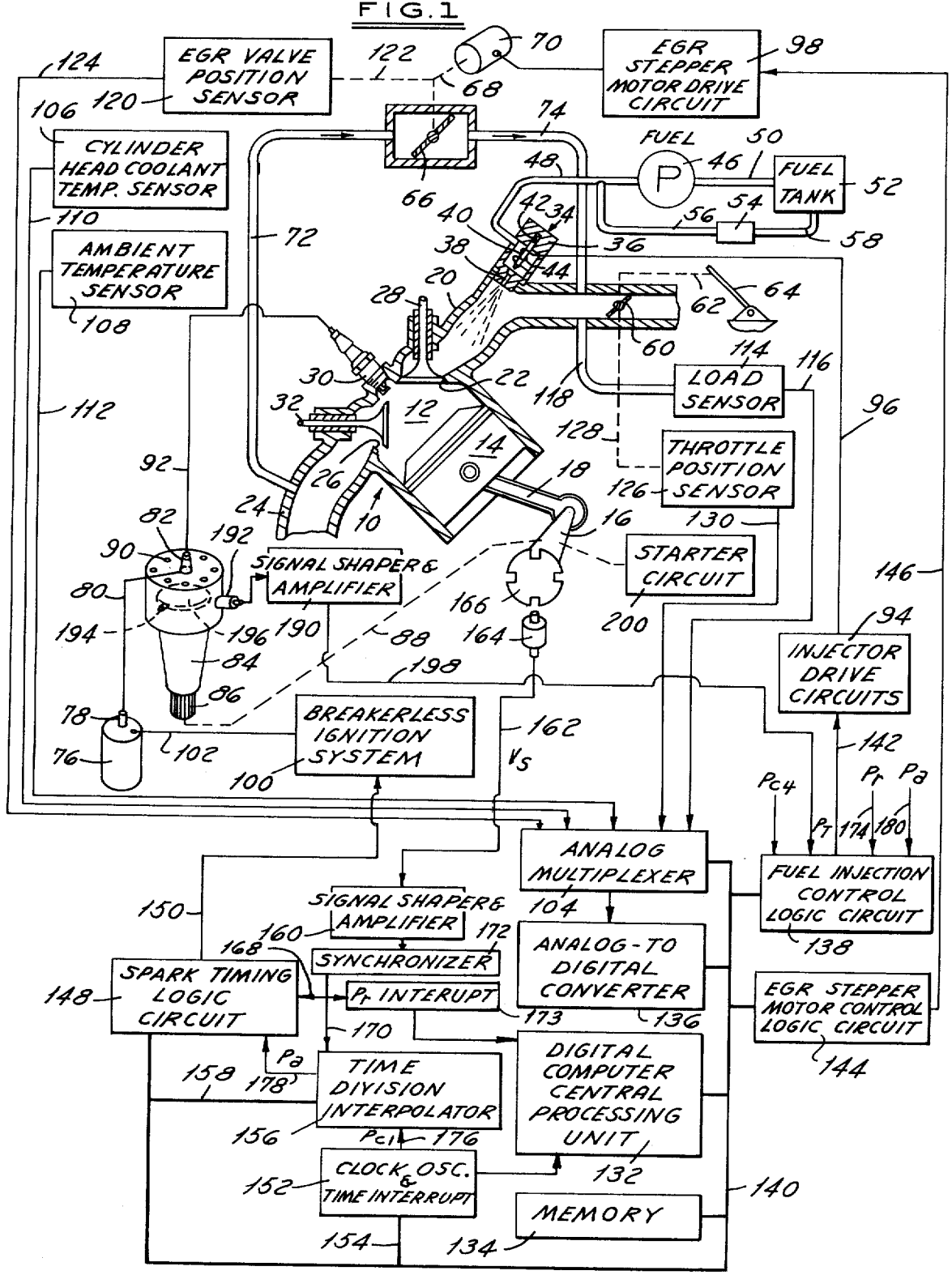
FIG. 1 is a schematic block diagram of an engine control system for a throttled, reciprocating, fuel-injected, spark-ignition internal combustion engine.

In the following description, the method and apparatus of the invention are embodied in an engine control system as applied to a Ford Motor Company 351 cubic inch, V-8, reciprocating, throttled, electronically fuel-injected, spark-ignition internal combustion engine. The controlled variables, that is, the adjustable variables selected to control or determine the characteristics of the engine's energy conversion process, are fuel-injection pulse-width, fuel-injection timing, EGR-valve position, and ignition-system spark-timing. Means are provided for adjusting, or setting, each of these controlled variables.

Adjustments of these controlled variables are made while the engine is operative in effecting the conversion of heat energy, released by the combustion of a fuel, into mechanical energy. A digital computer is employed to calculate arithmetically, repetitively and on a real-time basis, values corresponding to settings of the controlled variables. These values are calculated by the digital computer based upon a desired predetermined algebraic relationship established between the particular controlled variables involved and one or more conditions of the engine that are sensed during its operation.

In this embodiment of the invention, the controlled-variable fuel-injection pulse-width is algebraically related to the sensed conditions of engine load, as inferred from measurement of intake-manifold absolute pressure, and engine speed. Fuel-injection pulse width is also a function of ambient temperature and cylinder-head coolant temperature. With respect to the controlled-variable EGR-valve position, which determines the amount of engine exhaust gases recirculated to the combustion chambers of the engine, the sensed conditions to which it is algebraically related are throttle angle and engine speed. The remaining controlled variable determinative of the energy conversion process, that is, ignition-system spark-timing, is an algebraic function of engine load, as inferred from measurement of intake-manifold absolute pressure, and engine speed.

The desired algebraic relationships between the controlled variables and the sensed conditions are determined experimentally. At every instant in the operation of the engine, and over its entire range of operation, there exists optimum settings for the controlled variables. The definition of what is optimum is not fixed, but rather depends upon the use to which the engine is to be put and its state of operation at a particular instant. For example, where the engine and its control system are to be employed in a passenger car, the overall goal for the engine control system may be to maximize efficiency, fuel economy and torque while at the same time minimizing the emission from the engine of noxious pollutants. Also, for this passenger car engine control system, optimum settings for the controlled variables are different, for example, when it is decelerating than when it is operating at a steady speed or accelerating. To complicate matters further, the controlled variables, in this case fuel-injection pulse-width, fuel-injection timing, EGR-valve position, and ignition-system spark timing, are interdependent and this interdependence of the controlled variables should be taken into account by the engine control system in order to obtain stability of engine operation over its entire range. Thus, varying one of the interdependent controlled variables without regard to the others may result in unstable engine operation. In the present engine control system a total system approach is taken and the interdependence of the controlled variables is taken into account through the predetermined desired relationships established between the controlled variables and the sensed conditions of engine operation.

In the preceding paragraph, it was stated that the desired relationships between the controlled variables and the sensed conditions take into account the interdependence of the controlled variables and that these desired relationships are determined experimentally. To do this, a series of well-known and commonly-used tests are performed on a given engine type to determine the optimum desired relationships between the controlled variables and the sensed conditions. These tests may include dynamometer testing, vehicle emission testing, hot driveability testing, cold-start capability, fuel economy and acceleration. This testing may include the operation of the engine at a large number of possible engine speeds. At each of these engine speeds, the timing of the spark and the fuel delivery rate may be varied until the maximum torque output is obtained. This defines an envelope of engine operation at maximum power for each speed. With this as a basis, measurements may be made at all of the speeds and at intermediate values of output torque in a search for the minimum fuel flow and minimum spark advance that will produce the desired torque at the specified speed. The intake-manifold pressure may be measured at each of these points of operation and used as an independent measure of the torque performance of the engine. The resulting set of measurements define conditions of stable engine operation optimized for engine performance. Measurements may also be made of the emission levels of the engine, both at the points of maximum torque and at points slightly removed from these, for the ultimate purpose of obtaining a set of points discriptive of stable engine operation over the entire engine speed range, this set of points being optimized in some desired manner. In this way, the desired relationships between the controlled variables and the chosen sensed conditions are established. Once the desired relationships have been established for a particular type of engine, the engine control system for all engines of this type may be programmed accordingly.

In the idle and deceleration modes of engine operation, the controlled variables preferably are adjusted to provide smooth engine operation and emission of noxious pollutants. These usually are the only requirements for such modes of operation.

Overall Description

With reference to the drawings, wherein like numerals refer to like parts in the several views, and in particular to FIG. 1, there is shown a schematic block diagram of an engine control system embodying the method and apparatus of the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10. Pivotally connected to the piston 14 and crankshaft 16 is a connecting rod 18 used to produce rotation of the crankshaft 16 in response to reciprocation of the piston 14 within the cylinder 12.

An intake manifold 20 is connected with the cylinder 12 through an intake port 22. An exhaust manifold 24 is connected with the cylinder 12 through an exhaust port 26. An intake valve 28 is slidably mounted within the top of the cylinder 12, and, in cooperation with the intake port 22, it regulates the entry of combustion ingredients into the cylinder 12 from the intake manifold 20. A spark plug 30 is mounted in the top of the cylinder 12 for igniting the combustion ingredients within the cylinder 12 when the spark plug 30 is energized. An exhaust valve 32 is slidably mounted in the top of the cylinder 12 and, in cooperation with the exhaust port 26, regulates the exit of combustion products, exhaust gases, from the cylinder 12 into the exhaust manifold 24. The intake valve 28 and the exhaust valve 32 are driven through a suitable linkage with the crankshaft 16. This linkage (not shown) conventionally includes rocker arms, valve lifters, and a cam shaft driven by the crankshaft.

It is within the combustion chamber or cylinder 12 that the conversion of heat energy, released by the combustion of fuel and air, is converted into mechanical energy through the reciprocation of the piston 14 and resultant rotation of the crankshaft 16.

A fuel injector, generally designated by the numeral 34, includes a housing 36 having a fixed metering orifice 38. A plunger 40 is supported within the housing 36 for reciprocation between a fully-open position and a fully-closed position. In the fully-open position, the forward end of the plunger 40 is spaced from the orifice 38, and in the fully-closed position, the forward end of the plunger 40 is closed against the orifice 38. A bias spring 42 is seated between the rearward end of the plunger 40 and the housing 36 to bias the plunger 40 toward its closed position. An electrical winding 44 is electromagnetically coupled with the plunger 40. When the electrical winding 44 is energized by the presence of electrical current within it, the plunger 40 moves toward the fully-open position illustrated in the drawing. The length of the electrical pulse, that is, the pulse-width, applied to the electrical winding 44 determines the length of time the plunger is in its open position and, thus, determines the amount of fuel injected through the orifice 38 into the intake manifold 20.

A fuel pump 46 is connected to the fuel injector 34 by a conduit 48 and, by a conduit 50, to a fuel tank 52. Preferably, the fuel pump 46 is electrically operated and is capable of maintaining sufficient pressure to prevent vaporization of the fuel at high ambient temperatures and low intake manifold pressure. A fuel pressure regulator 54 is connected by a conduit 56 to the conduit 48 and by a conduit 58 to the fuel tank 52. Preferably, the pressure regulator 54 senses the pressure in the conduit 48 and the pressure within the intake manifold 20 to maintain the differential between these pressures, that is, the pressure differential across the fuel injection valve 34, at a constant level. This regulation is accomplished by a variation in the amount of excess fuel returned by the regulator 54 through the conduit 58 to the fuel tank 52.

The amount of air permitted to enter the combustion chamber through the intake manifold 20 is controlled by a butterfly throttle valve 60. The throttle valve 60 is connected by a mechanical linkage 62 to an accelerator pedal 64. The degree to which the accelerator pedal 64 is depressed controls, through the linkage 62, the degree of rotation of the butterfly valve 60. The greater the depression of the accelerator pedal, the greater the amount of air permitted to enter the intake manifold 20. The accelerator pedal 64 is manually controlled by the operator of the engine control system. Also, it is preferred that the throttle valve 60 be a two-bore throttle body (not shown) connected to the intake manifold 20, the throttle body being connected with atmospheric air through a conduit including an air filter (not shown).

In the operation of the engine 10, fuel is injected into the intake manifold 20 and mixes with the air therein. The engine is of the conventional four-cycle type. When the intake valve 28 opens, the air-fuel mixture enters the combustion chamber 12. An upward stroke of the piston 14 compresses the air-fuel mixture, which is then ignited by a spark produced by the spark plug 30 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve 32 opens and the exhaust gases are discharged into the exhaust manifold 24.

Most of the exhaust gases are discharged to the atmosphere through an exhaust system (not shown) which conventionally includes a muffler and an exhaust pipe. Some of the exhaust gases, however, are recirculated to the combustion chamber 12 via an exhaust gas recirculation (EGR) system. This EGR system includes a valve 66, which may be a butterfly valve connected by a mechanical linkage 68 to a stepper motor 70. The stepper motor 70 is electrically controlled and it determines the setting of the EGR valve 66 which, in turn, determines the amount of exhaust gases recirculated to the combustion chamber 12. The exhaust gases pass from the exhaust manifold 24, through a conduit 72 to the EGR valve 66, and then through a conduit 74 to the intake manifold 20.

Although the engine 10 as illustrated in FIG. 1 shows only one combustion chamber 12 formed by a cylinder and piston, nevertheless it should be understood that the particularly engine control system described herein is designed for use on an eight-cylinder engine. Thus, it should be understood that there are at a total of eight cylinders, intake valves, exhaust valves and reciprocating pistons, eight spark plugs to ignite the air-fuel mixtures within the combustion chambers, and eight fuel injectors. Only one EGR valve 66 and one throttle valve 60 are required for multi-cylinder applications; these valves may be assemblies having a plurality of flow passages and flow control members. Of course, for an eight-cylinder engine it is desirable to provide but one ignition coil and to use a distributor connected with the ignition coil to energize the eight spark plugs of the engine. For this purpose, the engine 10 includes an ingnition coil 76 having a high voltage terminal 78 connected by a lead 80 to a rotor 82 of a distributor 84. The rotor 82 is driven at one-half the rotational velocity of the crankshaft 16 by a gear 86 connected by a mechanical linkage 88 to the crankshaft. The distributor 84 has eight electrical contacts 90 each of which is connected in the usual manner by separate electrical leads to the eight spark plugs of the engine. Only one such electrical lead 92 is illustrated in FIG. 1. As the distributor rotor 82 rotates, it sequentially contacts the electrical contacts 90 to permit high voltage electrical energy to be supplied at appropriate intervals to the various spark plugs of the engine.

The distributor 84 does not control ignition-system spark-timing. Rather, spark-timing is an interdependently controlled variable calculated through the use of a digital computer in a manner hereinafter described. Nevertheless, the distributer 84 preferably includes a centrifugal mechanism (not shown) that may be of conventional design and which is utilized to assure that the rotor 82 will be sufficiently near the appropriate contact 90 for a given spark plug at times when sparks are to be generated across the gap of the given spark plug. This centrifugal mechanism is merely a mechanical device for assuring that sparks are distributed to the proper spark plugs, the exact timing of the sparks being determined elsewhere in the control system.

At this point in the description, it is to be understood that the illustrated eight cylinder internal combustion engine 10 is shown and described only to facilitate a more complete understanding of the engine control system embodying the inventive method and apparatus.

The air that is supplied to the engine 10 is manually controlled by the throttle valve 60. The other variables determinative of the energy conversion characteristics of the engine 10 are the amount of fuel supplied by the injectors 34 for mixture with the air admitted to the engine, the timing of fuel injection, the amount of EGR determined by the position of the EGR-valve 66, and ignition system spark timing. These are automatically controlled. For the purpose of controlling the amount of fuel metered to the engine, each of the fuel injectors 34 has an injector drive circuit 94 with which it is connected by means of a control line 96. The position of the EGR-valve 66 is varied by the stepper motor 70 actuated by an EGR stepper-motor drive-circuit 98. The actuator for the ignition system is a breakerless ignition system 100, which may be regarded as a switch connected by an electrical lead 102 to the ignition coil 76. When this switch 100 opens, a spark is generated in the appropriate spark plug 30.

The amount of fuel metered to the engine, this being determined by the width of the electrical pulses applied on the lines 96 to the fuel injectors 34, the fuel-injection timing, the EGR-valve position, and the ignition-system spark-timing are repetitively determined from arithmetic calculations performed by a digital computer, these calculations being based upon various conditions of the engine that are sensed during its operation. These sensed conditions vary as a function of the characteristics of the energy conversion process being performed by the engine 10, and include cylinder-head coolant temperature, ambient temperature, throttle position, engine load, and engine speed. The position of the EGR-valve also is sensed. With the exception of engine speed, these engine conditions form the inputs to an analog multiplexer 104. Thus, a cylinder-head coolant temperature sensor 106 and an ambient temperature sensor 108 are connected, respectively, by lines 110 and 112 to the analog multiplexer 104. The cylinder-head coolant temperature sensor 106 preferably is mounted in the engine cooling system upstream of the usual engine control thermostat and comprises a thermistor having a negative temperature coefficient. It is connected in an electrical circuit capable of producing a DC voltage having a variable level proportional to coolant temperature. The ambient temperature sensor 108 preferably is a thermistor device similarly connected in an electrical circuit and positioned to sense ambient temperature. A preferred location for this temperature sensor 108 is in the engine's air intake system somewhere upstream of the throttle valve 60.

A DC electrical signal having voltage proportional to engine load is provided by a load sensor 114 connected by a line 116 to the analog multiplexer 104. A true indication of engine load may be obtained by the measurement of both engine speed and output torque, but a satisfactory sensor for measuring engine output torque is not available at this time. Because of this, the load sensor 114 provides an inference of engine load by sensing the absolute pressure within the intake manifold 20. Thus, the load sensor 114 is connected by a conduit 118 to the intake manifold 20. Preferably, the load sensor 114 is a strain-gauge diaphragm-type absolute pressure transducer located in a position in the intake manifold wherein there is minimum exposure to transient pressure conditions. For the purposes of this patent application, the engine intake manifold absolute pressure is to be regarded as a signal indicative of engine load, even though the load may be a function of other variables as well.

An EGR-valve position sensor 120, connected by a mechanical link 122 to the EGR-valve 66, is connected by a line 124 to the analog multiplexer 104. Similarly, a throttle-valve position sensor 126, connected by a mechanical link 128 to the throttle valve 60, is connected by a line 130 to the analog multiplexer 104. Preferably, the EGR-valve and throttle-valve position sensors 120 and 126 are one-turn wire-wound potentiometers electrically connected in voltage divider circuits for supplying DC voltages proportional, respectively, to EGR-valve position and throttle-valve position.

The engine control system includes a general purpose digital computer capable of performing the arithmetic calculations of addition, subtraction, multiplication, and division on binary numbers. The digital computer comprises a central processing unit 132 in which the actual arithmetic calculations are performed and a memory 134. An analog-to-digital converter 136 is used to convert the analog sensor signals comprising the inputs to the analog multiplexer 104 into digital form.

Logic circuits interconnect the digital computer central processing unit 132 and its memory 134 with the various actuators for the controlled variables fuel-injection pulse-width, fuel-injection timing, EGR-valve positive, and ignition sytem spark timing. Thus, a fuel-injection-control logic circuit 138 is connected to the digital computer central processing unit 132 and to the memory 134 by a data bus 140. The output of the fuel-injection-control logic circuit 138 is supplied via a line 142 to the injector-drive circuits 94. Similarly, an EGR stepper-motor-control logic circuit 144 receives its input from the digital computer via the data bus 140 and its output connected by a line 146 to the EGR stepper-motor drive circuit 98. Likewise, a spark-timing logic circuit 148 is connected to the digital computer via the data bus 140 and has its output connected by a line 150 to the breakerless ignition system 100. The data bus 140 also is connected to the analog multiplexer 104, to the analog-to-digital converter 136, to clock-oscillator circuit and time-interrupt circuits 152 through a portion 154 of the data bus 140, and to a time-division interpolator 156 through a portion 158 of the data bus 140.

The engine control system requires means for providing a time base and time reference for use by the spark-timing logic circuit 148 and the fuel-injection-control logic circuit 138. The time base and time reference devices employed are also used to sense engine speed.

The time base and time reference function is performed by the time-division interpolator 156, the clock oscillator and time-interrupt circuits 152, a signal shaper and amplifier 160 that receives its input signals $V_s$ along a line 162 connected to a magnetic pickup transducer 164, a synchronizer 172, and a $P_r$-interrupt circuit 173.

The magnetic pickup transducer 164 contains an electrical coil which has an alternating voltage generated across its terminals as a result of changes in magnetic flux in its magnetic circuit. These flux changes are produced by a notched member 166 connected to the crankshaft 16 for rotation therewith. Preferably, the notched member 166 has four notches equally spaced so that a signal alternation occurs on the line 162 at each notch location, these being located 90 crankshaft degrees apart. The notched member 166 preferably is a part of the crankshaft damper conventionally used to reduce crankshaft vibrations in multi-cylinder engines. The signal shaper and amplifier 160 amplifies and shapes the alternating signal pulses $V_s$ produced by the magnetic pickup transducer 164 on the line 162. The output of the synchronizer 172 consists of time-synchronized pulses, which are denoted by the symbol $P_r$; these are fed via lines 168 and 170 to the spark-timing logic circuit 148 and the time-division interpolator 156, and also to the $P_r$-interrupt circuit 173. These crankshaft reference pulses $P_r$, spaced 90° of crankshaft rotation apart, are also fed via a line 174 to the fuel-injection-control logic circuit 138.

The time-division interpolator 156 uses the reference pulses $P_r$ fed to it on the line 170 and a clock-oscillator signal $P_{cl}$ obtained from the clock-oscillator circuit 152 on input line 176 to obtain pulses $P_a$ on a line 178 that forms an input to the spark-timing logic circuit 148. The time-division interpolator 156 divides the time interval between reference pulses $P_r$ into, preferably, approximately 256 $P_a$ pulses. Thus, the 90° interval between reference pulses $P_r$ is divided into 256 $P_a$ pulses, each of these $P_a$ pulses being spaced from one another by an amount equal to 90° divided by 256, or approximately 0.351° of crankshaft rotation. The angular-unit $P_a$ pulses also form an input 180 to the fuel-injection-control logic circuit 138.

Figure 2:
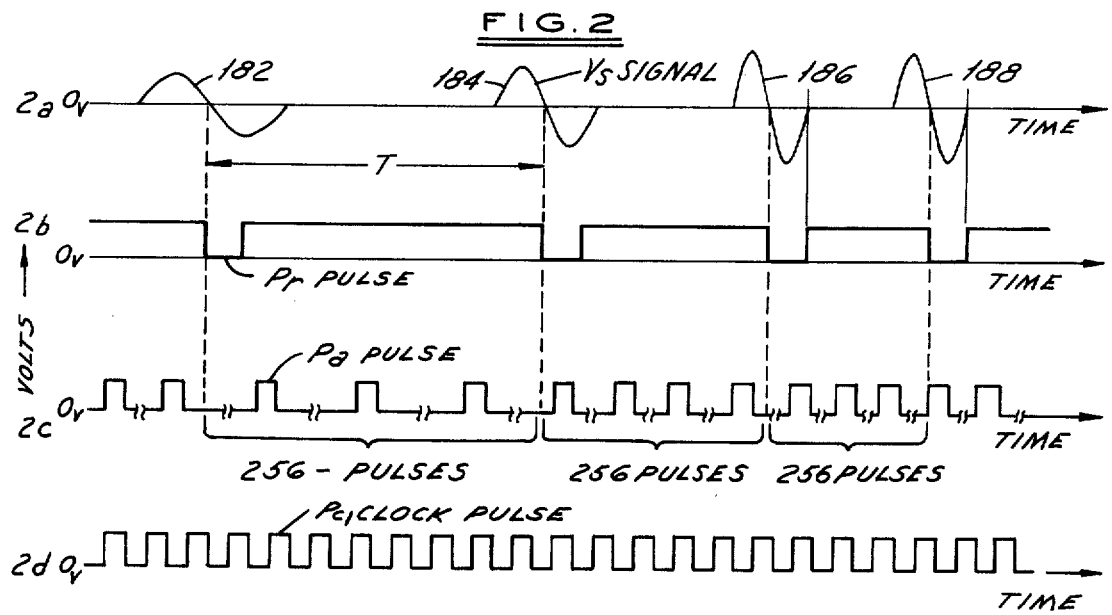
FIG. 2 contains four waveforms 2a, 2b, 2c and 2d obtained at various points in the schematic diagram of FIG. 1.

With particular reference now to FIG. 2, there are shown four voltage-versus-time waveforms for the signals $V_s$, $P_r$, $P_a$ and $P_c$. FIGS. 2a, 2b and 2c are drawn on the same time scale. FIG. 2d is drawn on a quite different time scale and it merely indicates the clock pulses $P_{cl}$ produced by the clock oscillator circuit 152 and supplied on line 176 to the time division interpolator 156. The frequently of the pulses $P_{cl}$ may be, for example, 10 megahertz (MHz).

FIG. 2a illustrates alternating signal waveforms $V_s$ that appear on the line 162 as the output of the magnetic pickup transducer 164. Four alternating signals 182, 184, 186 and 188 are shown. These four signals may be regarded as sequential alternating signals produced as each of the four notches in the rotating member 166 move past the magnetic pickup transducer 164. For purposes of illustration, it is assumed that the crankshaft 16 of the engine 10 is accelerating during this rotation until the occurrence of the signal 186, after which crankshaft angular velocity (engine speed) becomes constant. In FIG. 2a, the effect of the crankshaft acceleration on the alternating $V_s$ signals has been exaggerated. The alternating signal 182 has a large period and a relatively low amplitude as compared to the other $V_s$ signals. This corresponds to a low angular velocity of the crankshaft 16. As the angular velocity increases, the alternating signals increase in amplitude and decrease in period as indicated by the signal 184. Continued acceleration of the crankshaft 16 causes the next alternating signal 186 to be closer in time to the alternating signal 184 than was the signal 184 to the signal 182. Also, the signal 186 is greater in amplitude than the signal 184 and has a lesser period. Between the signals 186 and 188 there is no change in crankshaft angular velocity and, thus, the signal 188 is identical to the signal 186.

An understanding of the time base for the alternating $V_s$ signals can be obtained by consideration of the typical range of engine speed. At engine idle, the typical internal combustion engine may operate at 600 rpm and typical maximum engine speed may be about 6000 rpm. This corresponds to a speed range from 10 revolutions per second to 100 revolutions per second. With four notches in the rotating member 166, 40 alternating signals $V_s$ will occur per second at an engine speed of ten revolutions per second and 400 $V_s$ signals per second will occur at the maximum engine speed of 100 revolutions per second. Also, it should be noted that in two revolutions of the crankshaft 16, eight $V_s$ signals occur. During this two-revolution interval, all eight cylinders of the engine 10 will have gone through a cycle of air-fuel mixture intake, compression, ignition, power, and exhaust.

FIG. 2b illustrates the $P_r$ pulse output produced by the synchronizer 172. The signal shaper and amplifier 160 shapes the alternating $V_s$ signals to produce low-voltage, fixed-width pulses which then are time-synchronized by the synchronizer 172. The variable time period T between the onset of the resulting $P_r$ pulses corresponds very closely to the time period between the negative-going, zero-crossing points in the alternating $V_s$ signals. The time period T is inversely proportional to engine speed. A preferred signal shaper and amplifier 160 is described in detail, and is incorporated herein by reference, in commonly-assigned, copending U.S. patent application Ser. No. 329,922, filed Feb. 5, 1973, now Pat. No. 3,801,830, in the name of Wesley D. Boyer and entitled "Signal Amplification Circuit with Variable Signal Level Recognition Means".

FIG. 2c illustrates the $P_a$ pulses produced by the time-division interpolator 156. The time-division interpolator 156 produces a fixed number of pulses, preferably 256 pulses, during each of the variable time periods T between $P_r$ pulses. Thus, the time periods T, which correspond to 90° of rotation of the crankshaft 16 are divided into 256 parts by the $P_a$ pulses. For any given time period T, the $P_a$ pulses are equally spaced and one $P_a$ pulse occurs for each 90/256, or 0.351, degrees of crankshaft rotation. As is illustrated in FIG. 2c, the time interval between the pulses $P_a$ changes with changes in engine angular velocity, but each $P_a$ pulse continues to represent 0.351° of crankshaft rotation. Commonly-assigned co-pending U.S. patent application Ser. No. 314,047, filed Dec. 11, 1972 in the names of Alf L. Cederquist and Shaun S. Devlin, now Pat. No. 3,832,640, and entitled "Time Division Interpolator", describes in detail a preferred circuit for the time-division interpolator 156. This patent application includes a description of means for counting the number of clock pulses ($P_{cl}$) occurring in a time interval (T) between two consecutive pulses ($P_r$). This count is stored as a binary number until the next consecutive pulse ($P_r$) occurs. Preferably, engine angular velocity is arithmetically calculated, using the digital computer central processing unit 132, by the division of a constant by this binary number representative of the time interval between consecutive $P_r$ pulses.

With reference again to FIG. 1, it may be seen that another signal shaper and amplifier 190 is included in the circuit. The signal shaper and amplifier 190, which preferably is identical to the signal shaper and amplifier 160, is used to shape and amplify pulses produced by a magnetic pickup transducer 192 incorporated in the distributor 84. The magnetic pickup transducer 192 detects a point 194 on a rotatable member 196 in the distributor 84. When the point 194 passes the magnetic pickup transducer 192, an alternating signal is produced. This signal is indicative of a particular position of one of the pistons 14 of the engine 10. Thus, the signal shaper and amplifier 190 produces pulses, denoted by the symbol $P_T$, on its output line 198 that are fed to the fuel-injection-control logic circuit 138. Preferably, the signal $P_T$ occurs just prior to the closing of the intake valve for the number eight engine cylinder.

The FIG. 1 block diagram also includes a starter circuit 200 used to crank or start the engine 10. The starter circuit 200 is described hereinaftr in connection with the description of the breakerless ignition system 100.

Operation of the Engine Control System

Briefly summarized, the engine control system of FIG. 1 performs the operational steps of: causing the DC voltages representative of the sensed engine operating conditions to be converted into digital form and read into the memory 134 of the digital computer; from these sensed and converted values and using the digital computer central processing unit 132, calculating values for fuel-injection pulse-width and timing, EGR-valve position, and ignition-system spark-timing; and outputting these calculated values to the appropriate logic circuit used to convert them into changes of the settings of the controlled variables.

FIG. 3 is an overall flow diagram of the programming of the digital computer. The computer program is entered at point 202. At point 204 in the program, the digital computer, which shall be regarded as including the analog multiplexer 104, the analog-to-digital converter 136, the central processing unit 132, the memory 134, the $P_r$-interrupt circuit 173, and the clock oscillator and time-interrupt circuits 152, awaits the receipt of a $P_r$-pulse or a clock pulse $P_{c7}$. After the receipt of this $P_r$-pulse or $P_{c7}$-pulse, at the point 206, the time interval T between the most recent $P_r$-pulses is read into the computer memory. It is obtained, by the data bus 140, from the time division interpolator 156 where, as was previously mentioned, a binary number representing this time interval is stored in a counter. At a point 208 in the program, engine angular velocity, or speed, is calculated by dividing a constant $K_s$ by the binary number representing the interval between $P_r$-pulses. The value of the constant $K_s$ depends upon the units of angular velocity to be used.

Following this, the various inputs to the analog multiplexer 104 are, one by one, converted by the analog-to-digital converter 136 into digital form and read into the computer memory via the data bus 140. Thus, at point 210 in the program, the EGR-valve position signal on the line 124 is converted to digital form and read into the computer memory 134. Similarly, at point 212, the intake-manifold absolute-pressure signal on the line 116 is converted to digital form and read into computer memory, as is throttle position at point 214. At point 216, the ambient-temperature signal appearing on the line 112 is converted to digital form and read into the computer memory. Likewise, the cylinder-head coolant-temperature signal on the line 110 is converted to digital form and read into the computer memory at point 218 in the program.

At point 220, the fuel-delivery requirement, in the form of fuel-injection pulse-width and timing, is arithmetically calculated by the digital computer central processing unit 132 from an algebraic relationship programmed into the computer. This relationship defines fuel-injection pulse-width as a function of intake-manifold absolute pressure, engine speed, ambient temperature and cylinder-head coolant temperature.

At point 222 in the program, the digital computer central processing unit 132 calculates the required change in EGR-valve position. The EGR-valve position requirement is determined from an algebraic relationship which specifies this controlled variable in terms of engine speed and throttle angle.

The required ignition-system spark-timing is arithmetically calculated by the digital computer central processing unit 132 at point 224 in the program. This arithmetic calculation is made with the use of an algebraic relationship that specifies this controlled variable as a function of engine speed and intake-manifold absolute pressure.

At the point 226 in the program, the calculated values for fuel-injection pulse-width, fule-injection timing, EGR-valve position, and ignition-system spark-timing are transferred via the data bus 140 to, respectively, the fuel-injection-control logic circuit 138, the EGR-stepper-motor-control logic circuit 144, and the spark-timing logic circuit 148. The fuel-injection-control logic circuit 138 then sets the fuel-injection timing and the fuel-injection-pulse-width according to the calculated value for them. Similarly, the EGR-stepper-motor-control logic circuit 144 causes the EGR-stepper-motor drive circuit 98 to make a change in the position of the EGR-valve 66 if this is required. Also, the spark-timing logic circuit 148 sets the spark-timing by producing pulses on the line 150 connected to the breakerless ignition system 100 to cause an ignition spark to be produced at the time calculated by the computer.

At the point 228 in the program, the computer returns to the entry point 202 to await receipt of the next $P_r$-pulse or $P_{c7}$-clock pulse.

In the preceding paragraphs, the arithmetic calculations at points 220, 222, and 224 in the program of FIG. 3 were not described in detail. This detail is presented in the following subsections.

Computer Calculation of Fuel-Injection Pulse-Width and Timing

In the paragraphs which follow, the programmed use of the digital computer in arithmetically calculating values for fuel-injection pulse-width and timing is described in connection with FIGS. 4 through 6.

Except under certain engine operating conditions, the fuel-injection pulse-width is calculated as a function of engine speed, intake-manifold absolute pressure, ambient temperature, and engine-coolant temperature. The exceptions occur where the engine is being cranked, where its speed exceeds a predetermined upper limit, where the engine is idling, and where the engine is decelerating. If engine operation is not within one of these exceptional regions, then the fuel-injection pulse-width calculation proceeds as follows.

1. A wide-open-throttle (W.O.T.) fuel-injection pulse-width is calculated as the dependent variable in an algebraic function $f(N)$, where $N$ is engine speed.

2. If the engine is not actually operating with its throttle in a wide-open position, then a second fuel-injection pulse-width is calculated as a function of intake-manifold absolute pressure. This function $f(p)$ is then multiplied by an engine-speed correction-factor $C_N$ equal to the function $f(N)$ divided by a base function $f_1(N)$. If the engine is operating at wide-open-throttle, then the pulse-width value $f(N)$ is used.

3. The pulse-width value as calculated above is multiplied by an ambient-temperature correction-factor and by an engine-coolant-temperature correction-factor.

FIG. 4 is a flow diagram illustrating the above arithmetic calculation of fuel-injection pulse-width. At point 230 in FIG. 4, which corresponds to the point 220 of FIG. 3, the computer program is entered. At the point 232, a determination is made as to whether the engine is being cranked for the purpose of starting it. To make this determination, the computer looks at the interval T between $P_r$-pulses and determines if this value is greater than or equal to what the interval T would be during engine cranking. If the answer to this question is "yes", then the engine is turning at a speed less than or equal to crank-speed, the fuel-injection pulse-width is set at point 233 to a value suitable for engine cranking and the program proceeds on the line 234 to a decision at the point 236, this decision step being discussed hereinafter. If the answer to this question is "no", then at point 238, another determination is made. This determination is whether or not the interval T between $P_r$-pulses is less than an upper limit corresponding to a maximum speed, for example, 6000 rpm., of the engine. If the answer to this question is yes, it means that the engine is rotating at a speed above the maximum limit and, to prevent the engine from running away, the pulse-width-value is set at point 240 to zero and the program proceeds along the line 242 to the decision step at point 236. If the determination at point 238 is no, then at point 244 another determination is made as to whether or not the engine is idling. The answer to this question is yes if the throttle position is at an angle less than a fixed value, for example, 6° open, and if the engine is operating at a speed less than a predetermined value, for example, 800 rpm. If the engine is found to be idling, at program point 246 a pulse-width value may be calculated for the idle condition, and the program proceeds on the line 248 to the decision step at point 236. If the engine is not idling, then a determination is made at point 250 as to whether or not the engine is decelerating.

Whether or not the engine is decelerating may be found by determining if the actual engine speed is greater than a predetermined value, for example, 1000 rpm, and then by determining if the manifold absolute pressure is less than a predetermined value, for example, 200 millimeters Hg. If the engine speed is over the specified predetermined value and the manifold pressure is less than the specified predetermined value, then the engine may be said to be decelerating and the program proceeds to the point 252 where the pulse-width value is set at or close to zero. From the point 252, the program proceeds on the line 254 to the decision step at point 236. If the engine is not decelerating, then the program proceeds to the point 256 wherein engine speed is used to find the fuel-injection pulse-width value $f(N)$.

Figure 5:
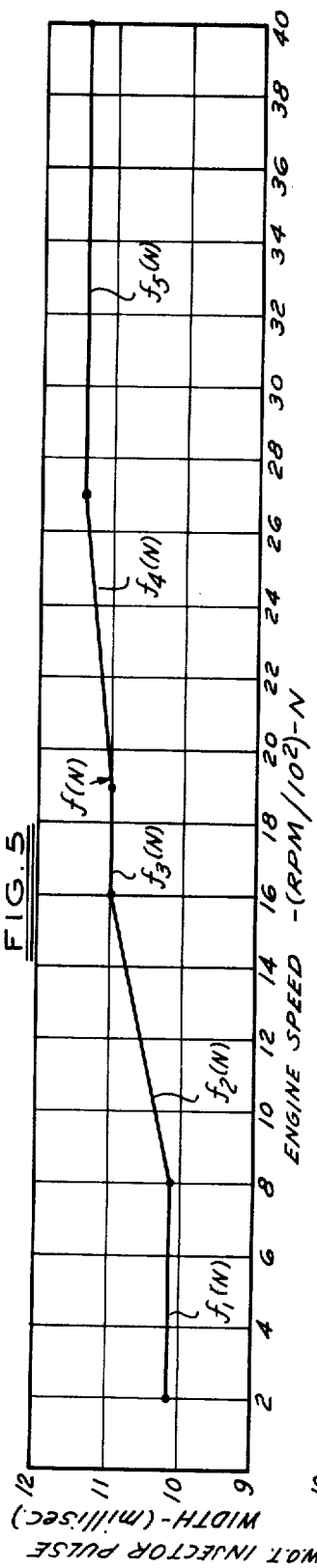
FIG. 5 is a graph of engine speed versus wide-open-throttle fuel-injection pulse-width.

The manner in which the pulse-width value $f(N)$ is determined may best be seen in FIG. 5. In FIG. 5, the wide-open-throttle fuel-injection pulse-width $f(N)$ is plotted in units of milliseconds against engine speed N in units of rpm/$10^2$. The actual desired relationship between wide-open-throttle fuel-injection pulse-width and engine speed is exactly described by a complex, non-linear curve. The function $f(N)$ very closely approximates this complex, non-linear curve by dividing it into a predetermined number of linear functions $f_1(N), f_2(N), f_3(N), f_4(N)$ and $f_5(N)$. These linear functions of N are of the algebraic form $y=ax+b$ where $a$ is a constant equal to the slope of the linear function and $b$ is a constant equal to the y-intercept. The digital computer uses the function $f_1(N)$ in the engine speed range from 200 to 800 rpm, uses the function $f_2(N)$ in the speed range from 800 to 1600 rpm, etc. These speed ranges are programmed into the computer, as are the values of the constants $a$ and $b$ for each of the functions $f_1(N), f_2(N)$, etc. Thus, the digital computer in calculating the wide-open-throttle fuel-injection pulse-width function $f(N)$ simply looks at the engine speed previously read into the computer memory, selects constants $a$ and $b$ for the linear equation to be used in the range in which the engine speed falls, and makes the calculation of $f(N)$ by multiplying the engine speed by the constant $a$ and by adding to that product the value of the constant $b$.

After the calculation of $f(N)$ has been made at the point 256 in FIG. 4, the program proceeds to a determination step at a point 258. The determination at point 258 is whether or not the angular position of the throttle is greater than or equal to a predetermined wide-open-throttle value. This value, for example, may be 83°. If the throttle angle is equal to or greater than the predetermined value, the program proceeds to the point 260 which specifies that the pulse-width value $f(N)$ is to be used. If the throttle angle is less than the predetermined wide-open-throttle value, then the program proceeds along a line 262 to a point 264 wherein the intake-manifold absolute pressure is used to calculate a part-throttle pulse-width value $f(p)$.

Figure 6:
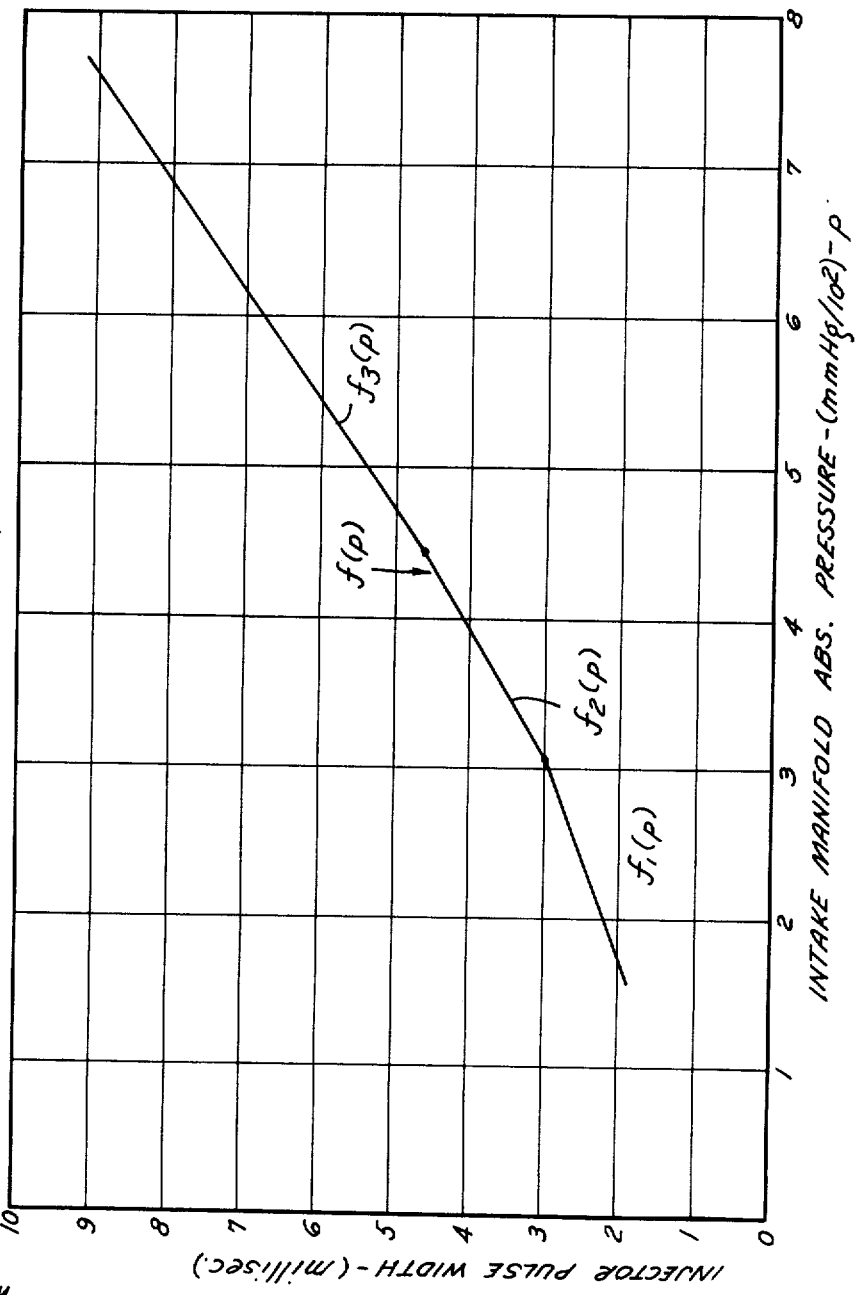
FIG. 6 is a graph of intake-manifold absolute pressure versus fuel-injection pulse-width.

In FIG. 6, fuel-injection pulse-width $f(p)$, in units of milliseconds, is plotted on the ordinate axis of the graph and intake-manifold absolute pressure $p$, in units of millimeters Hg/$10^2$, is plotted on the abscissa. The function $f(p)$ is formed from three linear segments $f_1(p), f_2(p)$ and $f_3(p)$. Thus, the function $f(p)$ is formed from three linear functions used in different ranges of intake-manifold absolute pressure. These linear functions are of the algebraic form $y=ax+b$. The linear function $f_1(p)$ is used for calculating part-throttle fuel-injection pulse-width $f(p)$ where the intake-manifold absolute pressure $p$ is less than 304.8 mm Hg. The linear function $f_2(p)$ is used where the pressure $p$ is between 304.8 and 444.5 mm Hg, and the function $f_3(p)$ is used where the pressure $p$ is greater than 444.5 mm Hg.

Upon completion of the step at point 264 in the program of FIG. 4, the calculated part-throttle pulse-width $f(p)$ has an engine-speed-related correction-factor $C_N$ applied to it. This occurs at program point 266. The correction-factor $C_N$ is equal to th pulse-width value $f(N)$, calculated at the program point 256, divided by a base pulse-width function $f_1(N)$. From FIG. 5, it may be seen that if the engine speed is between 200 and 800 rpm, the correction-factor $C_N$ is equal to $f_1(N)/f_1(N)$, or unity. At higher engine speeds, the correction-factor $C_N$ is greater than unity. Upon completion of the calculation of the correction-factor $C_N$ at step 266 in the program, the part-throttle pulse-width value $f(p)$ is multiplied by the correction factor $C_N$. The program then proceeds along a line 268 to a point 270, which states that the result, either from part-throttle calculation steps 264 and 266 or wide-open-throttle step 260 is the pulse-width value, uncompensated for temperature, The pulse-width value obtained at the point 270 in the program must be compensated for both ambient temperature and engine-coolant temperature. The functions $f(N)$ and $f(p)$ of FIGS. 5 and 6, respectively, describe the desired fuel-injection pulse-width for the conditions in which the ambient temperature is 72°F and the engine coolant is at a normal operating temperature. Where the ambient temperature is other than 72°F, even when the engine is at a normal operating temperature, a correction for the variation in ambient temperature must be made. Similarly, when the engine is cold and its coolant temperature thus is low, the amount of fuel supplied to the engine should be greater than when the engine is at normal operating temperatures.

The program proceeds along line 272 to a point 274 at which the ambient-temperature correction is made by the multiplication of the pulse-width value obtained at point 270 by a correction-factor equal to 532/(460+ambient air temperature °F). Simply expressed, this ambient-temperature correction-factor is equal to the Rankine absolute temperature equivalent of 72°F divided by the Rankine equivalent of the actual ambient air temperature. The result of this correction-factor multiplication step is, at a point 276 in the program, a pulse-width value that has been corrected for actual ambient air temperature.

Figure 7:
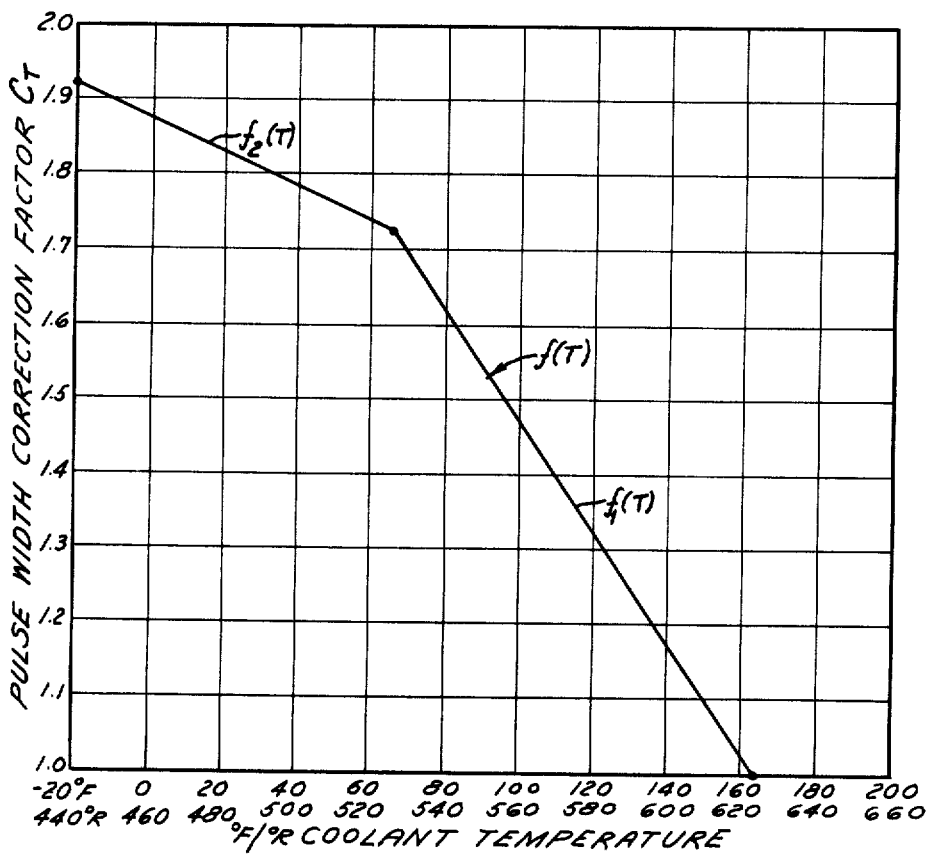
FIG. 7 is a graph of fuel-injection pulse-width correction-factor versus engine coolant temperature.

The pulse-width value at the point 276 in the program then is corrected for engine-coolant temperature at a point 278 in the program. Specifically, the pulse-width value at point 276 is multiplied by an engine-coolant-temperature correction-factor $C_T$. The correction-factor $C_T$ is plotted, in FIG. 7 as a function $f(T)$ of engine-coolant temperature. The function $f(T)$ comprises two linear portions $f_1(T)$ and $f_2(T)$ each of the algebraic form $y=ax+b$. Upon completion of this calculation, a temperature-corrected pulse-width value is obtained, and the program proceeds along the line 280 to the decision step at program point 236.

At the point 236 in the program, the pulse-width value appearing on one of the program lines 234, 242, 248, 254, or 280 is checked to determine if it is greater than or equal to some predetermined maximum value. If the pulse-width is greater than or equal to the maximum, then at a point 282 in the program, the pulse-width value is limited to the predetermined maximum value. If the pulse-width value inputted to the point 236 is less than the maximum, then the program proceeds along the line 284 to a determination at a point 286 in the program.

At the point 286, a determination is made as to whether or not the newly-calculated pulse-width requirement has changed from the value calculated the previous time. If it has not changed, then the program proceeds along a line 288 to a point 290 wherein the program returns to entry point 230. However, if the calculated fuel-injection pulse-width has changed from the previous calculation, then the program proceeds to a point 292 in the program where the newly calculated pulse-width value is stored in the computer memory so that it will be available for comparison with the next calculated fuel-injection pulse-width value.

The program then proceeds to a determination point at location 294 in the program. The determination at point 294 is whether or not the engine is being cranked. If it is, the fuel-injection pulse-width selected for use during engine cranking is set. If the engine is not cranking, the pulse-width value stored in computer memory at point 292 is used in a time conversion process at a point 296 in the program.

It may be desirable always to terminate fuel injection at the same points in time relative to the closing of the intake valves 28. In this embodiment of the invention, fuel injection from a given injector is always terminated at the closing of the intake valve associated with such injector. To accomplish this, the time at which fuel injection is initiated must be varied. The purpose of the conversion process performed at point 296 is to determine the points, in terms of crankshaft angular positions, at which fuel injection is to be initiated by the energization of the respective fuel injectors 34 in order to assure that fuel injection will be terminated at particular angular points in the rotation of the crankshaft 16 corresponding to the closing of the respective engine intake valves. This function can be easily performed by the digital computer through the simple expedient of having it programmed to calculate the number of $P_a$ pulses (a measurement of angular rotation of the crankshaft) which the calculated pulse-width value, in units of time, represents at the angular velocity at which the engine is operating at the moment, this engine velocity value having previously been read into the computer memory. Upon completion of the conversion of the pulse-width value to angular units expressed as a number of $P_a$ pulses, this number of $P_a$ pulses is divided by 256, 256 being the number of $P_a$ pulses that occur between successive closings of the engine intake valves. (Since there are 256 $P_a$ pulses between successive crankshaft reference pulses $P_r$, which occur every quarter revolution of the crankshaft 16, and since one engine intake valve closes each quarter revolution of the crankshaft, there also are 256 $P_a$ pulses between successive intake valve closings). The quotient obtained as a result of this division by 256 represents the whole number of intervals, each interval being equal to the time between successive intake valve closings, that will be occupied during energization of a given fuel injector. Stated another way, it is necessry at times for each of the fuel injectors to remain open for more than one-quarter of a crankshaft revolution. The quotient specfies how many whole quarter-revolutions, and the remainder obtained as a result of the division by 256 specifies, in units of $P_a$ pulses, the remaining fractional amount of a quarter-revolution that the fuel injectors are to be energized.

After the digital computer has converted the pulse-width value to a number of $P_a$ angular units and divided this number by 256 to obtain a quotient and a remainder, it then subtracts the remainder from 256. The resulting difference is equal to the number of angular unit pulses $P_a$ that must occur between the closing of an unspecified engine intake valve and the energization of an unspecified fuel injector. In other words, the difference is the delay time, in angular units, between the closing of an intake valve and the energization of some unspecified fuel injector. Which fuel injector is energized depends upon the position of the crankshaft 16 and upon the value of the quotient obtained as a result of the aforementioned division of 256.

At the point 298 in the program, the computer outputs three binary numbers to the fuel-injection-control logic circuit 138. One of these numbers is the difference or delay time, expressed in angular pulse units $P_a$, obtained as described in the preceding paragraph. The second binary number is the quotient obtained by the division by 256 described above. The third binary number is the pulse-width valve, expressed in units of time, the time units in the present embodiment being equal to the electrical period of a 20KHz clock signal. The first (delay time) binary number is used to determine when an unspecified fuel injector is to be energized, the second binary number (quotient) is used, along with crankshaft position, to determine which fuel injector is to be energized at a given time, and the third binary number (pulse-width value) is used to determine the length of time the fuel injectors are to be energized. Of course, these three binary numbers need not be outputted to the logic circuit 138 until after the settings for EGR-valve position and ignition-system spark-timing have been calculated by the digital computer.

Computer Calculation of EGR-Valve Position

At the program point 222 in FIG. 3, it was stated that the digital computer arithmetically calculates the required change in EGR-valve position. The details of this calculation are described in the following paragraphs in connection with FIGS. 8 through 11.

Figure 9:
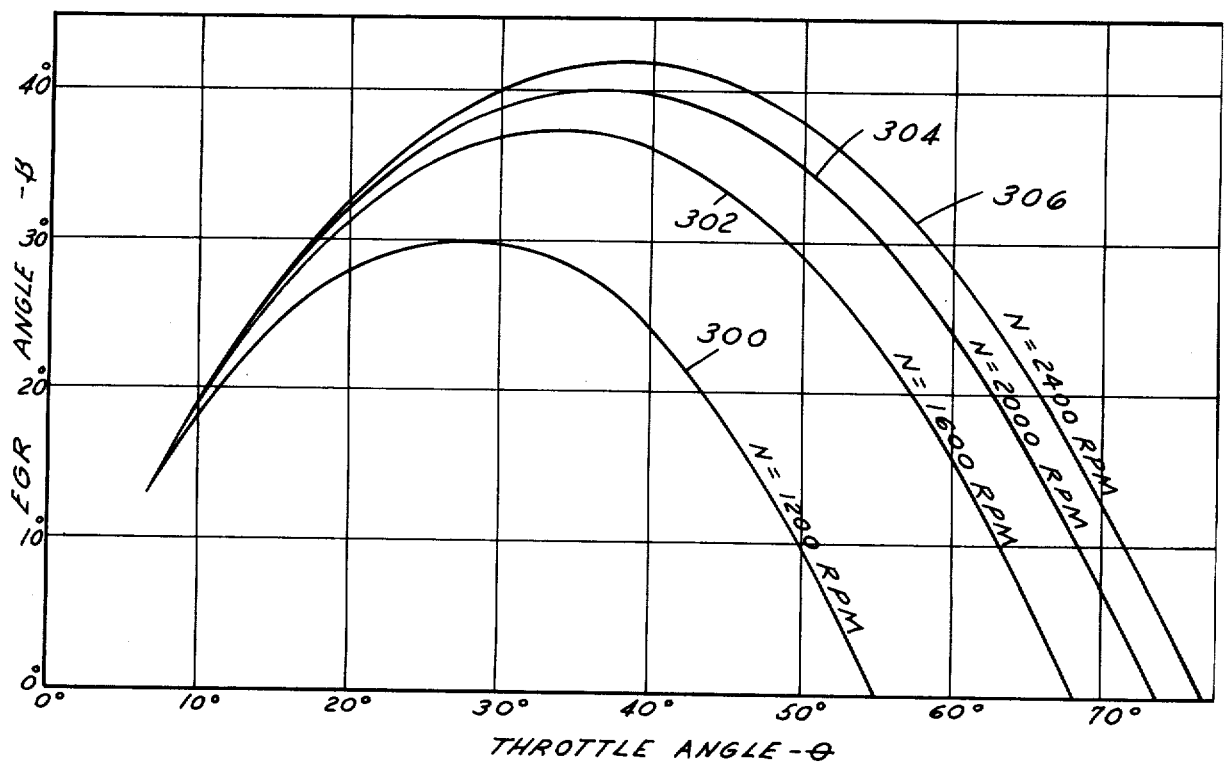
FIG. 9 is a graph of a family of curves representing EGR-valve-angle $\beta$ versus throttle angle $\theta$, each curve being for a different engine speed.

If the EGR-valve 66 is of the butterfly type, then its fully-closed position may be given the designation of zero degrees and its fully open position may be set equal to 90°. In such case, the desired relationship between EGR-angle $\beta$ and throttle angle $\theta$ is shown in FIG. 9. FIG. 9 contains a family of curves 300, 302, 304, and 306 relating the controlled-variable EGR-angle $\beta$ to the throttle angle $\theta$ at a number of different engine speeds N. Each of the curves in FIG. 9 is non-linear. Due to the difficulty in programming a digital computer to calculate a value from a non-linear function having two independent variables, a simplified approach is taken to the calculation of EGR-angle $\beta$. This simplified approach involves the digital computation of values for a series of linear equations relating the EGR-angle $\beta$ to the engine speed N and throttle angular positiom $\theta$. Mathematicaly, the EGR-angle $\beta$ is related to engine speed N and throttle angle $\theta$ as follows:

$$\beta = \theta C_A$$

where $C_A$ defined as the EGR-angle coefficient and $$C_A = 2.2 - 0.04 K_N \theta$$

$K_N$ is defined as an engine-speed correction-factor. $K_N$ is a non-linear function of engine speed N, but it is linearized by dividing the non-linear function into a number of linear portions having the algebraic form $y=ax+b$.

Figure 8:
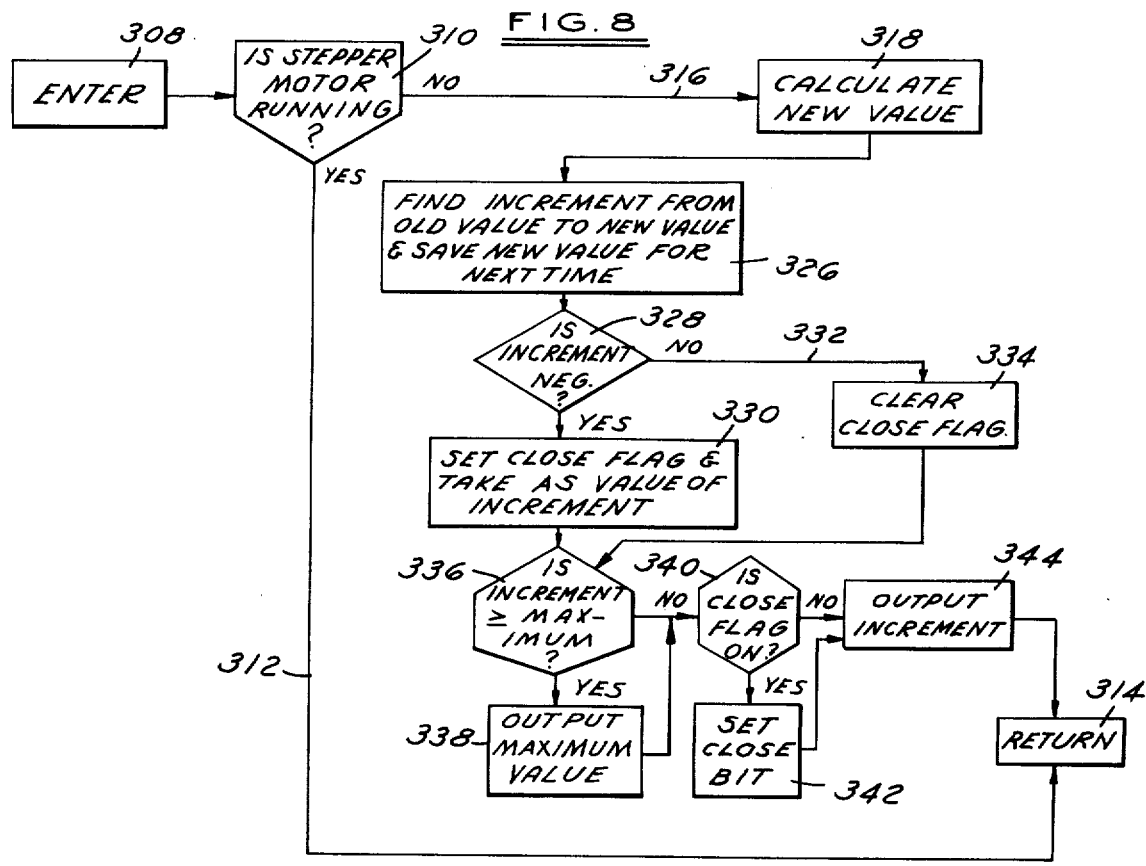
FIG. 8 is a detailed flow diagram for the digital computer as programmed for the arithmetic calculation of EGR-valve position.

If the above-described relationships are combined, it is found that:

EGR-angle $\beta$ = $\theta C_A$
= $\theta(2.2 - 0.04 K_N \theta)$
= $2.2\theta - 0.04 K_N \theta^2$ With reference now to FIG. 8, there is shown a detailed program for the digital computer, this program corresponding to the point 222 in the overall program illustrated in FIG. 3. In FIG. 8, the program is entered at the point 308 and immediately proceeds to a decision at a point 310. At 310, a determination is made as to whether or not the EGR-valve stepper-motor 70 is running. If the answer to this question is affirmative, the program proceeds along a line 312 to a point 314 which returns the program to the beginning at point 308.

If the stepper-motor 70 is not running, the program proceeds along a line 316 to a point 318 at which a new value for EGR-valve position is calculated.

Figure 10:
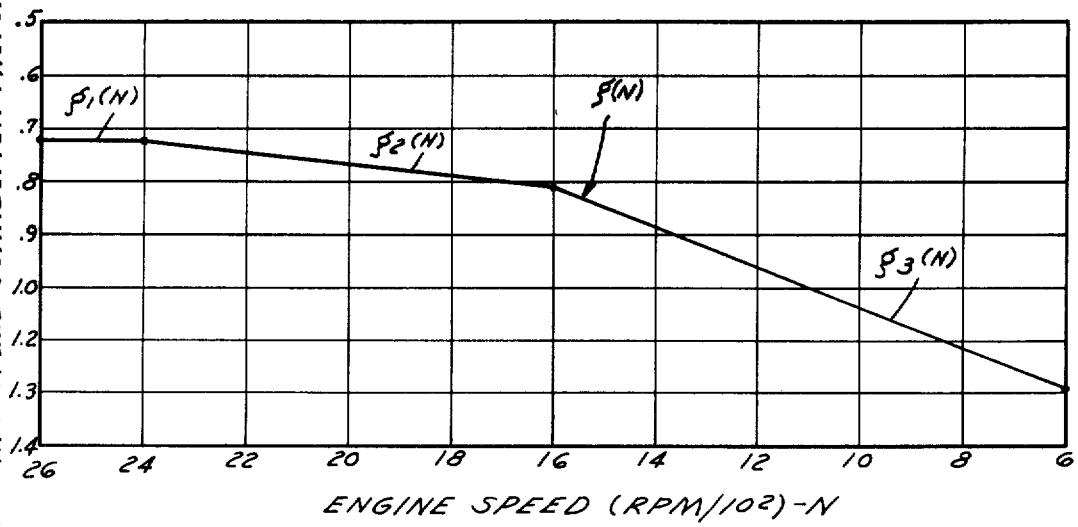
FIG. 10 is a graph of engine-speed correction-factor $K_N$ versus engine speed, this correction factor $K_N$ being used in EGR-valve-position calculation.
Figure 11:
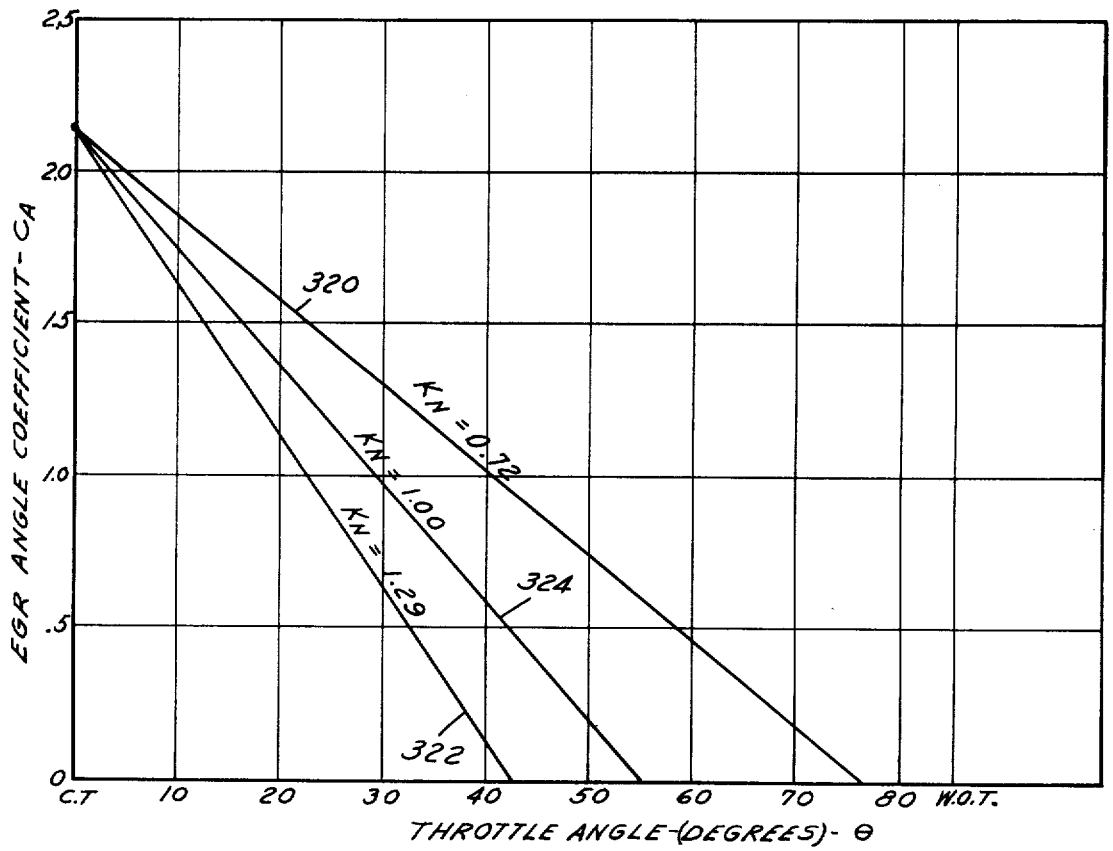
FIG. 11 is a graph of EGR-angle-coefficient $C_A$ versus throttle angle $\theta$ for three values of engine-speed correction factor $K_N$.

The manner in which the new EGR-valve position value is calculated is described in connectin with FIGS. 10 and 11. FIG. 10 illustrates the engine-speed correction-factor $K_N$ plotted as a function of engine speed N. The non-linear relationship is approximated by the linear curves $g_1(N)$, $g_2(N)$ and $g_3(N)$. Thus, in the engine speed region from 600 to 1600 rpm, the correction-factor $K_N$ is calculated with the use of the function $g_3(N)$. In the region of engine speed from 1600 to 2400 rpm, the linear function $g_2(N)$ is used to calculate $K_N$. Similarly, the function $g_3(N)$ is used in the engine speed region above 2400 rpm.

FIG. 11 is a family of straight line curves defined by the equation $$C_A = 2.2 - 0.04 K_N \theta$$

In FIG. 11, the linear equation is plotted for three values of the engine-speed correction-factor $K_N$. From FIG. 10 it may be seen that the minimum value for the correction-factor $K_N$ is 0.72 and that the maximum value for $K_N$ is 1.29. The curve 320 in FIG. 11 illustrates the relationship between the EGR-angle coefficient $C_A$ and the throttle angle $\theta$ for the minimum value of $K_N$. Similarly, the curve 322 illustrates the relationship between the EGR-angle coefficient $C_A$ and throttle angle $\theta$ where $K_N$ equals 1.29, its maximum value. For the intermediate value of $K_N$ equal to 1.00, the relationship is as indicated by the curve 324.

Thus, after the computer has calculated the value for $K_N$ from the relationship expressed in FIG. 10, the EGR-angle coefficient $C_A$ is calculated from the equation $$C_A = 2.2 - 0.04 K_N \theta$$

Specifically, the computer obtains the throttle-angle value $\theta$ previously read into memory, multiples this value by the value calculated for $K_N$, and by the constant 0.04, and subtracts this product from 2.2 to obtain the value of the EGR-angle coefficient $C_A$. The required EGR-angle $\beta$ then is calculated by multiplying the calculated value for $C_A$ by the throttle angle $\theta$.

From FIG. 8, it may be seen that after the new value for the EGR-angle $\beta$ has been calculated at the point 318, the program proceeds to a point 326 whereat the increment from the old value for EGR-angle $\beta$ is determined. Also, at this point in the program the newly calculated value for EGR-angle $\beta$ replaces the old value thereof in the computer memory. The program then proceeds to the decision point at 328 where a determination is made as to whether or not the increment from the old value is positive or negative. If the increment is negative, then the program proceeds to a point 330 at which an electrical signal (flag) is set to indicate that the EGR-valve is to be moved toward the closed position rather than toward a more open position. The flag is used to produce an electrical signal (bit) supplied to the EGR stepper-motor-control logic circuit 144 to assure that the EGR stepper-motor drive-circuit 98 turns the motor 70 in the appropriate direction to move the EGR-valve 66 toward a more closed position. On the other hand, if the increment is positive, the program proceeds along a line 332 to a point 334 where the "close flag" is cleared.

The program then proceeds to a decision point at 336 where it is determined whether or not the absolute value of the increment is greater than or equal to a predetermined maximum value. If it is greater than the maximum value, at a point 338, the program will output the maximum value and proceed to a point 340. If the increment is less than the maximum value, than the program proceeds to point 340 at which it is determined if the flag indicating that the EGR-valve is to move toward a more closed position is present. If it is present, an electrical bit is set at the program point 342 and it, together with the value of the increment, is outputted at a point 344 to the EGR stepper-motor-control logic circuit 144. If the flag is not present, the increment only is outputted. The program then proceeds to the point 314 where a return to the program entry point 308 is indicated.

Computer Calculation of Ignition-System Spark-Angle

The computer calculations of ignition-system spark-angle, or, spark timing, is described in connection with FIGS. 12 through 14. FIG. 12 is a flow diagram of the computer program and corresponds to the point 224 in the FIG. 3 diagram of the overall computer program.

The ignition-system spark-angle $\alpha$ is calculated by the digital computer from the algebraic relationship:

$$\alpha = \alpha_N + \alpha_p$$

where $\alpha_N$ is a function $h(N)$ of the engine speed N and where $\alpha_p$ is a function $h(p)$ of the engine load as inferred from intake-manifold absolute pressure $p$. The digital computer first calculates the engine-speed spark-advance $\alpha_N$ and then calculates the engine-load spark-advance $\alpha_p$. It adds these calculated values together to obtain the calculated ignition-system spark-angle $\alpha$. Once the value for $\alpha$ has been calculated, it is then possible to calculate the angular delay, from a spark reference, at the end of which the spark is to be initiated. This delay is equal to a constant, the maximum advance angle, minus the spark advance $\alpha$, and it is this delay value which is outputted to the spark-timing logic circuit 148 indicated in FIG. 1.

With reference now in particular to FIG. 12, it may be seen that the computer program for spark-angle calculation is entered at a point 350. From this point, the program proceeds to a point 352 at which the engine-speed spark-angle $\alpha_N$ is calculated by the computer.

Figure 13:
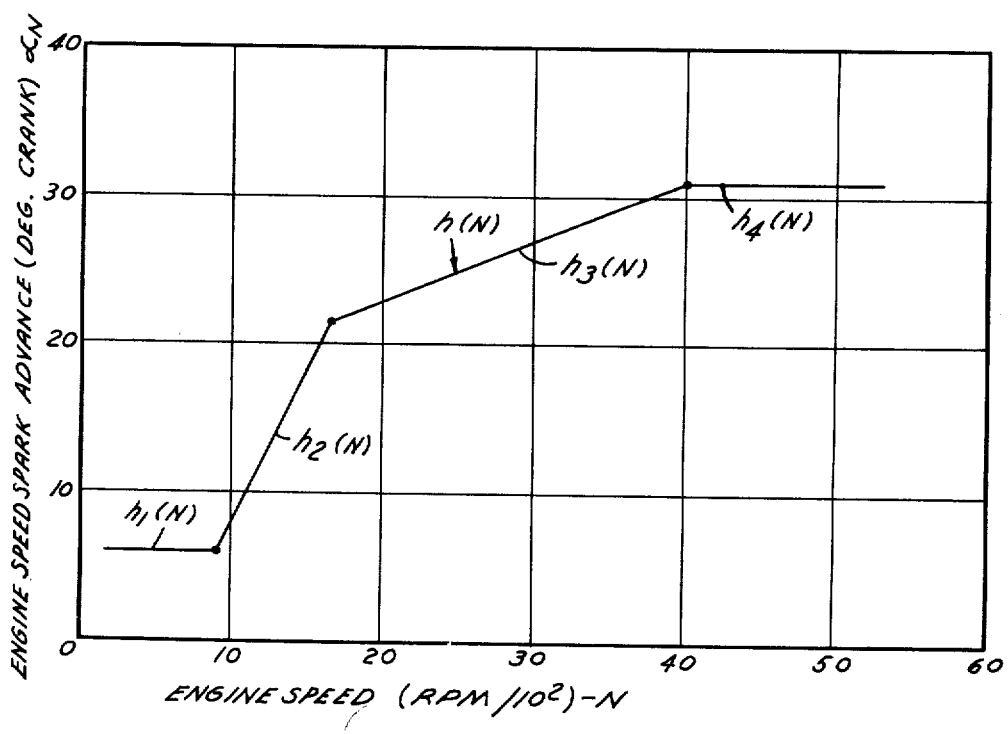
FIG. 13 is a graph of engine-speed spark-advance $\alpha_N$ versus engine speed N.

FIG. 13 is a graph of the engine-speed spark-advance angle $\alpha_N$ plotted on the ordinate of the graph in units of crankshaft degrees. Engine speed N, in units of rpm/10², is plotted on the abscissa. The algebraic function descriptive of the actually-desired relationship between engine-speed spark advance $\alpha_N$ and engine speed N is complex and non-linear. To avoid the use of this complex and non-linear function in the computer calculation, the function is closely approximated by a function $h(N)$. The function $h(N)$ comprises four functions $h_1(N)$, $h_2(N)$, $h_3(N)$, and $h_4(N)$ of the linear general elgebraic form $y=ax+b$. The function $h_1(N)$ is used in the engine-speed range from cranking speed to 900 rpm and the function $h_2(N)$ is used in the engine-speed range from 900 to 1650 rpm. The function $h_3(N)$ is used in the engine-speed range from 1650 rpm to 4000 rpm, and the function $h_4(N)$ is used for engine speeds in excess of 4000 rpm. Thus, the digital computer calculates the engine-speed spark-advance $\alpha_N$ by selecting the appropriate linear function for the actual engine speed, by multiplying this engine speed by the slope of the linear curve, a constant stored in the computer memory, and by adding to this product the value of the stored constant representing the y-axis intercept of the linear function. After this calculation of $\alpha_N$ has been completed, the computer proceeds to the calculation of $\alpha_p$.

Figure 14:
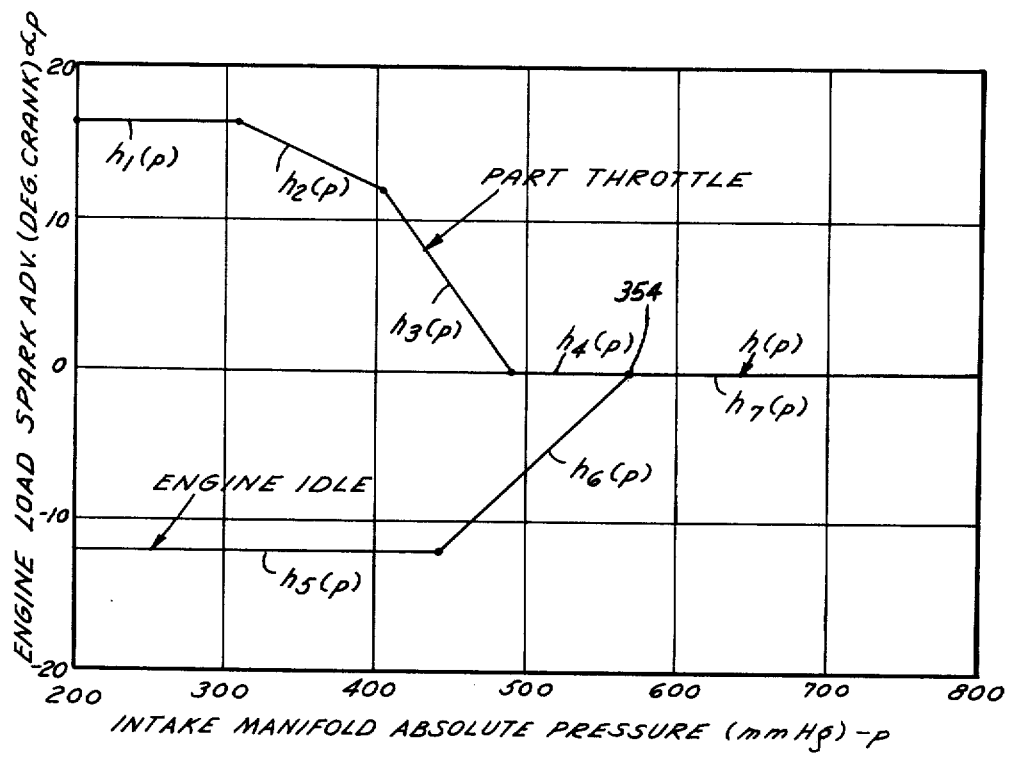
FIG. 14 is a graph of engine-load spark-advance $\alpha_p$ versus engine intake-manifold absolute pressure.

In order to understand the computer program for calculating the engine-load spark-angle $\alpha_p$, it is necessary to observe the desired relationship between $\alpha_p$ and the intake manifold absolute pressure $p$ illustrated in FIG. 14. In FIG. 14, it may be seen that the desired relationship is complex, non-linear, and is approximated by a function $h(p)$ comprised of a series of linear functions $h_1(p)$ through $h_7(p)$ of the general algebraic form $y=ax+b$. It may be observed that the function $h(p)$ divides at a point 354, corresponding to an intake-manifold absolute pressure of about 570 mm Hg into a part-throttle spark-advance curve and an engine-idle spark-retard curve. The part-throttle curve is comprised of the linear functions $h_1(p)$, $h_2(p)$, $h_3(p)$, and $h_4(p)$. The idle spark-retard curve is comprised of the linear functions $h_5(p)$ and $h_6(p)$. The part-throttle curve is used when the throttle angle is above a predetermined value, and the engine-idle curve is usd when the throttle angle is below the predetermined value. The predetermined value determinative of which of the curves is to be used in calculating $\alpha_p$ may be either of two small throttle-angle values, that is, either 6° or 7°. Whether this predetermined idle value is 6° or 7° depends upon how it has been set during the previous computer calculation of engine-load spark-angle $\alpha_p$.

With this background discussion of the relationship between the engine-load spark-angle $\alpha_p$ and the intake-manifold pressure, the remainder of the flow diagram of FIG. 12 may be better understood. In FIG. 12, the program proceeds from the point 352, at which the engine-angle $\alpha_N$ is calculated, to a point 356 at which a decision is made relative to the calculation of $\alpha_p$. This decision is whether or not the throttle angle is greater than or equal to the predetermined idle value of either 6° or 7°, whichever value has previously been set in the computer memory. If the throttle angle is greater than or equal to this predetermined idle value, then the computer program proceeds along a line 358 to a point 360. At the point 360, the predetermined throttle-angle idle value is set to its low value, that is, 6° and this value is retained in the computer memory for use at the point 356 during a subsequent calculation of ignition-system spark-timing. Following the setting at the point 360 of this predetermined throttle-angle idle value, the program proceeds to a point 362 at which the engine-load spark-angle $\alpha_p$ is actually calculated using the part-throttle curve of FIG. 14. In making this calculation, the computer uses the intake-manifold absolute pressure to determine which of the linear functions of the part-throttlecurve is to be employed in computing $\alpha_p$, and following this determination, actually calculates $\alpha_p$ by following this determination, actually calculates $\alpha_p$ by multiplying the manifold pressure by the constant representing the slope of the linear function and by adding thereto the value of the ordinate intercept for that function. The program then proceeds along a line 364 to a point 366.

If at the point 356 it is found that the throttle angle is less than the predetermined idle value of either 6° or 7°, the program proceeds along a line 368 to a point 370. At the point 370, the predetermined throttle-angle idle value is set to 7° and is stored in the computer memory for use at the point 356 in a subsequent computer calculation of ignition-system spark-angle. Following this, the program proceeds to a point 372 where the engine-load spark-angle $\alpha_p$ is calculated using the engine-idle curve of FIG. 14.

The computer uses the intake-manifold absolute pressure $p$ to select the appropriate engine-idle-curve linear function $h_5(p)$ or $h_6(p)$ or $h_7(p)$. The value of $\alpha_p$ then is calculated and the program proceeds along a line 374 to the point 366.

At the point 366, the value of the engine-load spark-angle $\alpha_p$, calculated at either the point 362 or the point 372, is added to the engine-speed spark-angle $\alpha_N$ to obtain the total ignition-system spark advance.

The total ignition-system spark-advance calculated at the point 366 in the program is the number of crankshaft degrees at which an ignition spark is to occur before (or after) a piston reaches its top-dead-center position at the end of its compression stroke. In order to control spark occurrence, it is necessary to use a carnkshaft reference angle, preferably the maximum angle of spark advance, and to calculate the difference between the previously-calculated spark angle and this crankshaft reference. This difference is expressed as a binary number in units of $P_a$ pulses (one $P_n$ pulse equals 0.351 crankshaft degrees) In the program, this occurs at a point 376. At a point 378 in the program, a determination is made as to whether the difference value calculated at the point 376 differs from the previously-calculated value. If the newly calculated difference value is equal to the value previously calculated, then the program proceeds to a point 380 where the program returns to the entry point 350. On the other hand, if the new difference value differs from the value previously calculated, then the newly calculated value is stored in the computer memory and also is outputted to the spark-timing logic circuit 148. This occurs at a point 382 in the computer program, after which the program proceeds to the return point 380.

The digital Computer and Associated Equipment

The inventors have used a Digital Equipment Corporation Model No. 11/20 CA, PDP/11 digital minicomputer in the practice of the invention. A Model No. MM11E read/write core memory also was used. An analog multiplexer and analog-to-digital converter compatible with this computer equipment also has been employed, as has a Digital Equipment Corporation Model No. KE11-A extended arithmetic element.

This computer equipment has been employed due to its commercial availability. However, its storage and processing capability far exceeds that required in the engine control system described herein. A preferred computer central processing unit and memory would have lesser storage capability, would occupy less space, and would, of course, be less expensive.

The data bus 140 in FIG. 1 is the link between the digital computer central processing unit 132 and its memory 134 and the other components in the engine control system illustrated. The bus 140 may include both an address bus and a data bus or, alternatively, one bus may be used for both address and data transmission. Also, a commercially available item of electronic equipment, which may be referred to as an address selector, is used in conjunction with the digital computer and its associated data bus.

The address selector (not shown in the drawings) may be regarded as an electronic package having as its input the address and data bus 140. The address selector has a number of output terminals which are connected to various points in the various circuits hereinafter described in detail. In terms of electrical signals, the outputs of the address selector are either at a HI voltage condition or a LO voltage condition. In general, for a given address appearing in digital form on the address bus, the address selector produces HI or LO voltage signals at one of its output terminals and a HI voltage at another of its output terminals. With respect to the terminal on which a HI or LO voltage appears, a HI voltage indicates that the information appearing on the data bus is to be transferred from the digital computer, and a LO voltage indicates that information is to be transferred, via the data bus, into the computer. The other output terminal, on which a HI voltage appears, is connected to logically control or actuate a particular circuit to which information on the data bus is to be transferred or from which information is to be obtained. The address selector may be a Digital Equipment Corporation model number M-105 address selector.

The Clock Oscillator and Time-Interrupt Circuits

In connection with the description of the engine control system generally illustrated in FIG. 1, it was stated that the overall engine control system timing functions were performed by time-interrupt and clock-oscillator circuits 152 and by $P_r$-interrupt circuit 173. FIG. 15a is a detailed schematic diagram of the clock oscillator circuit and FIG. 15b is a detailed schematic diagram of the time-interrupt circuit.

In the clock-oscillator circuit of FIG. 15a, a 10 MHz oscillator 424 is used to provide the basic high frequency pulses. The output of the oscillator 424 is applied through a lead 426 to the time-division interpolator 156 and also to decade counter 428. For every ten pulses produced by the oscillator 424, the decade counter 428 produces one pulse at its output 430. Thus, the signal occurring at output lead 430 has a frequency of 1 MHz. The signal on the lead 430 is supplied to another decade counter 432 which, similarly, produces a 100 KHz signal at its output lead 434. A decade counter 436 connected to the lead 434 produces a 10 KHz signal at its output lead 438. The signal at the lead 438 is applied to another decade counter 440 which produces a 1 KHz signal on its output lead 442. The 1 KHz signal on the lead 442 is converted by a decade counter 444 to a 100 Hz signal at its output terminal 446. It should be noted that frequencies other than those previously mentioned may be obtained from intermediate points within the decade counters. For example, a 20 KHz signal can be obtained from the decade counter 436. In summary, the clock oscillator circuit provides various frequencies for use at selected points in other electrical circuits. The various clock signals are designated $P_{c1}$ through $P_{c7}$.

The function of the time-interrupt circuit of FIG. 15b is to cause the digital computer to initiate the program illustrated generally in FIG. 3 at uniform time intervals, that is, upon the occurrence of $P_{c7}$ pulses produced at output lead 446 of the clock oscillator. The time-interrupt circuit is generally designated by the numeral 384. It includes an edge-triggered type D flip-flop 386, having its Q-output connected by a lead 400 to the "enable" input of a monostable multivibrator 402. The clock-input 404 of the multivibrator 402 is supplied with the 100 Hz pulses $P_{c7}$ from the clock oscillator. The Q-output 406 of the monostable multivibrator 402 is applied to one input of a NAND-gate 408 the other input to which is connected by a lead 418 to the output of a NAND-gate 410. The NAND-gate 410 has two inputs, one of which is the output of the NAND-gate 408 obtained via a lead 416 and the other of which is the output of an inverter 412. The input to the inverter 412 is a HI-voltage level reset signal applied to lead 414 by the computer central processing unit 132 upon completion of its program in the manner outlined in FIG. 3.

The D-input 388 to the flip-flop 386 is either a HI or LO signal, it is HI if it is desired to use uniform time-interval pulses $P_{c7}$ to initiate progression through the computer program for calculating and setting fuel-injection timing and pulse width, EGR rate, and spark timing, and it is LO if some other control signal, such as engine-speed-related pulses $P_r$, is to be used to initiate progression through the computer program. The D-input 388 also is set HI if either a $P_{c7}$ clock pulse or a $P_r$-pulse, whichever occurs first, is to initiate progression through the computer program. (At low engine speeds, it may be desirable to use clock pulses $P_{c7}$ only or both clock pulses and $P_r$-pulses, whichever occurs first, to initiate progression through the program, whereas at higher engine speeds it may be more desirable to use only the engine-speed-related $P_r$-pulses, which then occur more frequently, to initiate the program.) The D input 388 may be set either HI or LO manually, for example, with a switch, or automatically by a flag signal generated by the computer or a peripheral circuit, for example, as a function of engine speed.

The flip-flop 386 has a clear input 422 to which is applied a LO voltage pulse whenever the engine control system is first put into operation (turned on); this produces a LO output signal at the Q-output 400 of the flip-flop 386. Thereafter, a HI voltage signal is applied to the clear-input 422 of the flip-flop 386, and, if the D-input 388 is HI, the leading edge of a positive-going signal applied to the clock-input 309 of the flip-flop 386 causes the Q-output 400 to become HI and remain in that state until another leading edge occurs at a time when the D-input 388 is LO or until a LO voltage pulse occurs on the clear-input 422.

As long a the Q output 400 of the flip-flop 386 is HI, the monostable multivibrator 402 produces a LO-going pulse of fixed duration at its Q-output 406 each time a clock pulse $P_{c7}$ is applied to its clock-input 404. Whenever the Q-output 406 goes to a LO-level, the NAND-gate 408 produces a HI signal at its output 420 which is connected to the computer central processing unit 132. When the computer central processing unit 132 receives this time-interrupt signal on output 420, it initiates the computer program and acknowledges such receipt by applying a HI level pulse to the lead 414. The output of the inverter 412 becomes LO which, in turn, insures a HI level signal on the output 418 of the NAND-gate 410. This resets the NAND-gate 408 to permit the cycle to be repeated upon occurrence of the next clock pulse $P_{c7}$.

From the above, it is apparent that the leading edge of a positive-going pulse applied to the clock-input 390 of the flip-flop 386 causes a HI signal to appear at its output. The clock-input 390 is obtained from an inverter 392 the input to which is the output of a NAND-gate 394. The NAND-gate 394 has two inputs 396 and 398 which are connected to the address selector previously described. When the computer central processing unit 132 is to use clock pulses $P_{c7}$ to initiate each sequence of programmed calculations of the controlled engine variables, a HI-level signal is applied to the D-input 388 of the flip-flop 386 and thereafter an address on the bus 140 causes the address selector to produce HI level signals at the inputs 396 and 398 of the NAND-gate 394. This produces a LO signal at its output which, in turn, causes the inverter 392 to produce the positive-going leading edge at the clock-input 390 of the flip-flop 386.

The Synchronizer Circuit

This circuit is shown in FIG. 15c. As was previously described, the signal shaper and amplifier 160 (FIG. 1) produces LO-going pulses that occur at a frequency proportional to the speed of the engine crankshaft 16. The function of the synchronizer circuit 172 is to time-synchronize the signal shaper and amplifier 160 output pulses by delaying each of them until after the occurrence of a high-frequency clock pulse $P_{cl}$. Except for this insignificant delay, the $P_r$-pulses, which are the output of the synchronizer circuit, are identical to the output pulses of the signal shaper and amplifier 160.

The synchronizer circuit 172 comprises two edge-triggered JK flip-flops 450 and 452. The Q-output of flip-flop 450 is connected by a lead 454 to the K-input of flip-flop 452, and the $\overline{Q}$-output of flip-flop 450 is connected by a lead 456 to the J-input of flip-flop 452. The K-input of flip-flop 450 is connected to ground. The clock-inputs 460 and 458, respectively, of the flip-flop 450 and 452 are supplied with 10 MHz pulses $P_{cl}$ from the clock oscillator circuit. The LO-going output pulses from the signal shaper and amplifier 160 are supplied via leads 462 and 464, respectively, to the clear-inputs of the flip-flops 450 and 452.

To facilitate an understanding of the operation of the synchronizer circuit 172, let it be assumed that initially the signal shaper and amplifier 160 output is at a HI voltage level. This means that the Q-output of the flip-flop 450 is HI and its $\overline{Q}$-output is LO; as a result, the K-input to flip-flop 452 is HI and its J-input is LO. At this time, the $\overline{Q}$-output of the flip-flop 452 is HI. When the leading edge of the LO-going pulse from the signal shaper and amplifier 160 occurs at the clear-inputs 462 and 464 of the flip-flops 450 and 452, both JK flip-flops are cleared. The $\overline{Q}$-output of the flip-flop 452 remains HI, but the $\overline{Q}$-output of the flip-flop 450 goes HI and this is applied to the J-input of flip-flop 452; the Q-output of the flip-flop 450 goes LO and this is applied to the K-input of flip-flop 452. When the pulse from the signal shaper and amplifier 160 becomes HI once again, the next clock pulse causes the $\overline{Q}$-output of the flip-flop 452 again to become LO. However, the Q-output of the flip-flop 450 will go HI on this clock pulse and its $\overline{Q}$-output will go LO. Since these outputs then are applied to the flip-flop 452 K and J inputs, respectively, the next clock pulse causes the $\overline{Q}$-output of the flip-flop 452 to become HI once again. Thus, the $\overline{Q}$-output of the flip-flop is a LO-going pulse having a duration equal to the time between $P_{cl}$ clock pulses.

The Q-output of the flip-flop 452 is the previously described $P_r$-pulses. The $P_r$-pulses are used in various circuits, as is indicated in FIG. 15c.

The $P_r$-Interrupt Circuit

The $P_r$-interrupt circuit is shown in FIG. 15d. Its function is to generate a signal upon the occurrence of a $P_r$-pulse that will then initiate the progression of the computer central processing unit 132 through the computer program illustrated in FIG. 3. Thus, the $P_r$-interrupt signal produced by the $P_r$-interrupt circuit 173 has the same effect on the computer, that is, initiating progression through the computer program, as does the time-interrupt signal produced by the time-interrupt circuit 384. However, the time-interrupt circuit 384 produces its interrupt signal at uniform time intervals, whereas the $P_r$-interrupt circuit produces its interrupt signal at uniform intervals of rotation of the crankshaft 16, that is, a $P_r$-interrupt signal occurs in response to the occurrence of a $P_r$-pulse and one $P_r$-pulse occurs for each 90° of crankshaft rotation. At low engine speed, the $P_r$-pulses may occur too infrequently for adequate engine control to be achieved because of a need to compute and set the controlled variables of engine operation more often than once per $P_r$ pulse. In such case, the time-interrupt signals, rather than the $P_r$-interrupt signals, may be used to initiate the computation and setting of these controlled variables. Alternatively, either a $P_r$-interrupt signal or a time-interrupt signal, whichever occurs first after the computer program has been completed, can be used to initiate progression once again through the computer program.

The $P_r$-interrupt circuit 173 comprises a NAND-gate 466 and a NAND-gate 468. The negative-going $P_r$-pulses are applied on the input 470 of the NAND-gate 466 and the other input to this gate is the output of the NAND-gate 468 appearing on lead 472. The $P_r$-interrupt signals are obtained on lead 474 as the output of the NAND-gate 466, this output being applied via a lead 476 as one input to the NAND-gate 468. The other input to the NAND-gate 468 is obtained from an inverter 478 the input to which the computer central processing unit is connected by a lead 480 to the computer central processing unit 132.

Let it be assumed that the signal on the input 470 is HI and that a HI pulse has previously been applied to the input 480. In such case, the inverter 478 input to the NAND-gate 468 would have been momentarily LO during the HI pulse, thus, rendering the output of this gate HI. This HI output is applied by lead 472 to the NAND-gate 466. Since the $P_r$-input on lead 470 at this moment also is HI, the output of NAND-gate 466 is LO. This LO is applied via the lead 476 to the NAND-gate 468. Thus, the output of NAND-gate 468 remains HI. When the LO-going $P_r$-pulse is applied to the input 470 of NAND-gate 466, its output changes from LO to HI and remains HI because this HI is applied via lead 476 to one input of the NAND-gate 468 the other input to which will have become HI and the output of which thus becomes LO that is applied to the NAND-gate 466. The computer central processing unit 132 receives the HI interrupt signal on output 474, initiates the computer program, and acknowledges such receipt and program initiation by applying a HI pulse on the input lead 480. This resets the circuit to the initial conditions assumed above so that the next $P_r$-pulse causes a repetition of the sequence of events.

The Programmable Interval Generator

Figure 16:
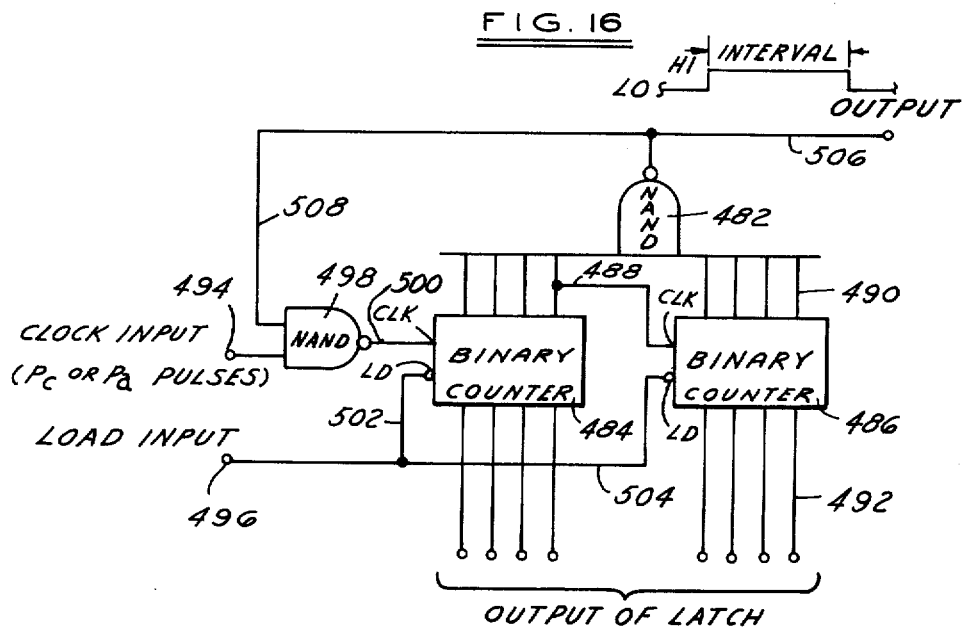
FIG. 16 is a general schematic diagram of a programmable-interval-generator circit.

The programmable interval generator is a circuit, schematically illustrated in FIG. 16, that is used in the fuel-injection-control logic circuit, the EGR stepper-motor-control logic circuit, and the spark-timing logic circuit. Its function is to produce a HI voltage level output signal for an interval determined by binary data programmed into it.

The programmable interval generator of FIG. 16 comprises an eight-input NAND-gate 482, a four-bit pre-settable binary counter 484, and a four-bit pre-settable binary counter 486. A lead 488 is connected to the most significant bit of binary counter 484 and to the clock-input of the binary counter 486; thus, the binary counters are toggled. The bit outputs 490 of the binary counters 484 and 486, a total of eight bits, form the inputs to the NAND-gate 482. A latch (not shown in FIG. 16) or the like may be used to provide the data bit inputs 492 to the binary counters.

The programmable interval generator has a clock input at terminal 494 and a load input at terminal 496. For the various uses of this circuit in the present engine control system, the clock input is either clock pulses $P_c$ or crankshaft angular unit pulses $P_a$. These pulses comprise one of the inputs to a NAND-gate 498 the output 500 of which is connected to the clock-input terminal of the binary counter 484. The load input terminal 496 of the circuit is connected by leads 502 and 504 to the respective load-input terminals of the binary counters 484 and 486. The output of the NAND-gate 482 forms the circuit output taken at lead 506. The waveform above lead 506 indicates the characteristic programmable-interval output of the circuit.

Under initial circuit conditions, the input bits 490 to the NAND-gate 482 are HI level signals, and the output 506 is a LO level signal as a result. This LO output signal at 506 forms one input 508 to the NAND-gate 498 the output 500 of which, therefore, is held at a HI level. The binary counters 484 and 486 are of the type wherein a HI level signal applied to their respective load-inputs 502 and 504 permits them to count pulses occurring at their respective clock-inputs 500 and 488, and wherein a LO level signal applied to their load-inputs permits the transfer of binary data appearing on the data bit inputs 492 to the binary counter outputs 490. Therefore, when a LO signal pulse is applied momentarily to the circuit load input 496, a binary number represented by the bits on the data bit inputs 492 is transferred to the binary counter output lines 490. Since these comprise the inputs to the NAND-gate 482 and since some of the bits presumably are LO level signals, the output of the NAND-gate 482 becomes a HI level signal, the transition indicating the beginning of the programmed interval. At the end of the LO going pulse at the load input terminal 496, the binary counters 484 and 486 are able to count clock pulses $P_c$ or angular-unit pulses $P_a$ which now can pass through the NAND-gate 498 since its input 508 is at a HI signal level. Eventually, enough pulses will have entered the binary counters 484 and 486 to render all of their output lines 490 at a HI signal level. At the instant this occurs, the output of the NAND-gate 482 again becomes LO signalling the end of the programmed interval, and this LO is applied to the input 508 of the NAND-gate 498 thereby preventing the passage through it of additional pulses occurring at the clock input 494. At this time, the circuit is under the conditions initially assumed in this description of its operation.

Since the programmable interval generator described above is an up-counter, that is, it counts pulses until all of its output lines 490 are HI level signals, it is necessary, if the generator is to be used to produce an interval equal to the number of pulses represented by a binary number, to supply the inputs 492 with the complement of such binary number.

The Fuel-Injection-Control Logic Circuit

Figure 17:
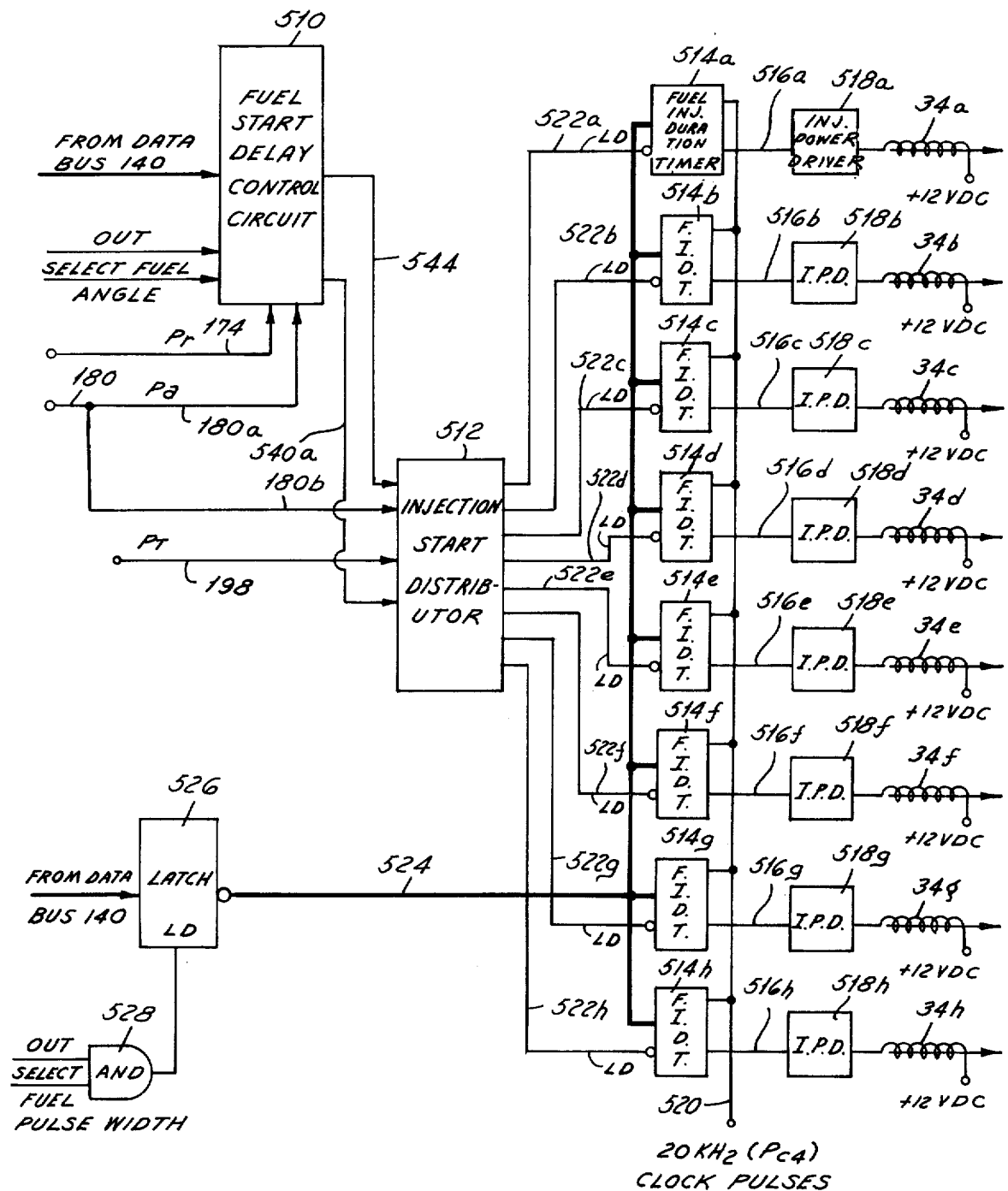
FIG. 17 is a block diagram of a fuel-injection-control logic circuit.

This circuit is illustrated in block form in Fig. 17. It comprises a fuel start-delay control circuit 510, an injection start-distributor circuit 512, and eight fuel-injection duration-timer circuits 514a through 514h which are connected, respectively, by output lines 516a through 516h to eight fuel-injector power-driver circuits 518a through 518h which are used to control electromagnetic fuel injectors 34a through 34h. Thus, there are fuel-injection duration-timer and fuel-injector power-driver circuits for each of the eight fuel injectors used to supply fuel to the respective eight cylinders of the engine.

The fuel-injection duration-timer circuits are each identical to the programmed interval generator circuit previously described and shown in FIG. 16. The clock inputs of the fuel-injection duration-timer circuits 514a through 514h are obtained via a lead 520, which is connected to the clock-oscillator circuit source of 20 KHz clock pulses $P_{c4}$. The load inputs for the fuel-injection duration-timer circuits 514a through 514h are obtained, respectively, as the outputs 522a through 522h of the injection start-distributor circuit 512. The data bit inputs to the fuel-injection duration-timer circuits are obtained as the output 524 of an inverting latch 526. The latch output line 524 in reality is comprised of eight lines each carrying a bit of information, as are the other wide lines illustrated in FIG. 17. The latch 526 is used to transfer the complement of a binary number appearing on the data bus 140 to the data input lines 524; an AND-gate 528, having its output connected to the load-input of the latch 526, controls this data transfer. The AND-gate 528 is itself controlled by its inputs labeled "out" and "select fuel pulse width", which are connected to the address selector previously described. The address selector places these inputs at a HI level when a particular address is placed on the address and data bus 140, which occurs when the computer central processing unit 132 reaches the point in the computer program wherein the fuel-injection pulse-width value is to be outputted from the computer.

Figure 18:
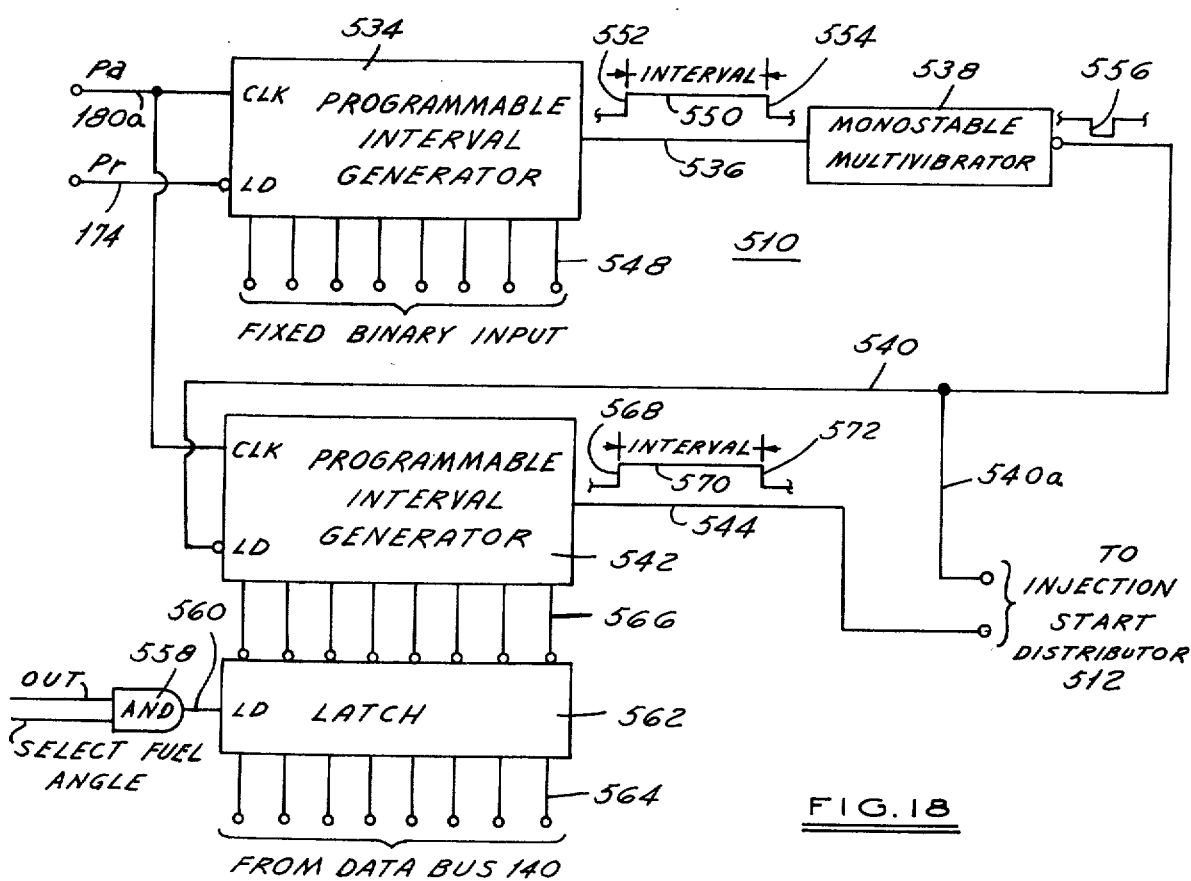
FIG. 18 is a circuit diagram of the fuel-injection start-delay control circuit illustrated in block form in FIG. 17.

The fuel start-delay control circuit 510 is illustrated in detail in FIG. 18. The function of this circuit is to produce a LO-going signal level each time one of the fuel injectors 34a through 34h, without specifying which one of these, is to be energized to initiate fuel-injection from some injector. (The injection start-distributor circuit 512 determines which of the fuel injectors is to be energized, and the respective fuel-injection duration-timer circuits 514a through 514h determine the length of time of such energization.) Otherwise stated, the fuel start-delay circuit provides an output pulse 570 on its output line 544, which is an input to the fuel-injection start-distributor circuit 512, that is delayed, by a computer-calculated number of crankshaft angular-unit pulses $P_a$, from a predetermined event. The predetermined event in the present embodiment is the closing of any one of the engine intake valves 28, which, for a particular engine design, always occurs a fixed number of crankshaft angular-unit pulses $P_a$ after the occurrence of a crankshaft reference pulse $P_r$. In 720° of rotation of the crankshaft 16, eight $P_r$-pulses occur and each of the eight intake valves 28 closes once. If it is desired to have fuel injection to any one of the engine cylinders terminate at some point in time other than the instant at which the intake valve for such cylinder closes, this can be accomplished by changing the interval 550 for such cylinder. It may be desirable to have fuel injection for individual cylinders or groups of cylinders terminate at different times relative to the closings of their intake valves to take into account variations in the transit times required to get the combustible mixture into the engine cylinders.

The fuel start-delay control circuit 510 includes a programmable interval generator 534 which has its output 536 connected to a monostable multivibrator 538. The output line 540 of the multivibrator 538 forms the input to the load-input terminal of a second programmable interval generator 542; the signal on line 540 also is transmitted via a line 540a to the injection start distributor 512. The programmable interval generators 534 and 542 each are identical in terms of their circuitry to the programmable interval generator previously described in detail and illustrated in FIG. 16.

The clock-inputs to both of the programmable interval generators 534 and 542 are crankshaft angular-unit pulses $P_a$ supplied via the line 180a, and the programmable interval generator 534 is supplied at its load-input with crankshaft reference pulses $P_r$ via a lead 174. A fixed binary number, which is the complement of a binary number representing the number of crankshaft angular-unit pulses $P_a$ that occur between the occurrence of a $P_r$-pulse and the closing of an engine intake valve and which may be set with switches or hard-wired, forms the data bit input to the programmable interval generator 534. Thus, the generator 534 produces an output pulse waveform 550 the leading edge 552 of which represents the occurrence of a $P_r$-pulse and the trailing edge 554 of which represents the closing of an engine intake valve. This pulse waveform 550 is supplied to the monostable multivibrator 538, which, at the trailing edge 554 of the input pulse, produces at its output a LO-going, short-duration pulse 556 that is representative of the closing of an engine intake valve.

As was previously described in connection with the digital computer program calculation of fuel-injection timing, the digital computer calculates and outputs on the data bus 140 a delay-time binary number representative of the number of crankshaft angular-unit pulses $P_a$ that are to occur between the closing of an engine intake valve and the initiation of fuel injection by an unspecified fuel injector. At the point in the computer program at which this binary number is to be outputted, the address selector is caused to place HI level signals on the out and "select fuel angle" inputs to an AND-gate 558. The resultant HI level signal appearing at the output 560 of the AND-gate is applied to the load-input of an inverting latch 562. The input 564 to the latch 562 is the delay-time binary number which will have been placed by the computer on the data bus 140. The complement of the delay-time binary number thus appears at the output lines 566 of the inverting latch 562, which output lines form the data bit inputs to the programmable interval generator 542.

When the pulse 556 occurs indicating the closing of an engine intake valve, it causes the binary number complement appearing on the data bit inputs 566 to be loaded into the programmable interval generator, which then begins counting crankshaft angular-unit pulses $P_a$. The leading edge 568 of the waveform 570 corresponds to the occurrence of the pulse 556, the trailing edge 572 of this waveform indicates the time at which injection from an unspecified fuel injector is to be initiated, and the interval between the leading and trailing edges is equal, in terms of $P_a$ pulses counted, to the delay-time binary number outputted by the computer. The pulse 570 is supplied via the output line 544 to the injection-start distributor, which initiates fuel injection from a fuel injector, selected by it, upon the occurrence of the trailing edge 572 of the pulse 570.

Figure 19:
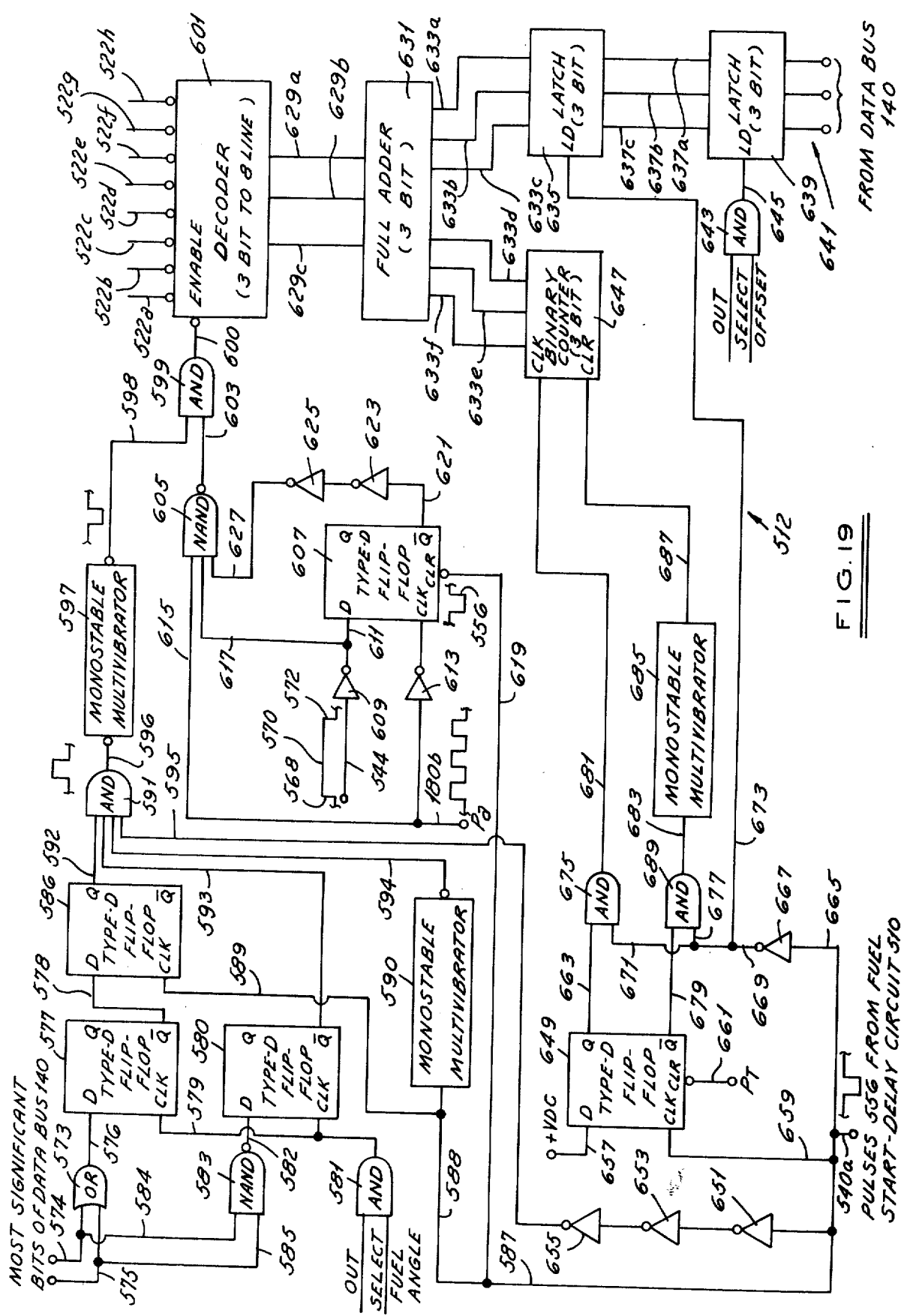
FIG. 19 is a circuit diagram of the fuel-injection start-distributor illustrated in block form in FIG. 17.

It is the function of the injection-start-distributor circuit, which is illustrated in detail in FIG. 19, to determine which of the fuel injectors 34a through 34h is to be energized in response to the occurrence of a trailing edge 572 of a given pulse interval signal 570 transmitted to it from the fuel start-delay control circuit 510.

The circuit 512 of FIG. 19 includes an OR gate 573 having an input 574 and an input 575. The inputs 574 and 575 are connected to the data bus 140 and are the most significant bits of the binary numbers appearing on the data bus 140. The most significant bits of data bus 140 are also applied, via leads 584 and 585, as the inputs to a NAND-gate 583.

The output 576 of the OR-gate 573 forms the D-input to an edge-triggered type-D filp-flop 577. The flip-flop 577 has a Q-output 578 and a clock-input 579, which is the same input applied to the clock-input of an edge-triggered type-D flip-flop 580. The clock-input 579 is the output of an AND-gate 581, which has inputs labeled out and select fuel angle. The D-input to the flip-flop 580 is the output 582 of the NAND-gate 583. An edge-triggered type-D flip-flop 586 has a clock-input consisting of pulses 556 obtained from the fuel start-delay circuit 510. These pulses 556 are supplied via leads 540a, 587, 588 and 589 to the clock-input of the flip-flop 586. The lead 588 also supplies the pulses 556 to an edge-triggered monostable multivibrator 590.

An AND-gate 591 has a first input 592 connected to the Q-output of the flip-flop 586, a second input 593 connected to the $\overline{Q}$-output of the flip-flop 580, a third input 594 obtained as the output of the monostable multivibrator 590, and a fourth input 595. The pulses 556 appearing on the line 540a are supplied to inverters 651, 653 and 655. These inverters, being odd in number, produce an inversion of the pulses 556 and delay them by approximately 40 nanoseconds at the lead 595 forming the fourth input to the AND-gate 591.

The output 596 of the AND-gate 591 forms the input to an edge-triggered monostable multivibrator 597, which, when triggered by a LO-going pulse edge at its input produces a short LO-going pulse at its output 598. The output 598 of the monostable multivibrator 597 forms the first input to an AND-gate 599, the output 600 of which is connected to the "enable" input of a three-bit-to-eight-line decoder 601.

The second input 603 to the AND-gate 599 is the output of a NAND-gate 605. The interval output pulses 570, which appear on the output line 544 of the fuel start-delay circuit 510 (FIG. 18), are applied through an inverter 609 to the D-input 611 of an edge-triggered type-D flip-flop 607. Crankshaft angular-unit pulses $P_a$, appearing on lead 180b, are applied through an inverter 613 to the clock-input of the flip-flop 607. These $P_a$ pulses are also supplied via a lead 615 to the first input to the NAND-gate 605. The second input 617 to the NAND-gate 605 is connected to the output 611 of the inverter 609 and, thus, the interval pulses 570, in inverted form, are supplied to the second input 617 to the NAND-gate 605. The third input 627 to the NAND-gate 605 is the $\overline{Q}$-output 621 of the flip-flop 607, this $\overline{Q}$-output being delayed by a few nanoseconds by a pair of inverters 623 and 625.

The decoder 601, which may be a type 7442, has data bit inputs 629a, 629b and 629c. These inputs are the outputs of a three-bit full-adder 631. The adder 631 has data bit inputs 633a, 633b, and 633c; the binary number represented by the data bits appearing on these inputs is added to the binary number represented by the data bits appearing on the other data bit inputs 633d, 633e and 633f of the adder 631. The data bit inputs 633a, 633b and 633c to the adder 631 are obtained as the output of a three-bit latch 635 which has data bit inputs 637a, 637b and 637c. The data bit inputs to the latch 635 are themselves the outputs of a three-bit latch 639 having data bit inputs 641 connected to the data bus 140. An AND-gate 643, having inputs labeled "out" and "selected offset", has its output 645 connected to the load-terminal of the latch 639. The inputs 633d, 633e and 633f to the adder 631 are the binary number data bit outputs of a binary counter 647.

An edge-triggered type-D flip-flop 649 has its D-input 657 connected to a source of positive DC voltage and has its clock-input 659 connected to the lead 540a to which the pulses 556 from the fuel start-delay circuit 510 are supplied. The clear-input 661 of the flip-flop 649 is supplied with pulses $P_T$. The pulse $P_T$ preferably occurs at a time between the closing of the intake valve for the number seven engine cylinder and the closing of the intake valve for the number eight engine cylinder.

The Q-output 663 of the flip-flop 649 comprises an input to an AND-gate 675. The pulses 556 from the fuel start-delay circuit 510 are the input, on a lead 665, to an inverter 667. The inverted pulses 556 occurring at the output 669 of the inverter 667 are applied as the second input 671 to the AND-gate 675. These inverted pulses 556 appearing at the inverter output 669 are applied via a lead 673 to the load-input of the latch 635, and they are applied via a lead 677 as one of the inputs to an AND-gate 689. The other input to the AND-gate 689 is the $\overline{Q}$-output 679 of the flip-flop 649.

The output 681 of the AND-gate 675 forms the clock-input to the binary counter 647. The output 683 of the AND-gate 689 forms the input to an edge-triggered monostable multivibrator 685 the output 687 of which is the clear-input to the binary counter 647.

The decoder 601 has eight output leads identified by the numerals 522a through 522h. These output leads are connected, respectively, to the various fuel-injection duration-timers 514a through 514h which control the length of time of energization of the respective fuel injectors 34a through 34h. A LO pulse applied to the output lead 522a causes the fuel-injection duration-timer 514a to energize the fuel injector 34a for an amount of time corresponding to the binary number outputted to the duration-timers by the digital computer and indicative of the pulse-width value in units of time. Similarly, LO pulses appearing on the output leads 522b through 522h cause the corresponding fuel-injection duration-timers 514b through 514h to be energized.

The function of the decoder 601 is to energize sequentially the output leads 522a through 522h, which leads are arranged in the firing order of the engine 10, in accordance with a binary number appearing at data bit inputs 629. Since there are three data bit inputs, numbers from 0 to 7 can be represented by electrical bits appearing on these data bit input leads 629. The binary number 000 thereon causes, when the decoder is enabled, a LO-level signal to occur on output lead 522a; the binary number 001 causes LO-level signal to occur on output lead 522b, etc.

For the present, it will be assumed that the data bits appearing on the data bit inputs 633a, 633b and 633c to the adder 631 are LO-level signals representing the binary number 000.

When a pulse $P_T$, which occurs between the respective closings of the intake valves for engine cylinder numbers seven and eight, is applied at the clear-input 661 of the flip-flop 649, its $\overline{Q}$-output 679 goes to a HI-level. When the next pulse 556 from the fuel start-delay circuit 510 occurs, which pulse occurrence corresponds to the closing of the intake valve for the number eight cylinder, the inverted pulse appearing on the output lead 669 of the inverter 667 produces a HI-level signal at the input 677 of the AND-gate 689. Since both of the inputs to the AND-gate 689 are HI-level signals, its output 683 goes HI triggering the monostable multivibrator 685. The short output pulse from the monostable multivibrator 685 is applied via its output 687 to the clear-input of the binary counter 647 setting its data bit outputs 663d, 633e and 633f to LO signal levels. Thus, the data bit inputs to the adder 631 are all LO-level signals and the data bit outputs 629 to the decoder 601 are also LO-level signals. If the decoder 601 is enabled by the LO-level pulse required at its "enable" input 600, the LO-level signals on the binary number inputs 629 will cause the output lead 522a to be energized for the length of time the signal on the enable-input 600 is at a LO-level. A LO-level pulse on the lead 522a loads the fuel-injection duration-timer 514a with the binary number pulse-width value complement which appears at the output leads 524 of the latch 526 (FIG. 17), and the fuel-injector 34a is energized for a time period corresponding to the time represented by the binary number pulse-width value.

It is the function of the circuitry comprising the AND-gate 599, the NAND-gate 605, the flip-flop 607 and the inverters 609, 613, 623 and 625 to produce the LO-level enable signal at the enable-input 600 of the decoder 601 at the appropriate times for energization of the respective leads 522a through 522h.

As was previously described, the trailing edge 572 of the interval pulse 570 corresponds to the time at which it is desired to initiate injection from an unspecified fuel injector. Prior to the occurrence of the leading edge 568 of the interval pulse 570, the D-input 611 to the flip-flop 607 is at a HI-level due to the inversion produced by the inverter 609. Thus, the $\overline{Q}$-output 621 and the corresponding input 627 to the NAND-gate 605 are LO-level signals. Upon the occurrence of a pulse 556 from the fuel start-delay circuit 510, which is applied via leads 540a, 587, and 619 to the clear-input of the flip-flop 607, the $\overline{Q}$-output 621 of the flip-flop 607 becomes a HI-level signal. This occurs at the leading edge 568 of the interval pulse 570 because the leading edge of the pulse 570 is produced by the occurrence of a pulse 556. This applies a HI-level signal on the input 627 to the NAND-gate 605. At this time, a LO-level signal appears on the input 617 to the NAND-gate 605 because of the inversion produced by the inverter 609. The input 615 to the NAND-gate 605 is continually going HI and LO in accordance with the pulses $P_a$ supplied thereto via lead 180b. Upon the occurrence of the trailing edge 572 of the interval pulse 570, the signal on the D-input 611, also applied to the input 617 of the NAND-gate 605, goes to a HI-level due to the inversion of the inverter 609. At this time, the $\overline{Q}$-output 621 of the edge-triggered flip-flop 607 will remain at a HI-level until the occurrence of the next LO-going edge of a $P_a$ pulse. However, before this occurs, a HI-level of a $P_a$ pulse must have appeared on the input 615 to the NAND-gate 605 simultaneously with the HI-level signal appearing on the input 617 to the NAND-gate 605 and also simultaneously with the HI-level $\overline{Q}$-output 621 applied to the input 627 to the NAND-gate 605. Thus, the three inputs 615, 617, and 627 of the NAND-gate 605 will have been simultaneoulsy HI for an instant, and its output 603 will have gone to a LO-level. The input 598 to the AND-gate 599 normally is at a HI-level. Thus, when the output 603 of the NAND-gate 605 goes to a LO-level, the output 600 of the AND-gate 599 also goes to a LO-level to enable the decoder 601. This causes, again assuming that the data bit inputs 629 are all at a LO-signal level corresponding to the binary number 000, the brief energization of the output lead 522a of the decoder 601. With the assumption of the binary number 000 on the data bit inputs 629 to the decoder, the pulse 556 causing enablement of the decoder would correspond to the closing of the intake valve for the number eight engine cylinder. The next pulse 556, which would correspond to the closing of th intake valve for the number one engine cylinder, causes the output of the adder 631 to become the binary number 001, again assuming for the moment that the output of the latch 635 is the binary number 000, and also causes the decoder 601 to enrgize its output lead 522b upon the occurrence of the trailing edge 572 of the next interval pulse 570.

The function of the circuitry comprising the flip-flop 649, and AND-gates 675 and 689, the monostable multivibrator 685, and the binary counter 647 is to advance numerically the data bit outputs 629 of the adder 631 each time a pulse 556 occurs. More specifically, each time a pulse 556 occurs, this circuitry causes the output of the binary counter 647 to advance by one count, thereby, causing the binary number output of the adder 631 to increase by one unit. This circuit operation produces the aforementioned sequential energization of the output leads 522 of the decoder 601.

The pulse $P_T$ occurs a short time before the occurrence of the pulse 556 that indicates the closing of the intake valve for the number eight engine cylinder. This clears the flip-flop 649. The pulse 556 corresponding to the closing of the intake valve for the number eight engine cylinder clears the binary counter 647, as was previously described, but this pulse 556 also is applied to the clock input 659 of the flip-flop 649 to cause the HI-level signal 657 appearing at its D-input to be transferred to Q-output 663. Thus, the first input to the AND-gate 675 is a HI-level signal. The next pulse 556, corresponding to the closing of the intake valve for the number one engine cylinder, is inverted by the inverter 667 to produce at the second input 671 of the AND-gate 675 a HI-level signal. Thus, the output 681 of the AND gate 675 is a HI-level signal applied to the clock-input of the binary counter 647. This produces a binary number one at the output of the binary counter, which binary number one also appears at the output of the adder 631 if the output of the latch 635 is the binary number 000. When the decoder 601 is once again enabled, a LO pulse appears on the output lead 522b causing the energization, for a time interval determined by the fuel-injection duration-timer 514b, of the fuel injector 34b for the number two engine cylinder. The decoder 601 is enabled at the trailing edge 572 of an interval pulse 570, and fuel-injector 34b is de-energized just as the intake valve for the number two cylinder closes. When a pulse 556 appears corresponding to the closing of the intake valve for the number two cylinder, a pulse again appears on the clock-input 681 to the binary counter causing the adder 631 to have the binary number 010 on its data bit outputs 629 to the decoder 601. Thus, when the decoder is enabled, the output lead 522c receives a LO pulse. The sequence continues in a similar manner. After the output of the binary counter 647 has reached the binary number 111, it is reset, in the previously-described manner, by the occurrence of a pulse $P_T$ produced by the engine distributor followed by the next pulse 556 corresponding to the closing of the intake valve for the number eight cylinder.

As was earlier described, the digital computer outputs a binary number equal to the quotient obtained by dividing a computer-calculated fuel-injection pulse-width value, expressed in angular-unit pulses P, by 256. This quotient is the number of crankshaft quarter-revolutions that each of the fuel injectors 34a through 34h are to be energized. When the computer causes the address selector to place HI-level signals on the out and "select fuel offset" inputs to the AND-gate 643, the resulting HI-level output is applied to load-input 645 to the latch 639. This causes the binary-number quotient, which appears at the data bit inputs 641 and which hereinafter is referred to as the fuel-offset to be transferred to the data bit inputs 637 to the latch 635. Upon the occurrence of a pulse 556 from the fuel start-delay circuit 510, this pulse, inverted and transmitted via the lead 673, loads the fuel-offset binary number onto the output of the latch 635. The fuel-offset binary number therefore appears on the data bit inputs 633a, 633b and 633c to the adder 631 and is arithmetically added to the binary-number count represented by the signals on the outputs 633d, 633e, and 633f of the binary counter 647 so that the binary number on the data bit outputs 629 of the adder 631 is the sum of the binary number at the output of the binary counter 647 and the binary number at the output of the latch 635. In this way, if the fuel injection duration is to last more than one quarter-revolution of the crankshaft, the output of the adder 631 will cause the decoder to energize the one of the leads 522 at the time required to assure that the fuel injection from a particular fuel injector 34 will have been completed prior to the closing of the intake valve for the cylinder corresponding to such fuel injector.

The function of the circuitry comprising the OR-gate 573, the NAND-gate 583, the flip-flops 577, 580, 586, the AND-gates 581 and 591, and the monostable multivibrator 597 is to enable the decoder 601 upon the occurrence of a pulse 556 from the fuel start-delay circuit 510 if the delay-time binary number outputted by the digital computer suddenly changes from a large binary number to a small binary number. If this were not done, a change of the delay time, represented by the interval pulse 570, from long to short could cause the fuel injector due to be energized at such instant to be energize for only a very short time rather than the long time desired for its energization (A change from a long delay time to a short delay time indicates that the fuel injector is to be energized for a considerably longer period of time.) Thus, the leads 574 and 575 to the OR gate 573 are connected to the most significant bits of data bus 140. When the address selector is caused by the computer to place HI-level signals on the inputs, labeled out and select fuel angle, to the AND-gate 581, its output becomes a HI-level signal that is applied to the clock-inputs of the flip-flops 577 and 580. This sets the Q-outputs of the flip-flops 577 and 580 in a manner dictated by the level of the signals appearing on the outputs of the OR-gate 573 and the NAND-gate 583. The circuitry is such that if the most significant bits of the data bus 140 both change from HI-level signals to LO-level signals, the output of the AND-gate 591 briefly rises to a HI-level upon the occurrence of a pulse 556 from the fuel start-delay circuit 510. The function of the monostable multivibrator connected to the third input of the AND-gate 591 and of the inverters 651, 653 and 655 connected to the fourth input to the AND-gate 591 is to delay the pulses 556 for times sufficient to enable the flip-flops 577, 580, and 586 to settle to their respective output levels.

Upon the occurrence of the short output pulse from the AND-gate 591, the trailing edge of this pulse triggers the monostable multivibrator 597 to produce a LO-going pulse at its output 598. This LO-going signal produces a LO-level signal at the output 600 of the AND-gate 599 to enable the decoder 601 and energize the one of the leads 522 corresponding to the fuel-injector to be initiated at such instant. In the absence of a change of the most significant bits of data bus 140 from HI-level signals on both of the most significant bits to LO-level signals, thereon, the output of the monostable multivibrator 597 remains at a HI-level. In such case, the decoder 601 cannot be enabled until a LO-level signal occurs at the output 603 of the NAND-gate 605. Thus, in the absence of a change of the most significant bits as discussed above, the NAND-gate 605 controls the enablement of the decoder 601.

Figure 20:
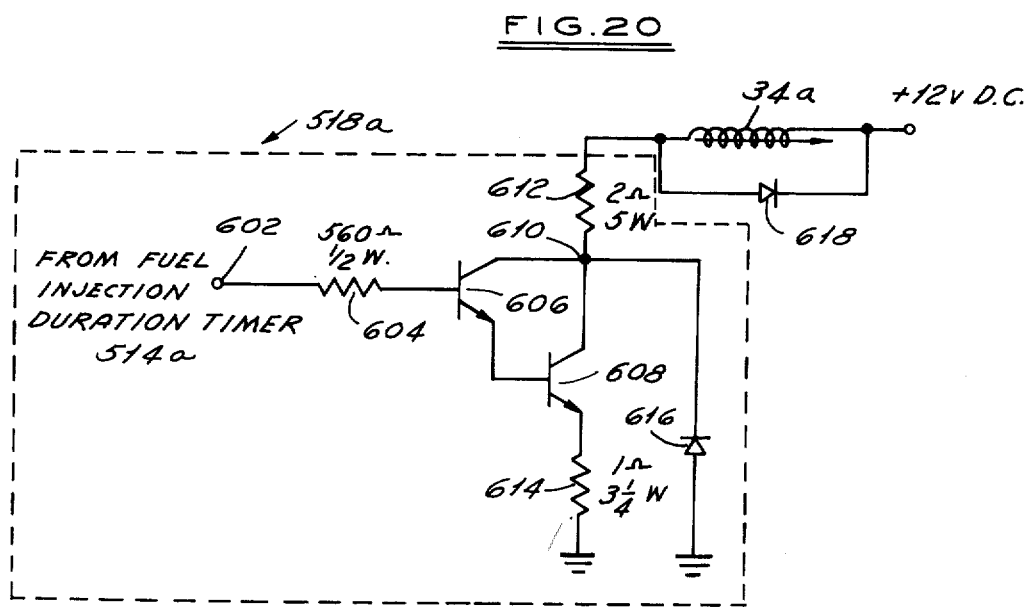
FIG. 20 is a circuit diagram of a fuel-injector power-driver illustrated in block form in FIG. 16.

With particular reference now to FIG. 20, there is shown a schematic circuit diagram illustrative of the injector power-driver circuit 518a shown in block form in FIG. 17 and of an electromagnetic fuel injector 34a controlled by the circuit 518a. It should be understood that the other power driver circuits 518b through 518h and injectors 34b through 34h are similar.

The circuit 518a comprises an input terminal 602 located at one terminal of a resistor 604. The other terminal of the resistor 604 forms the input to a power amplifier consisting of a Darlington pair of transistors 606 and 608. The collectors of the NPN transistors 606 and 608 are connected together at a point 610, which forms a junction with a resistor 612. Also, the emitter of the output transistor 608 is connected through a resistor 614 to ground. A diode 616 has its cathode connected to the point 610 and has its anode connected to ground. Preferably, the resistors 604, 612 and 614 have the values indicated.

The coil of the electromagnetic fuel injector 34a has one of its terminals connected to the positive terminal of a source of D.C. electrical energy, such as a 12 volt vehicle battery. The other terminal of the injector coil is connected to the resistor 612 in the power-driver circuit 518a. A field-dissipation diode 618 is connected in parallel with the injector coil.

In the operation of the circuit of FIG. 20, a pulse of a computer-calculated width is received from the fuel-injection duration-timer circuit 514a and applied at the terminal 602. This controlled-duration, HI-level pulse supplies the base-emitter current for the transistor 606. Transistor 606 conducts between its collector and emitter and thus supplies the base-emitter drive current for the transistor 608. This renders the transistor 608 fully conductive between its collector and emitter and current flows through the coil of fuel injector 34a permitting fuel to be discharged into the intake manifold of the engine 10. The function of the diode 616 is to protect the transistors 606 and 608 from negative transient voltages which may occur at the point 610.

The EGR Stepper-Motor Control Logic Circuit

Figure 21:
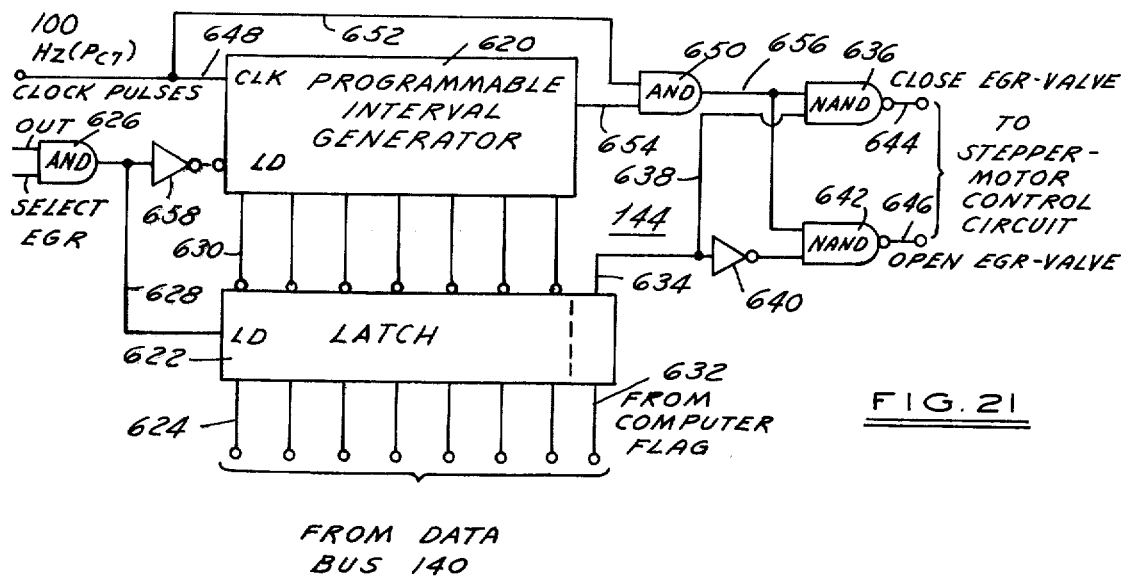
FIG. 21 is a circuit diagram for the EGR stepper-motor-control logic circuit illustrated in block form in FIG. 1.

The schematic detail of this circuit 144 is shown in FIG. 21. In the earlier discussion of the computer program for calculating the required setting, at a given time, of the controlled-variable EGR-valve-position, it was stated that the computer central processing unit 132 calculates the required new setting, determines the increment from the old setting that is necessary to achieve the required new setting of the EGR valve, sets or removes a "flag" electrical signal to indicate the direction in which the EGR valve is to move, and, at the appropriate point in the computer programs, outputs the increment and flag, in the form of binary number and flag signal, to the EGR logic circuit 144. The actual incrementing of the EGR valve is accomplished with the stepper motor 70 and its drive circuit 98; these are commercially available and, preferably, are a Model No. HS-50 stepper motor and a Model No. STM-1800V stepper motor translator both of which are products of Superior Electric Company, Bristol, Mass. The function of the EGR stepper-motor-control logic circuit 144 is to convert the binary-number increment and flag information, placed on the data bus 140 by the computer, into the number of pulses required to move the EGR valve to its required new setting.

The logic circuit 144 includes a programmable interval generator 620 and an inverting latch 622. The latch 622 has eight data bit inputs 624 connected to the data bus 140. The first seven bits are used for the binary-number increment necessary to achieve the required new EGR-valve setting; when this binary-number increment is on the data bus 140, the address selector places HI-level signals on the out and "select EGR" inputs to an AND-gate 626, the output of which is connected via a lead 628 to the load-input of the latch 622, and the resulting HI-level signal at the output of AND-gate 626 loads the complement of the seven-bit binary-number increment onto the corresponding seven output leads 630 of the latch. Also, the output of the AND-gate 626 is applied, through an inverter 658, to the load-input of the programmable interval generator 620, thereby, loading the complement of the seven-bit binary-number increment into it.

The eighth data bit input 632 to the latch 622 is the electrical flag signal; when this signal is at a HI-level, it indicates that the EGR valve 66 (FIG. 1) is to move toward a more closed position. The load signal on the lead 628 causes the flag data bit to pass unchanged to the latch output lead 634. The flag data bit appearing on lead 634 is applied directly to a NAND-gate 636 as an input 638 thereto, and it is applied after inversion by an inverter 640 as one input to another NAND-gate 642. The output line 644 from the NAND-gate 636 is connected to the Superior Electric Co. stepper motor translator, and, when pulses appear thereon, the EGR valve moves toward a more closed position. The output lead 646 of the NAND-gate 642 also is appropriately connected to the stepper motor translator, and, when pulses appear thereon, the EGR valve moves toward a more open position.

The function of the programmable interval generator 620 is to control the passage of 100 Hz clock pulses $P_{c7}$, applied at its clock-input 648, to the output of an AND-gate 650. The AND-gate 650 has two inputs, one of which is the clock pulses $P_{c7}$ supplied via a lead 652 and the other input to which is the output line 654 of the programmable interval generator. The output 656 of the AND-gate 650 forms the second input to each of the NAND-gates 636 and 642. If the flag data bit on the latch output line 634 is a HI-level signal, it is apparent that pulses occurring at the output 656 of the AND-gate 650 pass through the NAND-gate 636 to its output line 644, thereby, causing the EGR-valve to move in steps toward a more closed position as long as the pulses continue. Conversely, if the data bit flag on line 634 is a LO-level signal, the NAND-gate 636 does not pass pulses and its output 644 remains HI. However, the inverter 640 inverts the LO flag signal and applies a HI signal to the lower input to the NAND-gate 642. The NAND-gate 642 then passes pulses occurring at the output 656 of the AND-gate 650 to its output lead 646, thus, causing the EGR valve to move in steps toward a more open position as long as the pulses continue.

The programmable interval generator 620 produces a HI-level signal at its output line 654 for a time interval equal to the number of clock pulses $P_{c7}$ represented by the binary-number increment value whose complement is applied to data bit inputs 630. Hence, the AND-gate 650 passes clock pulses $P_{c7}$ to its output lead 656 for this time interval. At the end of this time interval, the output 656 of the AND-gate 650 is a LO-level signal, and neither of the NAND-gates 636 and 642 can pass pulses.

The Spark-Timing Logic Circuit

Figure 22:
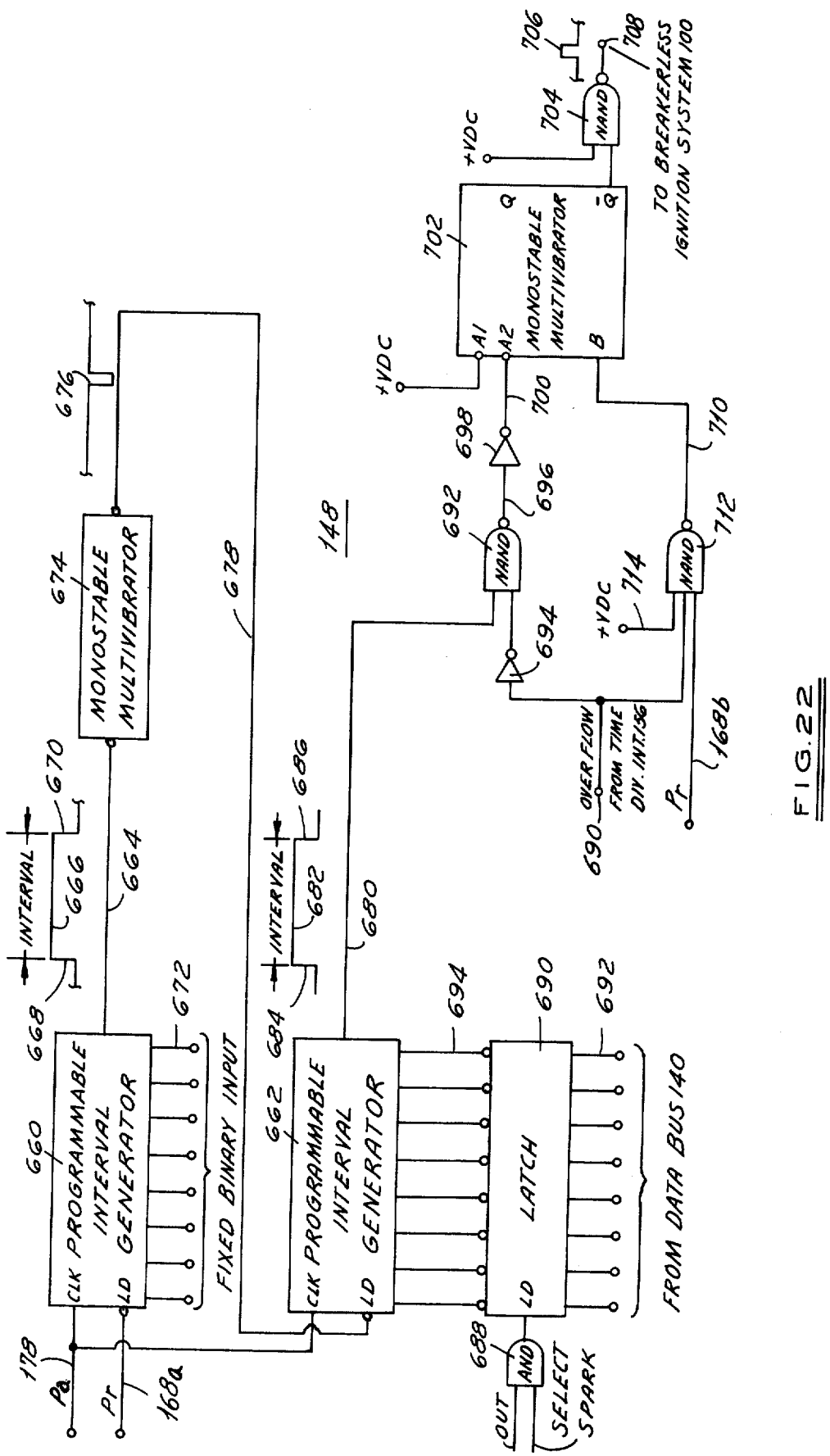
FIG. 22 is a circuit diagram for a spark-timing logic circuit illustrated in block diagram form in FIG. 1.

This circuit is illustrated in detail in FIG. 22 and is substantially similar in form and detail of operation to the fuel start-delay logic circuit previously described in connection with FIG. 18.

The spark-timing logic circuit 148 is used to generate a 100-microsecond HI-level pulse at such times as it is desired to produce ignition system sparks. The 100-microsecond spark-timing pulses generated by the spark-timing logic circuit are supplied to the breakerless ignition system 100, hereinafter described, which causes an ignition spark to be produced each time a spark-timing pulse occurs.

The spark-timing logic circuit 148 includes a first programmable interval generator 660 and a second programmable interval generator 662, both of which are circuits identical to that shown in FIG. 16 and previously described herein. The clock-inputs to both interval generators 660 and 662 are supplied, via line 178, with crankshaft angular-unit pulses $P_a$, and the load-input of the interval generator 660 is supplied with crankshaft reference pulses $P_r$ via the line 168a.

The function of the programmable generator 660 generator 660 is to generate on its output line 664 an interval pulse 666 the leading edge 668 of which corresponds to the occurrence of a $P_r$-pulse and the trailing edge 670 of which corresponds, preferably, to the maximum spark advance angle to be used in the operation of the engine being controlled. This is accomplished by the application on the data bit input 672 to the interval generator 660 of a fixed binary number which is the complement of a binary number representative of the number of $P_a$ pulses that would occur between a reference pulse $P_r$ and the occurrence of the angle of maximum spark advance for one of the cylinders. For example, if a $P_r$-pulse occurs, 225 $P_a$ pulses before each of the respective pistons in the engine reaches its top-dead-center position and if the maximum spark advance is 200 $P_a$ pulses, then the fixed binary input on data bit inputs 672 would be the complement of the binary number equal to the difference between 225 and 200, that is, 25 $P_a$ pulses. Thus, upon the occurrence of a $P_r$-pulse, the fixed binary input, which may be set with switches or hard-wired into the circuit, is loaded into the interval generator 660, the output 664 goes from a LO-level to a HI-level as indicated at 668, and the interval generator begins to count $P_a$ pulses. This count continues until a fixed number of Ppulses have been counted, and then the interval 666 ends with the trailing edge 670 going from HI-level to a LO-level, this corresponding to the maximum spark advance. The output line 664 forms the input to a monostable multivibrator 674, and, when the interval trailing edge 670 occurs, the multivibrator 674 produces a short-duration, LO-going pulse 676. The pulse 676 is supplied via the multivibrator output line 678 to the load-input of the programmable interval generator 662.

The programmable interval generator 662 generates on its output line 680 in interval 682 having a leading edge 684 corresponding to the maximum spark advance, as indicated by the pulse 676, and a trailing edge 686 corresponding to the time at which it is desired to generate a spark in one of the spark plugs 30.

As was mentioned in the discussion of the computer program for calculating the desired spark angle at any given time, it was stated that the computer outputs a binary number representing the difference in units of $P_a$ pulses, between the maximum spark advance and the desired spark advance. When the computer is ready to output this binary number, it applies an address to the address selector which causes the latter to apply HI-level signals to the inputs, labeled out and "select spark", to an AND-gate 688 the output of which then becomes a HI-level signal that is applied to the load input of a latch 690. The computer at this time will have placed the binary number on the data bus 140 forming the data bit inputs 692 to the latch 690. The HI-level signal at the load input of the latch 690 causes the complement of the binary number to appear at the latch outputs 694 which form the data bit inputs to the programmable interval generator 662. Thus, each time a pulse 676 occurs at its load-input, the programmable interval generator 662 generates the interval 682, equal in units of $P_a$ pulses to the binary number whose complement appears at data bit inputs 694, the trailing edge 686 of each interval being an instant at which a spark is to be generated. Of course, the instants at which sparks occur relative to engine crankshaft position will change from time to time as the computer updates the information appearing on the data bit inputs 694 to the programmable interval generator 662.

The proper generation of the trailing edge 686 of the interval pulse 682 depends upon the proper counting of $P_a$ pulses. Unfortunately, the time division interpolator 156, which generates the $P_a$ pulses, will go into an overflow condition if the interval between the $P_r$ reference pulses with which it is supplied becomes too great; in the present engine control system, this could occur during some conditions of engine cranking. When an overflow condition exists, the time division interpolator 156 produces an overflow signal at the output of its overflow detector. This overflow signal is HI-level signal that continues as long as the overflow condition persists; it is applied to the spark-timing logic circuit 148 at a terminal 690.

A NAND-gate 692 has one of its inputs connected to the output line 680 of the programmable interval generator 662 and has its other input connected through an inverter 694 to the overflow terminal 690. The output 696 of the NAND-gate 692 forms the input to an inverter 698 the output 700 of which is connected to an input terminal A2 of a monostable multivibrator 702. The monostable multivibrator 702, when triggered, produces LO-going output pulses of fixed duration, preferably 100-microsecond pulses, at its $\overline{Q}$-output terminal. The multivibrator, which may be a type 74121, may be triggered by a LO-going pulse at either of its terminals A1 or A2 or by a HI-going pulse at its terminal B. The $\overline{Q}$-output of the multivibrator 702 forms one input to buffer NAND-gate 704, the other input to which is positive DC voltage. Thus, whenever a LO-going, 100-microsecond pulse occurs at the $\overline{Q}$-output, a HI-going spark-timing pulse 706 is produced at the output 708 of the NAND-gate 704. The output 708 is connected to the breakerless ignition system 100. The B-input to the monostable multivibrator 702 is obtained from the output 710 of NAND-gate 712. A positive DC voltage is applied as an input 714 to the NAND-gate 712, the other inputs to which are the signal at the overflow terminal 690 and the LO-going $P_r$-pulses on a lead 168b.

When there is no overflow condition in the time division interpolator 156, a LO-signal exists at the terminal 690 and the output of the NAND-gate 712 is HI as a result and cannot change unless a HI-level signal appears at terminal 690; thus, the output 710 of the NAND-gate 712 cannot trigger the monostable multivibrator 702 unless an overflow condition exists in the time division interpolator 156. However, the LO-signal at overflow terminal 690 causes the output of the inverter 694 to be HI. Thus, whenever the interval pulse 682 goes from a HI-condition to a LO-condition, that is, whenever a trailing edge 686 occurs, the output 696 of the NAND-gate 692 goes from a LO to a HI; this, in turn, causes the output 700 of the inverter 698 to go from a HI to a LO and this triggers the monostable multivibrator 702, thereby, causing pulse 706 to be produced at the terminal 708.

If an overflow condition exists in the time division interpolator 156, a HI-level signal is on the overflow terminal 690, the output of the inverter 694 is a LO-level signal, the output of the NAND-gate 692 is held at a HI-level, and the HI-level signal applied to the center input to the NAND-gate 712 permits each LO-going $P_r$-pulse to produce a HI-going pulse at the output of the NAND-gate 712 which, in turn, triggers the monostable multivibrator 702 causing it to produce spark-timing pulses 706.

In summary, a spark-timing pulse 706 is produced each time a pulse interval trailing edge 686 occurs unless there is an overflow condition in the time division interpolator 156. If there is an overflow condition, then the $P_r$-pulses are used directly to generate spark-timing pulses.

The Breakerless Ignition System and Starter Circuit

Figure 23:
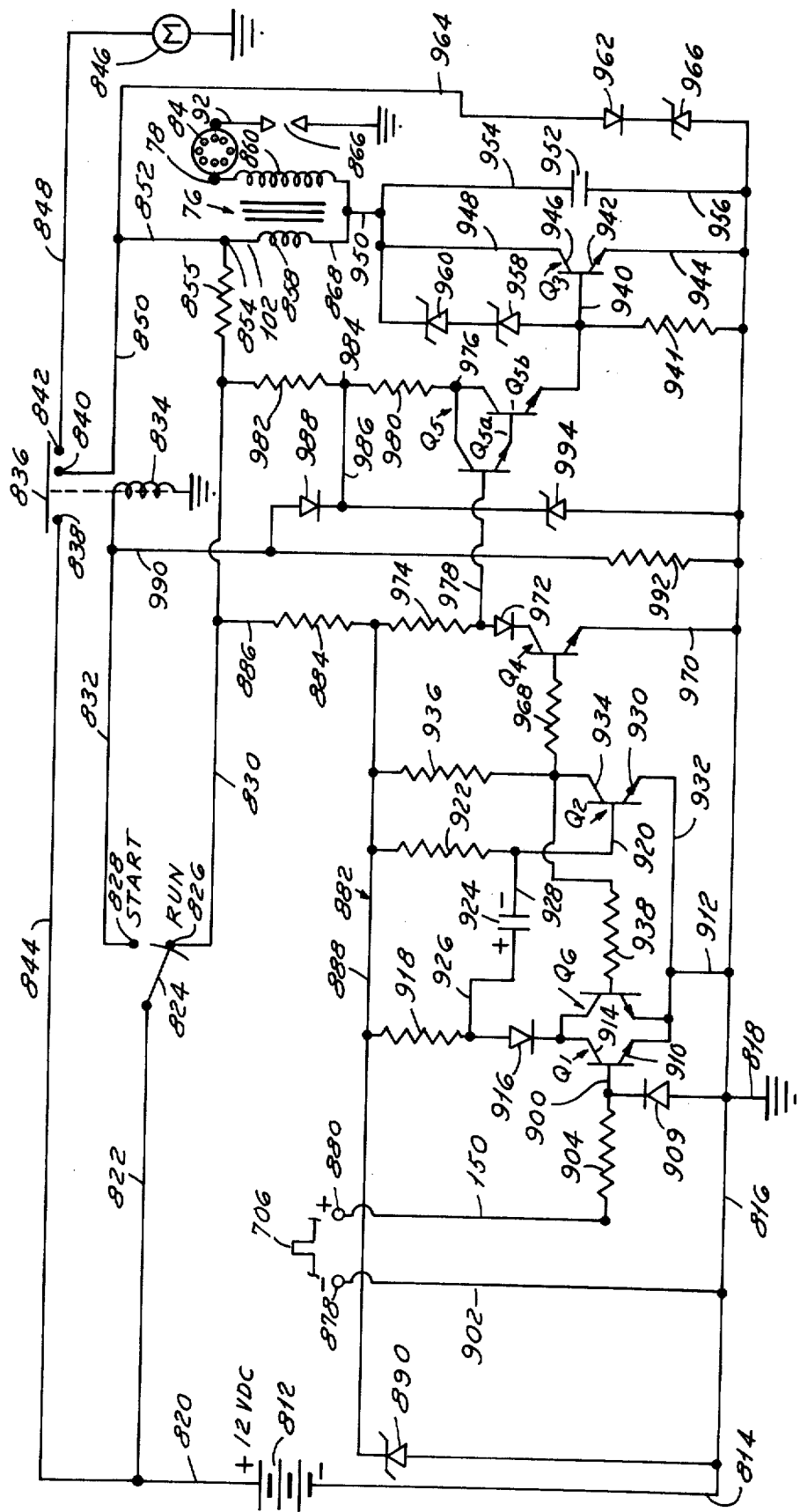
FIG. 23 is a schematic diagram of breakerless ignition system and engine-starter circuits illustrated in block form in FIG. 1.

The breakerless ignition system 100, the ignition coil 76, the distributor 84 and the starter circuit 200 are all shown schematically in the single circuit diagram of FIG. 23. The circuit of FIG. 23 includes a DC source of electrical energy, preferably 12 to 15 volts, such as a storage battery 812 having its negative terminal 814 connected by a common line 816 to ground at 818. The positive terminal 820 of the DC source 812 is connected by a line 822 to an ignition switch 824.

The ignition switch 824 may be of conventional design and preferably has a pole 826 to which the line 822 is connected during normal running conditions of the internal combustion engine. The ignition switch 824 also has a pole 828 used only during starting or cranking of the internal combustion engine. The pole 826 is connected to a line 830 and the pole 828 is connected to a line 832. The ignition switch 824 bridges both of the poles 826 and 828 during the engine starting mode. Thus, when the engine is running in a normal manner, electrical energy is supplied to the breakerless ignition circuit only through the line 830. However, during the engine's starting mode, electrical energy is supplied to both the line 830 and the line 832.

When the ignition switch 824 connects the line 822 to the switch pole 828 and line 832, electrical energy is supplied to a relay coil 834. Energization of the relay coil 834 closes a relay contact mechanism 836, thereby, to bridge electrical poles 838, 840 and 842. When this occurs, electrical current may flow from the positive line or terminal 820 of the DC source 812, through a line 844 and the contact mechanism 836, to an engine starting motor 846 via a line 848. Energization of the starting motor causes the crankshaft 16 of the engine 10 to rotate.

The pole 840 of the magnetic relay 834 is connected by lines 850 and 852 to a junction 854. Thus, during engine starting, the DC source 812 is connected by lines 844, 850 and 852 directly to junction 854. This bypasses a ballast resistor 855.

The ignition coil 76 has a primary winding 858 and a secondary winding 860. The primary winding 858 is connected at its terminal 862 to the junction 54. The terminal 78 of the secondary winding 860 is connected to the rotor of the distributor 84, which, in turn, is connected by the various leads to the spark plugs as is indicated by the lead 92 to a spark gap 866. A line 868 interconnects the opposite ends of the primary winding 858 and secondry winding 860 of ignition coil 856.

A portion 882 of the breakerless ignition system operates at a voltage supply level reduced from that of the DC source of electrical energy 812. This is accomplished with a resistor 884 that has its terminal 886 connected to the line 830 and has its other terminal connected by a line 888 to the cathode of a zener diode 890. The anode of the zener diode 890 is connected by a lead 892 to the grounded common line 816. The zener diode 890 has a breakdown voltage substantially less, for example 5.1 volts, than that of the DC source of electrical energy 12. Thus, the line 888 becomes a low voltage supply line.

The spark-timing pulses 706 produced as the output of the spark-timing logic circuit 148 are applied across input terminals 880 and 878. The terminal 878 is connected by a lead 902 to ground and the lead 150 couples the spark-timing pulses to the base or control electrode 900 of a first transistor $Q_1$. The coupling is accomplished with a base drive resistor 904. A protective diode 909 has its cathode connected to the base 900 of the transistor $Q_1$ and has its anode connected to the common line 816.

The output circuit of the first transistor $Q_1$ comprises its emitter 910 connected by a line 912 to the common line 816 and its collector 914 connected to the cathode of a thermal tracking diode 916. The anode of the thermal tracking diode 916 is connected to one terminal of a resistor 918, the other terminal of which is connected to the low voltage supply line 888.

A second transistor $Q_2$ has its base or control electrode 920 connected to one terminal of a resistor 922, the other terminal of which is connected to the low voltage supply line 888. A capacitor 924 has a lead 926 thereof connected to the junction formed between the thermal tracking diode 916 and the resistor 918. The other lead from the capacitor 924 is connected by a lead 928 to the base or control electrode of the second transistor $Q_2$. The output circuit of the second transistor $Q_2$ comprises its emitter 930, which is connected to the common line 816 by a line 932 and the line 912, and its collector 934 connected through a resistor 936 to the low voltage supply line 888.

A transistor $Q_6$ has its collector to the collector 914 of the first transistor $Q_1$, has its emitter connected through line 912 to the common line 816, and has its base electrode connected through a base drive resistor 938 to the junction formed between the collector 934 of the transistor $Q_2$ and the resistor 936.

The output circuit comprising the collector and emitter electrodes of the second transistor $Q_2$ is coupled through transistors $Q_4$ and $Q_5$ to a base or control electrode 940 of a third transistor $Q_3$. The output circuit of the third transistor $Q_3$ comprises its emitter 942 connected to the common line 816 by a line 944 and its collector 946 connected by lines 948 and 950 to the low voltage side, line 868, of the primary winding 858 of the ignition coil 76. A capacitor 952 is connected by its lead 954 to the low voltage terminal of the primary winding 858 and by its other terminal 956 to the common line 816. Series connected zener diodes 958 and 960 are connected between the base or control electrode 940 and the collector 946 of the third transistor $Q_3$. Also, the anode of a diode 962 is connected by a line 964 and the line 852 to the junction 854 at the high voltage terminal of the primary winding 858. The cathode of the diode 962 is connected to the cathode of a zener diode 966, the anode of which is connected to the common line 816.

The transistor $Q_3$ performs a switching function with respect to the current path for the primary winding 858 of the ignition coil 76. The transistors $Q_4$ and $Q_5$ couple the output circuit of the second transistor $Q_2$ to the base or control electrode 940 of the third transistor $Q_3$. Transistors $Q_4$ and $Q_5$ also have the important function of current and power amplification.

The transistor $Q_4$ has its base connected through a resistor 968 to the collector 934 of the second transistor $Q_2$. The emitter of the transistor $Q_4$ is connected by a line 970 to the common line 816. Its collector is connected through a diode 972 and a resistor 974 to the low voltage supply line 888.

The transistor $Q_5$ is a Darlington configuration and comprises two transistors $Q_{5a}$ and $Q_{5b}$. The emitter of the transistor $Q_{5b}$ is connected to the base or control electrode 940 of the third transistor $Q_3$. The collectors of transistors $Q_{5a}$ and $Q_{5b}$ are connected together at a junction 976, the emitter of transistor $Q_{5a}$ is connected to the base electrode of transistor $Q_{5b}$, and the base electrode of transistor $Q_{5a}$ is connected by a line 978 to the junction formed between the resistor 974 and the anode of the diode 972. The junction 976 of the collectors of the transistors $Q_{5a}$ and $Q_{5b}$ is connected through a resistor 980 and resistor 982 to the DC source voltage supply line 830. The junction 984 formed between the resistors 980 and 982 is connected by a line 986, a diode 988, and a line 990 to the DC source voltage supply line 832 that is used only in the engine start mode. A resistor 992 is connected between the anode of the diode 988 and the common line 816. Also, a zener diode 994 has its cathode connected to the cathode of the diode 988 and has its anode connected to the common line 816.

In the operation of the circuit of FIG. 23, the circuit causes a spark to be produced at the spark gaps, such as spark gap 866, upon the occurrence of the HI-going spark-timing pulses 706.

Let it be assumed that just prior to the occurrence of one of the HI-going spark-timing pulses 706, the second transistor $Q_2$ is fully conductive. In such case, current flows from the low voltage supply line 888, through the resistor 922 and the base-emitter junction of the second transistor $Q_2$, to the common line 816. Current also flows through the resistor 936, the collector 934 and the emitter 930 of the transistor $Q_2$ to the common line 816. At this time, the collector of the transistor $Q_2$ is at about 0.2 volts, and as a result, the base-emitter junction of the transistor $Q_4$ is reverse-biased and transistor $Q_4$ is nonconductive. This causes the voltage on the line 978 to be very close to the voltage on the low voltage supply line 888. Consequently, the transistor $Q_5$ is forward-biased and is conductive. This supplies base-emitter current for the third transistor $Q_3$ which therefore conducts between its collector 146 and emitter 142.

With the ignition switch 824 in the run position and with the third transistor $Q_3$ conductive, current flows from the DC source of electrical energy 12 through lines 820, 822, 830 and through the ballast resistor 855 to the junction 854 at the high voltage terminal of the primary winding 858 of the ignition coil 76. From the junction 854, the current flows through the primary winding 858, the line 950, and the output circuit of the transistor $Q_3$, comprising its collector 946 and emitter 942, to the common line 816. This permits a magnetic field to build up the ignition coil 76. The time during which the third transistor $Q_3$ is conductive to permit current to flow through the primary winding 858 is referred to as the dwell time. If transistor switching times are ignored, the dwell time also is equal to the time during which the second transistor $Q_2$ is conductive.

When the ignition switch 824 is in the start position and contacts 826 and 828 are both connected by the line 822 to the DC source of electrical energy 812, current flows through both the lines 830 and 832. The current through the line 832 energizes the magnetic relay 834 which causes the contact 836 to bridge the poles 838, 840 and 842 to supply current to the engine starting motor 846. Current also flows from the line 832 through the path including line 990, diode 988, and line 986 to the junction 984. This current path supplies the DC source potential, less the voltage drop across the diode 988, to the junction 984. Thus, during engine cranking, the DC source voltage is applied directly to the junction 984 rather than to the upper terminal of the resistor 982, as is the case when the ignition switch is in the run position. During engine cranking, this increases the current through the output circuit of the transistor $Q_5$ and therefore increases the current drive for the transistor $Q_3$. This helps assure the presence of an adequate current in the primary winding 858 of the ignition coil 76 during engine cranking. Also, it should be noted that when the ignition switch is in the start position and the magnetic relay 834 is energized, current flows from the DC source 812 through the line 844 and relay pole 840 and through the lines 850 and 852 to the junction 854 of the primary winding 858 of the ignition coil 76. This means that the ballast resistor 855 is short-circuited during the engine starting mode.

In summary, when the transistor $Q_2$ is conductive, the transistor $Q_4$ is nonconductive and the transistors $Q_5$ and $Q_3$ are conductive so that current flows through the primary winding 858 of the ignition coil 76.

With the second transistor $Q_2$ conductive, the base-emitter voltage drop of this transistor causes the voltage at the right-hand end (line 928) of the capacitor 924 to be at a potential of about 0.7 volts. Also, the capacitor 924 is being or will have been charged, with the polarity indicated in FIG. 1, through the resistor 918 and the base-emitter circuit of the transistor $Q_2$. Thus, the left-hand end (line 926) of the capacitor 924 will have attained a voltage level approaching that of the low voltage supply line 888.

When a spark-timing pulse 706 occurs such that the terminal 880 is positive with respect to the terminal 878, this signal voltage causes a base-emitter current to flow through the first transistor $Q_1$. This renders the transistor $Q_1$ conductive for the duration of the 100 microsecond spark-timing pulse and current flows through the resistor 918, the thermal tracking diode 916, the collector 914 and emitter 910 of the first transistor $Q_1$, and the line 912 to the common line 816. The transistor $Q_1$ becomes saturated, its collector being at a voltage of about 0.2 volts and the anode of the tracking diode being then at a voltage of about 0.9 volts. Because it is connected to the anode of the tracking diode 916, the left-hand end of the capacitor 924 must drop to a voltage level of about 0.9 volts.

As a consequence of the charge accumulated on the capacitor 924, its right-hand end, line 928, must fall to a voltage level below ground potential. This voltage on the line 928 is applied to the base or control electrode 920 of the second transistor $Q_2$ rendering it nonconductive. As a result, the collector 934 of the second transistor $Q_2$ rises to a voltage level near that of the low voltage supply line 888, and this voltage is applied through the resistor 938 to the base of the transistor $Q_6$ rendering it conductive. With the transistor $Q_6$ conductive, the end of the spark-timing pulse 706 and spurious voltages or transients that may occur at the base or control electrode 900 of the first transistor $Q_1$ do not affect the conductivity of the circuit between the cathode of the diode 916 and the common line 816. Thus, the transistor $Q_6$ is a device used to insure that the transistor $Q_2$ will remain nonconductive once the transistor $Q_1$ has been triggered by the spark-timing pulse 706 produced by the spark-timing logic circuit 148.

When the transistor $Q_2$ is rendered nonconductive, the potential on its collector 934 is applied to the base of the transistor $Q_4$ causing it to have a forward-biased base-emitter junction and rendering it fully conductive. This in turn applies a low potential to the line 978 connected to the base of the transistor $Q_5$ rendering it nonconductive. With the transistor $Q_5$ nonconductive, the third transistor $Q_3$ has no base drive and it also becomes nonconductive. When the transistor $Q_3$ becomes nonconductive, the current in the primary winding 858 of the ignition coil 76 is interrupted, and the magnetic field in the ignition coil must collapse. This produces an EMF in the secondary winding 860 of the ignition coil and causes a spark to occur in the spark gap 866. The secondary current flows through the capacitor 952 to ground.

As long as the transistor $Q_2$ is nonconductive, the third transistor $Q_3$ remains nonconductive. However, when the transistor $Q_1$ becomes conductive, the capacitor 924 discharges in a current path including the resistor 922, the capacitor 924, the diode 916, and the collector-emitter circuits of the transistors $Q_1$ and $Q_6$. This causes the voltage at the right-hand end, line 128, of the capacitor 924 to rise in value. When the voltage at this end of the capacitor 924 exceeds ground potential, the second transistor $Q_2$ begins to conduct once again and eventually becomes saturated. This reduces the voltage at the collector 934 of the transistor $Q_2$ to a low value, and because this signal is applied to the base of the transistor $Q_6$, through resistor 138, the transistor $Q_6$ is rendered nonconductive. The transistor $Q_1$ becomes nonconductive at the end of the 100 microsecond spark timing pulse 706. This prepares it to receive the next trigger signal. The nonconductivity of the transistor $Q_1$ permits the capacitor 924 to once again charge to the polarity indicated in FIG. 1.

At the moment that the second transistor $Q_2$ becomes conductive, the transistor $Q_4$ becomes nonconductive, the transistor $Q_5$ becomes conductive, and the third transistor $Q_3$ becomes conductive. The conduction of the transistor $Q_3$ closes the current path for the primary winding 858 permitting its magnetic flux to build up once again. This is the onset of the next period of dwell time.

The circuit of FIG. 23 includes various protective devices. The diode 109, along with the resistor 104, provides protection of the base-emitter junction of the first transistor $Q_1$ from high voltage arc-over from the ignition coil secondary circuit to the terminal 880.

The diode 916 is used for thermal tracking and its forward voltage drop tracks the base-emitter voltage drop of the second transistor $Q_2$ to provide thermal stability in the circuitry. This helps insure the proper generation of dwell time required by the primary winding 858 of the ignition coil 76.

The diode 972 prevents damage to the transistor $Q_4$ that might be caused as a result of negative transients, such as a negative magnetic-field-decay transient, that might occur on the line 830.

The resistor 992 reduces transient levels produced by the magnetic relay 834, and therefore reduces the voltage requirement of the diode 988.

The diode 988 provides extra drive during engine cranking as previously described. It also prevents voltage feedback through lines 986 and 990 to the magnetic relay 834 when the ignition switch 824 is in the run position.

The zener diode 994, along with the resistor 982, provides protection of the transistor $Q_5$ from load-dump transients. Load dump transients occur when an alternator is supplying a current load that is suddenly dumped. This is a large, positive transient.

Zener diodes 958 and 960, connected in series, render the transistor $Q_3$ conductive if its collector line 948 rises above a voltage of, for example, 360 volts. This prevents excess voltage at the collector junction.

The zener diode 966, along with the ballast resistor 855, provides protection of the transistor $Q_3$ from a load dump transient. The diode 962 is connected in series with the zener diode 966 to protect it in the event of a reversal of the polarity of the direct current source of electrical energy 812. The diode 962 preferably is of the avalanche type to prevent damage to it in the event of a high voltage arc-over from the secondary winding line 864 to the junction 854 of the primary winding.

By way of example and not limitation, the various components of the circuit of FIG. 23 may be of the following types or have the following values:

| | |
|---|---|
| Transistor $Q_1$ | 2N3859A |
| Transistor $Q_2$ | 2N3859A |
| Transistor $Q_3$ | 2N6306 or Texas Instruments TIP535 |
| Transistor $Q_4$ | 2N3859A |
| Transistor $Q_5$ | RCA 2N6055, Motorola MJ1000 or Texas Instruments TIP640 |
| Transistor $Q_6$ | 2N3859A |
| Resistor 904 | 6.8 kilohms |
| Resistor 918 | 200 kilohms |
| Resistor 922 | 110 kilohms |
| Resistor 938 | 15 kilohms |
| Resistor 936 | 10 kilohms |
| Resistor 968 | 2.2 kilohms |
| Resistor 884 | 180 ohms, 2 watts |
| Resistor 974 | 560 ohms |
| Resistor 992 | 470 ohms, 1 watt |
| Resistor 982 | 6.8 ohms, 10 watts |
| Resistor 980 | 3.0 ohms, 10 watts |
| Resistor 941 | 27 ohms, 2 watts |
| Resistor 855 | 1.35 ohms |
| Capacitor 924 | 0.22 microfarad |
| Capacitor 952 | 0.3 microfarad |
| Zener diode 890 | 5.1 volts, 1N5231A |
| Zener diode 994 | 27 volts, 5 watts, 1N5361A |
| Zener diodes 958 and 960 | 180 volts each, 1N5279 |
| Zener diode 966 | 27 volts, 75 watts |
| Diode 909 | 1N4152 |
| Diode 916 | 1N4152 |
| Diode 972 | 1N4152 |
| Diode 988 | 1N5625 |
| Diode 962 | 1N5625 |

Based upon the foregoing description of the invention, what is claimed is:

1. A method for controlling a combustion engine used in a process of converting heat energy, released by the combustion of a fuel, into mechanical energy, said engine having an output shaft which rotates while it is in operation and including at least one means for controlling said energy conversion process, said method comprising the steps of:

generating an electrical signal in the form of a binary number, said signal being indicative of a condition of said engine as of a selected instant in time during which said engine is operative in effecting said energy conversion process; then arithmetically calculating a value corresponding to a setting of said means for controlling said energy conversion process, said calculating being performed using said binary number electrical signal, by a digital computer programmed to calculate said value from an algebraic function or functions describing a desired relationship between said engine condition and said means for controlling said energy conversion process; then with an electrical circuit coupled between said digital computer and said means for controlling said energy conversion process, converting said calculated value into a setting of said means for controllng said energy conversion process; and thereafter while said engine is in operation, continuously repeating the above sequence of steps at uniform angular intervals of rotation of said engine output shaft to effect changes in the settings of said means for controlling said energy conversion process in response to changes in said binary number electrical signal indicative of said engine condition.

2. A method for controlling a combustion engine in accordance with claim 1, wherein said step of generating a binary number electrical signal indicative of a condition of said engine includes the step of generating a binary number electrical signal indicative of the load on said engine, and wherein said step of arithmetically calculating a value corresponding to a setting of said means for controlling said energy conversion process includes arithmetically calculating a value corresponding to a setting of an adjustable means for controlling the amount of fuel metered to said engine, said algebraic function or functions describing a desired relationship between the load on said engine and settings of said means for controlling the amount of fuel metered to said engine.

3. A method for controlling a combustion engine in accordance with claim 1, wherein said engine includes throttle means for controlling the amount of air supplied to said engine, wherein the step of generating a binary number electrical signal indicative of a condition of said engine includes generating a binary number electrical signal indicative of the position of said throttle, and wherein said step of arithmetically calculating a value corresponding to a setting of said means for controlling said energy conversion process includes arithmetically calculating a value corresponding to a setting of an adjutable means for controlling the amount of fuel metered to said engine, said algebraic function or functions describing a desired relationship between positions of said throttle and settings of said means for controlling the amount of fuel metered to said engine.

4. A method for controlling a combustion engine in accordance with claim 1, wherein said engine has a rotatable output shaft, wherein the step of generating a binary number electrical signal indicative of a condition of said engine includes generating a binary number electrical signal indicative of the angular velocity of said engine output shaft, and wherein the step of arithmetically calculating a value corresponding to a setting of said means for controlling said energy conversion process includes arithmetically calculating a value corresponding to a setting of an adjustable means for controlling the amount of fuel metered to said engine, said algebraic function or functions describing a desired relationship between the angular velocity of said engine output shaft and settings of said means for controlling the amount of fuel metered to said engine.

5. A method for controlling a combustion engine in accordance with claim 1, wherein said engine has a

47 rotatable output shaft and is of the spark-ignition type, wherein the step of generating a binary number electrical signal indicative of a conduction of said engine includes generating a binary number electrical signal indicative of the angular velocity of said engine output shaft, and wherein the step of arithmetically calculating a value corresponding to a setting of said means for controlling said energy conversion process includes calculating a value corresponding to a setting of an adjustable means for controlling the timing of the sparks supplied to said engine, said algebraic function or functions describing a desired relationship between the angular velocity of said engine and settings of said adjustable means for controlling the timing of the sparks supplied to said engine.

6. A method for controlling a combustion engine in accordance with claim 1, wherein said engine is of the spark-ignition type, wherein the step of generating a binary number electrical signal indicative of a condition of said engine includes generating a binary number electrical signal indicative of the load on said engine, and wherein the step of arithmetically calculating a value correspondng to a setting of said means for controlling said energy conversion process includes arithmetically calculating a value corresponding to a setting of an adjustable means for controlling the timing of the sparks supplied to said engine, said algebraic function or functions describing a desired relationship between the load on said engine and settings of said adjustable means for controlling the timing of the sparks supplied to said engine.

7. A method for controlling a combustion engine in accordance with claim 1, wherein said engine has a rotatable output shaft and includes means for recirculating engine exhaust gases through said engine, wherein the step of generating a binary number electrical signal indicative of a condition of said engine includes generating a binary number electrical signal indicative of the angular velocity of said engine output shaft, and wherein the step of arithmetically calculating a value corresponding to a setting of said means for controlling said energy conversion process includes arithmetically calculating a value corresponding to a setting of an adjustable means for controlling the amount of engine exhaust gases recirculated through said engine, said algebraic function or functions describing a desired relationship between the angular velocity of said engine and settings of said exhaust gas recirculation controlling means.

8. A method for controlling a combustion engine in accordance with claim 1, wherein said engine includes throttle means for controlling the amount of air supplied to said engine and means for recirculating engine exhaust gases through said engine, wherein the step of generating a binary number electrical signal indicative of a condition of said engine includes generating a binary electrical signal indicative of the position of said throttle means, and wherein the step of arithmetically calculating a value corresponding to a setting of said means for controlling said energy conversion process includes arithmetically calculating a value corresponding to a setting of an adjustable means for controlling the amount of engine exhaust gases recirculated through said engine, said algebraic function or functions describing a desired relationship between the position of said throttle means and said exhaust gas recirculation controlling means.

48

9. A method for controllng a combustion engine in accordance with claim 1, wherein said engine has a rotatable output shaft, said method further including the steps of generating electrical pulses at uniform time intervals, generating electrical pulses at uniform intervals of angular rotation of said engine output shaft, and using the first of the uniform time and angular rotation electrical pulses to occur after the completion of said sequence of steps to cause their repetition.

10. A method for controlling a combustion engine in accordance with claim 6, wherein said engine includes throttle meaans for controlling the amount of air supplied to said engine, said algebraic function or functions used to calculate a value corresponding to a setting of said means for controlling the timing of the sparks being different for positions of said throttle means above a predetermined value than the algebraic function used for calculating said spark timing where the position of said throttling means is below said predetermined value.

11. A method for controlling a combustion engine used in a process of converting heat energy, released by the combustion of a fuel, into mechanical energy, said engine including at least first and second means for controlling said energy conversion process, said method comprising the steps of:

generating an electrical signal in the form of a binary number, said signal being indicative of a condition of said engine as of a selected instant in time during which said engine is operative in effecting said energy conversion process; then arithmetically calculating a first value corresponding to a setting of said first means for controlling said energy conversion process, said calculating being performed, using said binary number electrical signal, by a digital computer programmed to calculate said first value from an algebraic function or functions describing a desired relationship between said engine condition and said first means for controlling said energy conversion process;

arithmetically calculating a second value corresponding to a setting of said second means for controlling said energy conversion process, said calculating being performed, using said calculated value corresponding to a setting of said first means for controlling said energy conversion process, by said digital computer programmed to calculate said second value from an algebraic function or functions describing a desired relationship between settings of said first and second means for controlling said energy conversion process;

with a first electrical circuit coupled between said digital computer and said first means for controlling said energy conversion process, converting said calculated first value into a setting of said first means for controlling said energy conversion process;

with a second electrical circuit coupled between said digital computer and said second means for controlling said energy conversion process, converting said calculated second value into a setting of said second means for controlling said energy conversion process; and thereafter while said engine is in operation, continuously repeating the above sequence of steps to effect changes in the settings of said first and second means for controlling said energy conversion process in response, respectively, to changes in said binary number electrical signal indicative of said engine condition and in said calculated first value.

12. A method for controlling a combustion engine in accordance with claim 11 wherein said engine has a rotatable output shaft, wherein said calculated first value corresponds to a setting of means of controlling the length of time fuel is metered to said engine, and wherein said calculated second value corresponds to a setting of means for controlling the angular positions of said engine output shaft at which the metering of fuel to said engine is initiated, whereby, the instants of initiation of fuel metering are determined by said calculated second value and the length of time of fuel metering following such initiations is determined by said calculated first value.

13. A method for controlling a combustion engine in accordance with claim 11 wherein:
  said engine is of the spark ignition type;
  said first means for controlling said energy conversion process comprises means for controlling the timing of sparks supplied to said engine and said calculated first value corresponds to a setting of said means for controlling spark timing; and
  said second means for controlling said energy conversion process comprises means for controlling the amount of fuel supplied to said engine and said calculated second value corresponds to a setting of said means for controlling the amount of fuel supplied to said engine.

14. A method for controlling a combustion engine in accordance with claim 11 wherein:
  said engine is of the spark ignition type;
  said first means for controlling said energy conversion process comprises means for controlling the amount of fuel supplied to said engine and said calculated first value corresponds to a setting of said means for controlling the amount of fuel supplied to said engine; and
  said second means for controlling said energy conversion process comprises means for controlling the timing of sparks supplied to said engine and said calculated second value corresponds to a setting of said means for controlling spark timing.

15. A method for controlling a combustion engine in accordance with claim 11 wherein:
  said engine is of the spark ignition type;
  said first means for controlling said energy conversion process comprises means for controlling the timing of sparks supplied to said engine and said calculated first value corresponds to a setting of said means for controlling spark timing; and
  said second means for controlling said energy conversion process comprises means for controlling the amount of exhaust gases recirculated through said engine and said calculated second value corresponds to a setting of said means for controlling the amount of exhaust gases recirculated through said engine.

16. A method for controlling a combustion engine in accordance with claim 11 wherein:
  said engine is of the spark ignition type;
  said first means for controlling said energy conversion process comprises means for controlling the amount of exhaust gases recirculated through said engine and said calculated first value corresponds to a setting of said means for controlling the amount of exhaust gases recirculated through said engine; and
  said second means for controlling said energy conversion process comprises means for controlling the timing of sparks supplied to said engine and said calculated second value corresponds to a setting of said means for controlling spark timing.

17. A method for controlling a combustion engine in accordance with claim 11 wherein:
  said first means for controlling said energy conversion process comprises means for controlling the amount of fuel supplied to said engine and said calculated first value corresponds to a setting of said means for controlling the amount of fuel supplied to said engine; and
  said second means for controlling said energy conversion process comprises means for controlling the amount of exhaust gases recirculated through said engine and said calculated second value corresponds to a setting of said means for controlling the amount of exhaust gases recirculated through said engine.

18. A method for controlling a combustion engine in accordance with claim 11 wherein:
  said first means for controlling said energy conversion process comprises means for controlling the amount of exhaust gases recirculated through said engine and said calculated first value corresponds to a setting of said means for controlling the amount of exhaust gases recirculated through said engine; and
  said second means for controlling said energy conversion process comprises means for controlling the amount of fuel supplied to said engine and said calculated second value corresponds to a setting of said means for controlling the amount of fuel supplied to said engine.

* * * * *